(12) United States Patent
Schröder et al.

(10) Patent No.: US 11,052,544 B2
(45) Date of Patent: Jul. 6, 2021

(54) SAFETY DEVICE FOR MACHINE TOOLS

(71) Applicant: ALTENDORF GMBH, Minden (DE)

(72) Inventors: Karl-Friedrich Schröder, Minden (DE); Andreas Neufeld, Minden (DE); Julia Pohle, Minden (DE)

(73) Assignee: Altendorf GmbH, Minden (DE)

( * ) Notice: Subject to any disclaimer, the term of this patent is extended or adjusted under 35 U.S.C. 154(b) by 70 days.

(21) Appl. No.: 16/668,643

(22) Filed: Oct. 30, 2019

(65) Prior Publication Data
US 2020/0368914 A1 Nov. 26, 2020

(30) Foreign Application Priority Data

May 24, 2019 (DE) .......................... 202019102935.8

(51) Int. Cl.
*B25J 9/16* (2006.01)
*B25J 19/06* (2006.01)
*G06K 9/00* (2006.01)
*G06T 1/00* (2006.01)

(52) U.S. Cl.
CPC ............ *B25J 9/1697* (2013.01); *B25J 19/06* (2013.01); *G06K 9/00335* (2013.01); *G06K 9/00355* (2013.01); *G06K 9/00362* (2013.01); *G06K 9/00375* (2013.01); *G06T 1/0014* (2013.01); *G06K 2209/21* (2013.01)

(58) Field of Classification Search
CPC ..... B25J 9/1697; B25J 19/06; G06K 9/00335; G06K 9/00355; G06K 9/00362; G06K 9/00375; G06K 2209/21; G06T 1/0014; B27G 19/02
See application file for complete search history.

(56) References Cited

U.S. PATENT DOCUMENTS

| 9,702,916 | B2 | 7/2017 | Ramaswamy et al. | |
|---|---|---|---|---|
| 2002/0017184 | A1 | 2/2002 | Gass et al. | |
| 2002/0170399 | A1 | 11/2002 | Gass et al. | |
| 2008/0273758 | A1* | 11/2008 | Fuchs | G01S 7/497 382/106 |
| 2009/0301275 | A1* | 12/2009 | Jung | B23Q 11/0089 83/58 |
| 2010/0300256 | A1* | 12/2010 | Loewe | B27G 19/02 83/72 |
| 2010/0300257 | A1* | 12/2010 | Loewe | B23Q 17/2438 83/360 |

(Continued)

FOREIGN PATENT DOCUMENTS

| DE | 202006007555 | 9/2007 |
|---|---|---|
| DE | 102007062996 | 6/2009 |

(Continued)

*Primary Examiner* — Nizar N Sivji
(74) *Attorney, Agent, or Firm* — Price Heneveld LLP

(57) ABSTRACT

A safety device for machine tools, such as a panel-sizing circular saw or an edge-gluing machine, with a machining tool used for machining a workpiece supplied to the machine tool, comprises a detection device and a hazard reduction device. The detection device is designed to detect a hazardous situation of an operator of the machine tool and the hazard reduction device is designed to initiate a safety measure to reduce the risk of injury to the operator when a hazard signal characterizing a hazardous situation of the operator is received.

34 Claims, 12 Drawing Sheets

(56) References Cited

U.S. PATENT DOCUMENTS

| | | | |
|---|---|---|---|
| 2011/0113939 A1* | 5/2011 | Simon | F16P 3/142 83/13 |
| 2011/0167970 A1* | 7/2011 | Niehsen | F16P 3/14 83/13 |
| 2011/0226105 A1 | 9/2011 | Butler et al. | |
| 2013/0187026 A1* | 7/2013 | Jackisch | F16P 3/142 250/200 |
| 2014/0090948 A1* | 4/2014 | Krishnarao | B23Q 11/0082 192/130 |
| 2014/0130645 A1* | 5/2014 | Takano | B27G 19/02 83/13 |
| 2014/0331833 A1 | 11/2014 | Gass et al. | |
| 2016/0016240 A1* | 1/2016 | Koegel | B23D 47/12 83/76.8 |
| 2016/0279754 A9* | 9/2016 | Gass | B23Q 17/2438 |

FOREIGN PATENT DOCUMENTS

| | | |
|---|---|---|
| DE | 202009009757 | 10/2009 |
| DE | 102008001727 | 11/2009 |
| DE | 202009007060 | 9/2010 |
| DE | 202009007150 | 10/2010 |
| DE | 102009031732 | 11/2010 |
| DE | 102009054491 | 6/2011 |
| DE | 202010004458 | 8/2011 |
| DE | 202011101666 | 8/2012 |
| DE | 202011101566 | 9/2012 |
| DE | 202017103019 | 8/2018 |
| EP | 1273097 | 1/2003 |
| EP | 2270424 | 1/2011 |
| EP | 2527069 | 11/2012 |
| WO | 0171902 | 9/2001 |
| WO | 2004101239 | 11/2004 |
| WO | 2012159956 | 11/2012 |
| WO | 2013046522 | 4/2013 |
| WO | 2013049522 | 4/2013 |
| WO | 2014164964 | 10/2014 |
| WO | 2015091245 | 6/2015 |
| WO | 2016032345 | 3/2016 |
| WO | 2016145157 | 9/2016 |
| WO | 2017059473 | 4/2017 |
| WO | 20174059473 | 4/2017 |
| WO | 2017196187 | 11/2017 |

* cited by examiner

SAFETY DEVICE FOR MACHINE TOOLS

CROSS-REFERENCE TO FOREIGN PRIORITY APPLICATION

The present application claims the benefit under 35 U.S.C. §§ 119(b), 119(e), 120, and/or 365(c) of DE 202019102935.8 filed May 24, 2019.

FIELD OF THE INVENTION

The invention relates to a panel-sizing circular saw with a safety device, in particular, for machining wood and/or plastic materials, and a computer-implemented method for controlling and/or regulating a panel-sizing circular saw with such a safety device.

BACKGROUND OF THE INVENTION

Panel-sizing circular saws are used to accurately cut sheet material, profiles, and other workpieces to size by means of a circular saw blade. Thereby, high-performance drive motors and large circular saw blades are used to meet the required cutting performance levels. Often, a workpiece is scored on one side with a low cutting depth by means of a scorer in order to achieve a splinter-free exit of the cutting teeth on this side and, as a result, to obtain a clean cut edge on both sides. A panel-sizing circular saw is generally already known from EP2527069 (A1), DE202009007150 (U1) or WO2012159956 (A1).

In general a panel-sizing circular saw can be safely operated by a trained user and in the case of using appropriate safety devices, such as a push stick for short and narrow workpieces. However, there is also risk of injury from the circular saw blade and, if applicable, from the scoring saw blade to a limited extent. Panel-sizing circular saws can, in particular, pose a risk of injury, particularly when used by personnel who lack in experience and/or training.

According to the findings of the inventors, the main cause of injuries is the violation of occupational health and safety regulations. It is known, for example, that protective covers that cover the circular saw blade are dismantled or that the push stick, which is mandatory when machining narrow workpieces and which keeps hands out of the hazardous area of the circular saw blade, is not used. In addition, inattentiveness or distractions of the operating personnel when working with a panel-sizing circular saw can also lead to a body part coming into contact with the circular saw blade.

In addition, according to the findings of the inventors, a potential danger arises in individual cases due to panel-sizing circular saws in essentially unpredictable special situations. Special situations can arise, for example, when a person stumbles in the vicinity of a panel-sizing circular saw or otherwise loses his/her control of movement and, as a result, a body part comes into contact with the rotating circular saw blade. In particular, due to the severity of the injury in the event of an accident with panel-sizing circular saws, various efforts are undertaken to protect the user from injury.

Numerous systems are known from the written prior art, each with a specific approach for detecting a hazardous situation and an action that is adapted to this to prevent or reduce the risk of injury in the case of this identified hazardous situation.

For example, a system is known from US 2002/0170399 A1 where contact between the skin and circular saw blade is detected by means of an electrical conductivity measurement via an electrical voltage applied to the circular saw blade and consequently a hazardous condition is detected. As a subsequent safety measure as a result of such a type of acquired signal, a preloaded spring is relaxed, and a plastic element is pressed into the cutting edge of the circular saw blade by means of the released spring force. From WO 2004/101239, a safety system is known where, in the event of a hazardous situation, the circular saw blade is pulled under the table or the drive is decoupled from the circular saw blade in order to achieve a deceleration of the circular saw blade through the workpiece.

From U.S. Pat. No. 9,702,916 B2, a safety device is generally already known, which is also to be used for circular saws. The hazard detection is carried out by means of a calibration and SNR calculation. In the event of a hazard, the deactivation of the motor and a cutting tool locking mechanism are initiated simultaneously to stop the circular saw blade.

From WO 2017/059 473 A1, a method for the detection of human tissue in the vicinity of a tool by detecting a periodic change in capacity is known.

A safety system for circular saws is already known from US 2016/0 279 754 A9. By way of listing alternative or additional detection measures and action measures, a contact or proximity to the saw blade is described as a detection criterion for a hazardous situation and a saw blade stop and a saw blade lowering is described as an action measure in the case of a hazardous situation.

From WO 2016/145 157 A1, a safety system for circular saws is already known where the detection of a contact or an approach of a body part to the saw blade occurs by means of a capacitive measurement. The motor is stopped during an approach, but a pyrotechnic braking device is ignited in the event of a contact. The detection of the hazardous condition takes place in a capacitive manner.

From WO 2015/091 245 A1, an optical detection system for the detection of skin tones and an approach of body parts towards the saw blade calculated from this is known. Stopping or lowering the saw blade are described as reaction mechanisms. Thereby, as a trigger criterion, a detection of a hazardous situation takes the form of an approach that is less than a certain distance or exceeding a certain approach speed.

From US 2014/0 331 833 A1, a safety system for circular saws is already known, which is based on a capacitive measurement and should detect a contact or an approach of a body part towards the saw blade. A stop of the cutting movement of the cutting tool is described as a machine reaction when a hazardous situation occurs. As a hazardous situation, either the approach or contact of a body part with the cutting tool is detected.

From US 2014/0 090 948 A1, the determination of a hazardous condition during an approach of a body part towards the saw blade by means of a temperature detection via infrared is already known. The speed of an object is detected, and this detection comprises the movement direction and the movement rate. Depending on this speed detected in this way, it is then decided whether the drive is deactivated or whether a brake is activated.

WO 2013/046 522 A1 describes a monitoring of a hazardous area by a triple sensor arrangement and the stopping of the saw blade if an object enters this hazardous area. Only objects that reflect electromagnetic waves in a certain way are detected, an RFID tag, which is attached to a distal end of the thumb of a working glove, is mentioned by way of example. An alarm signal is emitted parallel to stopping the saw blade in the event of a hazardous situation.

WO 2014/164 964 A1 describes the detection of a workpiece, with the detection of the material type of the workpiece in order to optimize cutting parameters derived from it. Depending on these parameters, the speed of a circular saw blade is then controlled. The workpiece is detected by means of a material sensor with respect to its geometric length in the cutting direction and, at the end of the cut, the speed is reduced in order to thereby reduce a splinter formation and associated risk of injury to the operator.

US 2011/0 226 105 A1 describes various safety devices on circular saws and deals with the detection of a hazardous situation, as well as the action in the event of a hazardous situation. For this purpose, different sensor systems are disclosed in order to detect hazardous situations and different actions are described in order to avoid hazardous situations. This includes stopping the saw blade, lowering the saw blade, forming a protective shield around the saw blade (airbag), and acoustic or optical signals. Levers shown in FIG. 16 (of US 2011/0 226 205 A1), which are intended to cover the cutting edges of the saw blade in hazardous situations, do not appear to technologically represent a reliably effective safety device in the case of existing intervention of the tool into a workpiece.

From US 2009/0 301 275 A1, the detection of a human body part by means of electromagnetic waves within the wave range of 400 nm-1,500 nm and the avoidance of hazardous situations by covering the saw blade and stopping the saw blade are already known. The document describes the detection of the hand in a hazardous area as a triggering event.

From DE 10 2007 062 996 A1, a safety device for circular saws with a stopping or lowering of the circular saw blade is already known. The hazardous conditions are detected by recognizing a body part and its movement direction in a hazardous area; alternatively, the observation of two different movements and their comparison is described.

DE 10 2008 001 727 A1 basically describes a protective device that describes a detection by means of sensors, in particular, distance sensors and an action by lowering the saw blade into a protective position.

DE 10 2009 054 491 A1 describes a safety device for circular saws, which turns off on detection of a specially designed glove of the operator. With the aid of the detection of electromagnetic radiation in the UV range, the position of this glove is determined and, depending on the entry into a hazardous area, a covering of the circular saw blade is triggered by a protective cover.

DE 20 2010 004 458 U1 describes a safety system in which a sensor system detects body parts in the area of the inflow pre-assembly area. A detection of the hazardous situation carried out according to a criterion is described and, in order to prevent a hazard, an action is described in the form of a shielding of the circular saw blade or a lowering of the saw blade under the table.

DE 20 2011 101 566 U1 describes a rapid lowering device for the circular saw blade to avoid hazardous situations.

However, none of these systems has yet achieved practical implementation or indeed wider use in machine tools. According to the findings of the inventors, this is, on the one hand, due to the fact that each type of machine tool has its own type of hazardous situations and its own circumstances under which hazardous situations occur and, due to this, also requires its own principles for avoiding the hazardous situation. On the other hand, the acceptance of safety systems of the well-known system and structure among the operators and users of machine tools is not sufficiently high—beyond any requirements of professional associations or due to legal provisions. According to the findings of the inventors, this is only partly due to the fact that the associated benefits are not valued more than the associated investment costs. A major cause is the lack of ergonomics of the hitherto known systems, for which the workflows on the machine tools are expected to be, in particular, made more difficult and more complicated. However, this is a serious disadvantage in times of high efficiency demands placed on the machining of such machine tools.

In addition to these ergonomic problems related to the system structure, however, the well-known systems still also have disadvantages which result in an insufficient functionality and safety even if the system is installed and activated by the user. A first problem with existing systems is that the time within which the cutting effect can be prevented at the hazard location is not sufficient to avoid a serious injury in the case of fast feed speeds of the workpiece and thus of the hand of the user with relation to the circular saw blade. Furthermore, the known devices have the disadvantage that they only work when cutting electrically insulating workpieces, but not when cutting electrically conductive materials, such as light metals or the like. A further disadvantage of the known devices is that, usually, in the case of the occurrence of special situations, these do not produce the desired protective effect since the time for producing the protective effect is usually too long.

In addition, it is a disadvantage in the case of known devices that the circular saw blade can be damaged by the sudden braking process. Fragments breaking out of the circular saw blade, whether during the braking process itself or as a result of any pre-damage caused during the braking process and the subsequent further use of the pre-damaged circular saw blade, then generate an additional potential source of injury. In addition, such systems with damage to the circular saw blade are accepted if they actually prevent a serious injury when triggered, but false triggering operations have an unfavourable effect, as they lead to the replacement of the expensive saw blade and, therefore, lower the system's acceptance level.

A multitude of hazardous situations for persons arise unexpectedly. In addition, there are hazardous situations with potential for injury, which arise extremely quickly. A response time to avoid injury is, therefore, short, so that safety devices sometimes have to initiate safety measures within tenths of a second or milliseconds in order to effectively prevent a person from being injured.

SUMMARY OF THE INVENTION

It is, therefore, an object of the present invention to provide a panel-sizing circular saw and a computer-implemented method which reduce or eliminate one or a plurality of the aforementioned disadvantages. In particular, it is an object of the invention to provide a solution that reliably protects persons from injuries caused by the circular saw blade even with panel-sizing circular saws used on an industrial level. In addition, it is an object of the present invention to provide a solution that allows for a cost-effective and constructionally simple solution with high protection against bodily injury.

Safety devices designed to prevent hazardous conditions effectively must, according to the findings of the inventors, be designed in such a way that they do not impair the normal workflow, or only impair it as little as possible, and avoid false triggering operations, or at least avoid such false triggering operations that can result in damage to the machine or the saw blade since, otherwise, there is no acceptance on the part of the user, which results in the safety device either not being desired and ordered in the first place—since it is not mandatory—or in it being subsequently removed or decommissioned.

In accordance with a first aspect of the present invention, the object mentioned at the beginning is achieved by means of a panel-sizing circular saw, in particular, for machining wood and/or plastic materials, comprising a workpiece support surface with a saw slot, a saw unit with a circular saw blade, which has a multitude of saw teeth for machining workpieces, wherein the circular saw blade is swivel-mounted on the saw unit below the workpiece support surface and, in a saw operation mode, protrudes through the saw slot, a detection device for detecting at least one hazardous condition for a human body part due to the saw blade, a safety device for preventing injury to a human body part from the circular saw blade by means of a safety measure, and a control device, which is coupled with the detection device and the safety device on a signal-engineering level, wherein the control device is arranged and designed, as a result of a detection of the at least one hazardous condition by means of the detection device, to initiate a safety measure by means of the safety device.

The invention is based on the findings that, in the vicinity of a panel-sizing circular saw, a wide variety of different hazardous conditions can occur. In addition, it has been recognized that the multitude of hazardous conditions can often only be described in a multidimensional way. Factors influencing the hazardous condition for a human body part are, for example, the distance of the human body part from the circular saw blade, the direction of the human body part in comparison to the circular saw blade, as well as the speed and acceleration of the human body part.

A one-dimensional description of a hazardous condition, for example, by means of a speed of a body part or a distance to the circular saw blade, is usually not effective. For example, even at the slightest distance of a body part from the circular saw blade, only a hazardous condition which has a low risk of injury can arise, since the body part is passed by the circular saw blade at a consistent speed in a controlled manner. However, the same situation can have a very high risk of injury, for example, if a body part moves at high speed and high acceleration in the direction of the circular saw blade. As a result, it has been recognized that the multidimensional description and detection of hazardous conditions is advantageous.

In particular, the workpiece support surface with the saw slot is to be understood in operating mode as an essentially horizontally aligned surface. The workpiece support surface can be a fully flat surface or also comprise auxiliary transport elements, such as air nozzles or rollers, which make it easier to move a workpiece over the workpiece support surface. The saw slot has an extension in the longitudinal direction and in the width direction. The longitudinal direction of the saw slot is preferably aligned in such a way that a circular saw blade can protrude through the saw slot in such a way that a workpiece can be moved towards a circumferential side of the circular saw blade in the feed direction and the circular saw blade divides the workpiece in a defined position with its circumferential side.

The circular saw blade is swivel-mounted on the saw unit, wherein the circular saw blade has a variety of saw teeth for machining workpieces. The saw unit preferably comprises one, two, or more further elements, which execute and/or facilitate the movement directions of the circular saw blade by, for example, acting in a driving manner in different spatial directions, wherein, preferably, rotating and translational movements are made possible. The circular saw blade is swivel-mounted on the saw unit, wherein the bearing point is located below the workpiece support surface.

In addition, the panel-sizing circular saw comprises a detection device for detecting at least one hazardous condition for a human body part by the circular saw blade. The detection device preferably comprises a device for acquiring an actual situation. This can be, for example, a common camera, a thermal imaging camera, and/or capacitive sensors. In addition, the detection device preferably includes a device for evaluating the acquired actual situation. By acquiring the actual situation and detecting hazardous conditions for a human body part on the basis of this actual situation, system-technical hazardous conditions can be detected and evaluated.

In order to render detected hazardous conditions usable in terms of the invention, the panel-sizing circular saw comprises a safety device for the avoidance of injuries to a human body part by the circular saw blade by means of a safety measure. The safety device is, in particular, arranged and designed in such a way that it removes the hazard potential of the circular saw blade from the detection radius of the human body part. This can be implemented either by removing the circular saw blade or by the existing circular saw blade representing no or greatly reduced hazard potential for a human body part.

The panel-sizing circular saw, therefore, comprises a device for the prevention of injuries to a human body part, the safety device, and a device for detecting a hazardous condition for a human body part, the detection device. The detection device and the safety device are further coupled with a control device on a signal-engineering level. The control device is, in particular, arranged and designed to initiate a safety measure by means of the safety device when a hazardous condition is detected.

Preferably, the detection device detects different hazardous conditions. In particular, it is preferred that the control device and/or the detection device evaluate a hazardous condition with regard to the potential risk of injury. For example, the risk of injury to a human body part is particularly high if the human body part is already at a small distance from the circular saw blade, moves directly in the direction of the circular saw blade, and, in addition, has a high acceleration and/or speed in the direction of the circular saw blade. On the other hand, there is a lower risk of injury if a human body part is moved only at low speed and/or low acceleration in the direction of the circular saw blade. Here, it is particularly preferred that the control device initiates a safety measure that is appropriate for the situation at hand.

In a particularly preferred design variant of the panel-sizing circular saw, it is provided that the safety device is arranged and designed to carry out a safety measure, wherein the safety measure is selected from two or more available safety measures, wherein, preferably, the control device is designed to initiate the safety measure depending on the situation and/or in a time-delayed manner. A situation-related and/or time-delayed initiation of safety measures can serve for the realization of different escalation levels. Escalation levels can, for example, take into account the influencing factor of the distance of the human body part from the circular saw blade. Particularly at low speed and low acceleration, the distance of the human body part to the circular saw blade can be the only influencing factor for the escalation levels.

For example, when cutting small workpieces, a small distance between the hand and the circular saw blade can occur, despite the use of push sticks. Nevertheless, only a hazardous condition which involves a low risk of injury is present when carried out by a person skilled in the art. In this case, it is undesirable that all available safety measures are already initiated, which can possibly also lead to damage to the panel-sizing circular saw, for example, the circular saw blade. Therefore, it is particularly preferred that various safety measures, in particular, in view of existing escalation levels, are initiated either in a time-delayed or situation-dependent manner.

In accordance with another preferred design variant, it is provided that the safety device comprises a user interface, which is arranged and designed to output an acoustic and/or optical warning signal as a safety measure to a user. An acoustic and/or optical warning signal is, in particular, a safety measure for a hazardous condition that involves a very low risk of injury. An acoustic and/or optical warning signal can be output, for example, for a hazardous condition entailing there being too little distance between a human body part and the circular saw blade, wherein the speeds and accelerations of the human body part are classified as low, resulting in only a low risk of injury.

The acoustic warning signal can be output, for example, by a loudspeaker, wherein the acoustic warning signal is preferably designed in such a way that a person and/or an operator also hears this as a warning signal. This can be achieved, in particular, by intense, higher-frequency sounds, which can also be modulated periodically. The optical warning signal can be output, for example, as a luminous signal, in particular, by a light-emitting diode. In particular, the optical warning signal is output within a field of vision of an operator and/or a person. For example, the optical warning signal can be output on a monitor, and/or a protective cover, and/or on the workpiece support surface.

Another preferred further development of the panel-sizing circular saw is characterized by the fact that the safety device is arranged and designed to reduce a speed of the circular saw blade as a safety measure. The reduction in the speed of the circular saw blade initially results in the hazard potential of the circular saw blade with a lower speed also being lower. Circular saw blades of panel-sizing circular saws rotate at a high speed, wherein in particular cutting speeds between 60 and 100 m/s are preferred. As a result, and depending on the diameter of the circular saw blade, speeds of around 4,000-6,000 revolutions per minute result, for example. If this operating speed is reduced, the hazard potential is also reduced.

In addition, this encourages an operator to comply with required safety standards, such as the distance of his/her hand to the circular saw blade in order to be able to work at the desired speed again. The reduction of the speed of the circular saw blade is carried out, in particular, by controlling a drive of the circular saw blade. In addition, the reduction of the speed of the circular saw blade can be carried out alternatively or additionally by a control of a braking device.

The reduction of the speed of the circular saw blade can range from less than 5% of the operating speed to 100% of the operating speed. In particular, it is preferred that reduction levels are stored, wherein these can be stored, for example, in the control device. In particular, it is preferred that two or more reduction levels are set. The reduction levels each include a percentage reduction in the speed of the circular saw blade. With increasing injury potential of a hazardous condition, a reduction stage level with a greater reduction in the speed of the circular saw blade can be initiated.

Furthermore, it is preferably provided that the safety device comprises a storage unit for a mitigation element and an output device for outputting the mitigation element, wherein the output device is arranged and designed to output the mitigation element from the storage unit in the direction of the circular saw blade as a safety measure. The mitigation element is used for the material supply to the circular saw blade. The circular saw blade is thus fed the mitigation element so that, in particular, the intermediate regions between the saw teeth and the saw teeth themselves are encased and/or covered. In particular, it is preferred that the mitigation element is output in the direction of the circular saw blade in such a way that a chip chamber and/or a chip surface and/or an open surface are covered and/or enveloped by the mitigation element. In addition, it can be preferred that the mitigation element is output in such a way that it covers and/or envelops a tooth face and/or a tooth back.

The mitigation element can furthermore be formed by one, two, or more mitigation-element parts. For example, the mitigation element can be designed as a cord and thus output as a single element part in the direction of the circular saw blade. In addition, the mitigation element can also have two or more geometries so that two or more element parts are output. As a result of the output of the mitigation element, the hazard potential of the circular saw blade is reduced or eliminated.

The circular saw blade can, for example, in the case of appropriate arrangement of the mitigation element, have an essentially non-hazardous, smooth surface in circumferential direction, by means of which cutting into a human body part is not possible or is only possible to a very limited extent. A human body part arranged on this circular saw blade with a mitigation element can continue to be endangered by the resulting friction between the hand and the mitigation element, wherein this hazard is to be assessed as significantly less than the hazard caused by a circular saw blade with saw teeth. The mitigation element can be designed, in particular, as a filler, a chip chamber filler, and/or a cutting cover means.

Another particularly preferred design variant of the panel-sizing circular saw provides that the output device is arranged and designed to output the mitigation element in a workpiece-related feed direction in front of and/or behind the circular saw blade, and/or the output device is arranged and designed to output the mitigation element in an area below the workpiece support surface, and/or the output device is at least partially encompassed by the splitting wedge, and the mitigation element is preferably output on the splitting wedge.

In the workpiece-related feed direction in front of the circular saw blade, in particular, that no cut has yet been made on a workpiece at this point. In the workpiece-related feed direction behind the circular saw blade, in particular, that the workpiece has already been separated at this point. The output of the mitigation element in the workpiece-related feed direction in front of and/or behind the circular saw blade has, in particular, the advantage that the output direction is substantially independent of a diameter of the circular saw blade and/or a position of the circular saw blade.

One of the advantages of an output of the mitigation element in an area below the workpiece support surface is that the output is not obstructed by a workpiece or even a human body part. An output of the mitigation element by an output device, which is at least partially encompassed by the splitting wedge, has, in particular, the advantage that the output of the mitigation element is carried out near the circular saw blade. This allows a quick deactivation of the circular saw blade by means of the mitigation element. In addition, the splitting wedge is already present in most panel-sizing circular saws, so that no significant modification measures are required on the panel-sizing circular saw.

In another preferred design variant of the panel-sizing circular saw, it is provided that the mitigation element is a solid, hardening, or flowable material, preferably a hardening or viscoelastic plastic, and, in particular, is designed as a plastic cord or a variety of particles, and the output device is arranged and designed to output the mitigation element in such a way that the saw teeth of the circular saw blade are enveloped by the mitigation element.

In particular, a plastic as a mitigation element has the advantage that it is easily conveyable and dischargeable. In addition, depending on the choice of composition, plastic can be designed in such a way that it lays around the saw teeth of the circular saw blade in a particularly favourable manner and thus covers and/or envelops them. Preferably, a liquid or hardening plastic can be used, in that this is hardened immediately after hitting the circular saw blade and can thus form a safe protective layer. Also, hardened plastic can bring advantages with appropriate formation, for example, as a plastic cord or as a coarse-fibrous plastic strand, wherein, in particular, the fast and safe arrangement of the mitigation element is advantageous.

In accordance with another particularly preferred design variant of the panel-sizing circular saw, it is provided that this includes a protective cover with a protective cover housing, which encloses a protective cover interior and partially accommodates the circular saw blade, in the saw operating mode, in the protective cover interior, wherein the output device is arranged on the protective cover and designed in such a way as to apply the mitigation element onto the circular saw blade within the protective cover interior.

Above the workpiece support surface, the saw teeth carry out a movement in a direction with a component of movement that is directed in an opposing direction with relation to the feed of the workpiece. As a result, it is particularly preferred to output the mitigation element via an output device on the protective cover since the mitigation element can be introduced within a hazardous area particularly quickly.

In addition, an output device on the protective cover is preferred, since this assembly is particularly simple, on a constructional level. In addition, by means of such an arrangement, a retrofitting of the output device can also be made possible in a particularly simple manner. In addition, the available space within a protective cover, as well as in the holding device of protective covers, is less limited than inside the machine base frame of the panel-sizing circular saw. The output device preferably has a storage unit for the mitigation element, which can be arranged on the protective cover. In addition or as an alternative, such a storage unit can also be arranged away from the protective cover, wherein the protective cover is preferably connected to the storage unit via a mitigation element line.

Another preferred further development of the panel-sizing circular saw is characterized by the fact that this comprises a shielding element, wherein the shielding element is arranged and designed to shield the saw teeth in the radial direction with regard to the axis of rotation of the circular saw blade at least in sections in a shielding position in the area above the workpiece support surface.

The shielding in sections of the circular saw blade by means of the shielding element is, in particular, arranged and designed in such a way that, furthermore, a workpiece can be cut by means of the circular saw blade. Therefore, it is preferred that the shielding element only shields the circular saw blade in sections. In particular, it is preferred that the shielding element shields the circular saw blade in the circumferential direction starting from a point located in the feed direction of the workpiece behind the circular saw blade. Starting from this point up to one end of the shielding element, the shielding element encloses the circumference of the circular saw blade in the circumferential direction with a shielding angle. The shielding angle is preferably less than 175°, 170°, 160°, 150°, 120°, or 90°.

Preferably, above the workpiece support surface, the shielding element comprises a constant distance in the radial direction to the circular saw blade. The distance of the shielding element to the circular saw blade is necessary to be able to ensure a cutting effect of the circular saw blade without damaging the shielding element. In particular, it is preferred that, in the shielding position, in the area above the workpiece support surface between an inner circumference of the shielding element and the outer diameter of the circular saw blade in the radial direction of the circular saw blade, a distance of less than 2 mm, 5 mm, 10 mm, 15 mm, 20 mm, or 50 mm exists.

The distances of the circular saw blade in the radial direction from the inner circumference of the shielding element are usually dependent on the diameter of the circular saw blade. In particular, it is preferred to choose a distance at which a multitude of circular saw blades, which differ in relation to the diameter, can be used.

It is also preferred that the shielding element encloses the saw teeth in the radial direction and/or in the axial lateral direction in relation to the axis of rotation of the circular saw blade.

The enclosing of the saw teeth in the radial direction by the shielding element occurs, in particular, in that the shielding element is arranged in the radial direction spaced away from the circular saw blade. A shielding present in the axially lateral direction takes place by the shielding element, for example, comprising a groove, wherein the groove comprises lateral surfaces, which are spaced away from the circular saw blade in the axial lateral direction in the operating state. By way of the axially lateral enclosing of the circular saw blade, an increase in protection by the shielding element occurs.

Furthermore, it is preferred that the shielding element has an annular geometry. In particular, it is preferred that the shielding element has a partially annular geometry. In addition, it can be preferred that a radius of the annular or partially annular geometry is modifiable. In particular, this has the advantage that the shielding element can be adapted to different diameters of circular saw blades.

Furthermore, it is preferred that, in a saw operating mode position, the shielding element is essentially arranged below the workpiece support surface, and/or the shielding element comprises a splitting wedge arranged in a workpiece-related feed direction behind the circular saw blade in the saw operating mode position.

Another preferred further development of the panel-sizing circular saw is furthermore characterized in that the shielding element is arranged and designed in such a way that this is moveable in the essentially tangential direction of the circular saw blade, wherein an axis of rotation of this movement is preferably orientated in parallel, in particular, coaxially, to the axis of rotation of the circular saw blade.

This further development is particularly advantageous in that, in the operating mode, the shielding element is not an obstacle without a hazardous condition. In particular, it is preferred that the shielding element in the shielding position extends from an exit point on the workpiece support surface, which is preferably arranged flush with the saw slot, in the tangential direction of the circular saw blade to an end point, which is preferably arranged flush with the saw slot. In addition, it can be preferred that the exit point is arranged in the workpiece-related feed direction behind the circular saw blade and/or the end point is arranged in the workpiece-related feed direction in front of the circular saw blade. In addition, it can be preferred that the shielding element forms a part of the splitting wedge and/or is encompassed by the splitting wedge.

In another particularly preferred design variant of the panel-sizing circular saw, it is provided that the shielding element comprises a first section and a second section, wherein the second section is arranged in a moveable manner, in particular, in a pivotable manner, on the first section, wherein the second section can preferably be moved, in particular, pivoted, around a horizontal axis, which, in particular, runs in parallel to the rotational axis of the saw blade.

The first section of the shielding element is preferably arranged in an immoveable manner relative to the circular saw blade. In particular, the first section is arranged in a substantially immoveable manner with respect to the circular saw blade in the tangential direction. It is also preferred that the first section of the shielding element is arranged in a workpiece-related feed direction behind the circular saw blade. Furthermore, a width of the first section of the shielding element is designed in such a way that this does not exceed a width of the splitting wedge in the direction of the rotational axis of the circular saw blade.

The second section of the shielding element is preferably arranged in a moveable manner on the first section in such a way that a workpiece to be moved onto the second section moves the second section in such a way that a cutting of the workpiece is made possible. Preferably, the second section is swiveled upwards by the workpiece. For this purpose, the second section is preferably arranged on the first section in a pivotable manner. Furthermore, preferably, the second section is arranged and designed in such a way that this always exerts at least a low force in the vertical direction on the workpiece.

In addition, it is preferred that the second section is arranged on the first section in such a way that this is displaceable in the tangential direction. This displaceability is, in particular, designed in such a way that a workpiece to be moved onto the shielding element can be cut and the second section is moved away from the workpiece support surface in the tangential direction by way of the movement of the workpiece.

In accordance with another particularly preferred design variant of the panel-sizing circular saw, it is provided that the circular saw blade is arranged on the saw unit, and that the circular saw blade is arranged on the saw unit in a lowerable manner in such a way that this is completely arranged under the workpiece support surface in a protective mode.

The circular saw blade is mounted on the saw unit so as to be rotatable around a circular saw blade axis and the saw unit can preferably be swiveled around a pivot axis extending in the saw direction in order to carry out mitre cuts, for example. A circular saw blade arranged under the workpiece support surface does not exert any hazard potential on its surroundings. Thus, such a saw unit enables the safe handling of the panel-sizing circular saw. Separate actuators, for example, elastically pre-stressed actuators or actuators operated with explosive material, can be used to lower the saw blade. In addition or alternatively, a braking device can be provided, which is designed to convert the energy stored in the rotation of the saw blade by braking into a lowering force of the saw blade.

Furthermore, it is preferably provided that the detection device is designed as an image detection device or comprises the latter and preferably comprises at least one capacitive sensor and/or at least one infrared sensor, and/or an image evaluation unit, wherein the image evaluation unit is preferably encompassed by the detection device.

By means of the image detection device, a differentiation between workpieces and human body parts can be carried out by image processing and, as a result, the approach of a human body part to the circular saw blade or the occurrence of a hazardous condition can be detected. A capacitive sensor can detect the different dielectric characteristics of workpieces and human body parts, so that a hazardous situation can also be detected by means of a capacitive sensor. An infrared sensor allows differentiation between a workpiece and human body parts based on the body heat of the human body part.

The images taken by the detection device, for example, the image detection device, the capacitive sensor, or the infrared sensor, are preferably evaluated with respect to a potential hazardous situation, wherein this can take place by means of an image evaluation unit. In particular, it is preferred that the detection device comprises the image evaluation unit.

It is also preferred that the detection device designed as an image detection device is designed as, or comprises, a video camera and/or a thermal imaging camera, wherein the video camera and/or the thermal imaging camera is/are preferably designed as high-resolution camera(s).

In addition, it is preferred that the detection device designed as an image detection device is designed to capture one, two, or more images at the same time, and wherein the image evaluation unit is designed to generate and provide stereoscopic images.

In particular, it is preferred that the image detection device is designed as a stereo camera. Images taken by means of a stereo camera can be assembled by means of a suitable image processing device to create at least one three-dimensional image. A three-dimensional image typically comprises a higher information density than a two-dimensional image.

In another particularly preferred design variant of the panel-sizing circular saw, it is provided that the control device is arranged and designed to evaluate a characteristic of an object detected by the detection device within a monitoring area, in particular, a remote monitoring area and a local monitoring area, and the control device is designed in such a way as to detect a hazardous situation assigned to the detected object on the basis of the characteristic and to compare the detected hazardous situation with predetermined hazardous situations, wherein the predetermined hazardous situations are stored in a catalogue, preferably in a data-processing-related manner, and, in the event of a determined accordance of the detected hazardous situation with a predetermined hazardous situation, to control the safety device in such a way that this carries out one, two, or more predetermined safety measures.

The monitoring area of the panel-sizing circular saw is predetermined. Preferably, the monitoring area has a spherical geometry or a hemispherical geometry, wherein the centre point of these geometries is preferably located at the saw slot. In addition, this monitoring area can be divided, for example, into a remote monitoring area and a local monitoring area.

The division into a remote monitoring area and a local monitoring area has the particular advantage that hazardous situations in the remote monitoring area and in the local monitoring area can be countered using various safety measures. For example, a human body part moving towards the circular saw blade at a high speed and possibly with a high level of acceleration in the remote monitoring area is associated with a lower risk of injury than the same situation in a local monitoring area. In particular, it is preferred that the local monitoring area is arranged inside the remote monitoring area.

A characteristic of an object detected by the detection device can include, for example, a direction, a speed, and/or an acceleration. A single characteristic of the aforementioned ones or a sum of these characteristics is evaluated by means of this control device and a hazardous situation is assigned to the detected object on the basis of the characteristic or the characteristics. This assigned hazardous situation is compared with stored, predetermined hazardous situations. These predetermined hazardous situations also include characteristics of bodies, such as direction, speed, or acceleration.

In addition, in the predetermined hazardous situations, the characteristic of whether the detected object is located in a remote monitoring area or in a local monitoring area can also be stored. If the detected hazardous situation is consistent with a predetermined hazardous situation, the control device controls the safety device in such a way that it carries out one, two, or more predetermined safety measures. Preferably, a predetermined safety measure is stored in the control device or in other devices of the panel-sizing circular saw for each predetermined hazardous situation. As a result, a programmable algorithm for the determination and execution of suitable safety measures also results as a response to present hazardous situations.

In another preferred further development of the panel-sizing circular saw, it is provided that the control device is designed, in the case of a determined accordance of the detected hazardous situation with a first predetermined hazardous situation, to control the safety device in such a way that it carries out at least one first safety measure, and, in the case of a determined accordance of the detected hazardous situation with a second predetermined hazardous situation, to control the safety device in such a way that it carries out at least one second safety measure.

In accordance with this embodiment, a first safety measure is initially carried out, which can initially represent only a small increase in safety, for example, a reduction in the saw blade speed or an acoustic or optical warning signal. The operator, who, for example, has placed his/her hand on the workpiece at a great distance from the saw blade but in the saw line and has thereby created a slightly hazardous situation, is alerted thereby of the slightly hazardous situation and, at the same time, initial preparation of the machine is performed in order to avoid said situation. As machining continues, meaning, for example, a further approach of the hand to the saw blade, this results in a severe hazardous situation, which is detected, triggers a second safety measure, which represents a greater increase in safety.

In principle, it is preferred that a safety measure that has been triggered can also be cancelled again during the workpiece-machining process if the hazardous situation causing it has been eliminated. For example, a safety measure, in particular, a moderate first safety measure, can cause the operator to change the position of his/her hand to remove it from the saw line, thereby causing the hazardous situation to no longer apply. If this is detected by the detection device, it is favourable if the safety measure is cancelled, meaning the saw blade speed is increased back to normal working speed or the acoustic or optical warning signal is switched off. The operator can then continue to carry out the work process in a normal way.

Furthermore, it is preferred that the first predetermined hazardous situation and/or the second predetermined hazardous situation comprises the presence of an object detected by the detection device in a remote monitoring area, and the first predetermined hazardous situation and/or the second predetermined hazardous situation comprises the presence of an object detected by the detection device in a local monitoring area.

Furthermore, preferably, it is provided that the local monitoring area is arranged in the area surrounding the saw slot and the remote monitoring area encloses the local monitoring area. In addition, it is preferred that a centre point of the local monitoring area and/or remote monitoring area is arranged at the saw slot or in an area adjacent to the saw slot. In addition, it can be favourable that the local monitoring area and/or the remote monitoring area, starting from the respective centre point, has a round, oval, or angular extension surface or extension volume. Furthermore, it is preferred that the extension surface of the local monitoring area has a horizontal and/or vertical extension smaller than 1 m, 0.75 m, 0.5 m, 0.25 m, or 0.1 m. Furthermore, it is preferred that the extension surface of the remote monitoring area has a horizontal and/or vertical extension smaller than 3 m, 2 m, 1.5 m, 1.25 m, 1 m, or 0.5 m. The monitoring areas can preferably also be spherical, cube-shaped, and/or square-shaped.

Furthermore, it is preferred that the detection device is arranged and designed to detect a speed and/or an acceleration of an object, and the first predetermined hazardous situation comprises a speed of an object within a first speed range, in particular, above a first speed limit, and/or an acceleration of an object within a first acceleration range, in particular, above a first acceleration limit, and the second predetermined hazardous situation comprises a speed of an object within a second speed range, in particular, above a second speed limit, and/or an acceleration of an object within a second acceleration range, in particular, above a second acceleration limit, wherein the second speed or acceleration limit is higher than the first speed or acceleration limit.

In another particularly preferred design variant of the panel-sizing circular saw, it is provided that the detection device is arranged and designed to detect a movement direction of an object, and the first predetermined hazardous situation comprises the movement direction of an object in the direction of the circular saw blade within a first angular range around the direct direction towards the circular saw blade, and the second predetermined hazardous situation comprises the movement direction of an object in the direction of the circular saw blade within a second angular range around the direct direction towards the circular saw blade, wherein the second angular range is smaller than the first angular range.

In addition, it is preferred that the safety device initiates a first safety measure if the detection device detects a first hazardous situation in the remote monitoring area, and the safety device initiates a second safety measure when the detection device detects a first or second hazardous situation in the local monitoring area, wherein the second safety measure causes a higher level of safety against injuries than the first safety measure and the first safety measure is designed in such a way that it makes a further machining of the workpiece possible without impairing the cutting result. Another preferred further development of the panel-sizing circular saw is characterized by the fact that the detection device is arranged and designed to distinguish between a human body part and a non-human body, and the first predetermined hazardous situation and the second predetermined hazardous situation comprise the presence of a human body part.

Furthermore, it is preferred that a control element, in particular, a foot-operated control element, for example, a pedal, which is arranged and designed to deactivate the safety device in the case of actuation. By means of such a control element, the safety device can be deliberately deactivated, for example, to perform a risky, however required, cut on a workpiece.

Furthermore, the safety device according to the invention can be further developed by the detection device comprising an electronic comparator that is designed to compare positions, movement directions, and/or movement speeds of a workpiece, of a component of the panel-sizing circular saw or of a body part of the user, detected by means of a detection device, with predetermined work-planning data for carrying out a planned work process or a sequence of work processes on the workpiece, wherein the detection device is designed, in the case of determining a hazardous condition, to take into account an untypical position, movement direction, and/or movement speed of the workpiece, of the component of the panel-sizing circular saw or of the body part determined for this work process or this sequence of work processes, or to signal a hazardous condition in the case of determining an untypical position, movement direction, and/or movement speed of the workpiece, of the component of the panel-sizing circular saw or of the body part determined for this work process or this sequence of work processes.

In accordance with this further development, a plausibility analysis, which is carried out on the basis of pre-planned work steps or even a single work step as a target, is carried out by checking the actually determined positions and/or movements of the workpiece, of the component of the panel-sizing circular saw, or of the body part of the user to ensure that they correspond to the pending work step.

In isolation, this comparison can be used, on the one hand, to achieve a detection of a hazardous condition—therefore, in this case it fulfils the function of the detection device. However, the comparison can also serve to carry out a plausibility analysis in addition to a different detection method of hazardous situations, in order to then be included in the overall assessment as weighting of the hazard level. This makes it possible, for example, in a work process, which, due to the cut or workpiece dimensions, requires an approach of a hand of the operator towards the tool, to not consider this approach to be a hazardous condition, whereas, in the case of a work process which does not require such an approach due to a different cut or workpiece dimension, to assess an identical approach of the operator's hand towards the tool, which is then detected, as a hazardous condition.

In this detection, in particular, a moveable support table for the workpiece, a protective cover, a saw unit, a saw blade, a scoring saw blade, a T-square fence, a stop that is displaceable along a T-square fence or a parallel end-stop and, of course, a plurality of such components can also be included as a component of the panel-sizing circular saw. The position and movement speed of such components can be included in the detection, on the one hand, in such a way that work-planning data of a work process can be determined from it—on the other hand, the position and movement speed of such components can also be matched with predetermined work-planning data and, thus, a plausibility analysis can be carried out before or during the execution of a machining process. For example, in this way, in the case of a detected feed speed of the workpiece, which is detected as being too fast on the basis of predetermined work-planning data, such as the thickness and material type of the workpiece, a hazardous situation can be detected and signalled, and, where appropriate, further actions are triggered and carried out to prevent damage to machine parts, to avoid insufficient work results, and to avoid the risk of injury to the operator.

The predetermined work-planning data for the execution of a planned work operation or a sequence of work operations on the workpiece can be accepted, on the one hand, from electronically supported work-planning software, which is loaded or transferred into the machine tool and is used for controlling cutting parameters or end-stops or a work sequence on a screen at the machine tool. The work-planning data can also alternatively or additionally be derived from electronically detected positions of a stop of the machine tool or a working position or characteristic of the tool. For example, in the case of a saw cut on a workpiece with an end-stop set at a short distance from the saw line, a greater approach of a body part towards the tool can still be assessed as being a non-hazardous condition, as would be the case if the end-stop is set at a greater distance from the saw line.

In accordance with a further aspect of the present invention, the object mentioned at the beginning is achieved by a computer-implemented method for controlling and/or a regulating a panel-sizing circular saw, comprising the steps: detecting a hazardous condition for a human body part by means of a detection device, in particular, a detection device in accordance with at least one of the design variants previously described, initiation of a safety measure by means of a safety device, in particular, a safety device in accordance with at least one of the design variants described, wherein the safety measure is selected from the group consisting of an acoustic and/or optical warning signal, reduction of the speed of a circular saw blade, the output of at least one mitigation element from a storage unit in the direction of the circular saw blade, in particular, by means of an output device in accordance with at least one of the design variants previously described, arranging a shielding element in a shielding position, in particular, a shielding element in accordance with at least one of the design variants previously described, lowering of the circular saw blade below a workpiece support surface, wherein the safety measure is selected depending on a detection of the human body part in a remote monitoring area and/or local monitoring area, and/or a speed of the human body part, an acceleration of the human body part, or a movement direction of the human body part.

On the one hand, this method, like the panel-sizing circular saw and the safety device described above, allows for positions, movement directions, and movement speeds or accelerations of a body part triggering a hazard to be detected directly and used as a trigger criterion for a safety-enhancing action. Furthermore, atypical movement forms or positions of a body part can also be detected for a predetermined work process and can be used as a trigger criterion for a safety-enhancing action.

The method according to the invention and its possible further developments comprise features or method steps which make them particularly suitable for being used for a panel-sizing circular saw according to the invention and its further developments. For further advantages, design variants, and design details of the further aspect and of the possible further developments, reference is also made to the previous description concerning the corresponding features and further developments of the panel-sizing circular saw.

The panel-sizing circular saw previously described can also comprise a safety device explained in more detail below. The safety device can be combined in combination with one or a plurality of the features described previously.

Particularly preferred design variants of the panel-sizing circular saw and of the method include the following in particular: Panel-sizing circular saw, in particular for the machining of wood and/or plastic materials, comprising a workpiece support surface with a saw slot, a saw unit with a circular saw blade comprising a multitude of saw teeth for machining workpieces, wherein the circular saw blade is swivel-mounted on the saw unit below the workpiece support surface and protrudes through the saw slot in a saw operation mode, a detection device for detecting at least one hazardous condition for a human body part by the saw blade, a safety device for the avoidance of injuries to a human body part by the circular saw blade by means of a safety measure, and a control device which is coupled with the detection device and the safety device on a signal-engineering level, wherein the control device is arranged and designed, as a result of a detection of the at least one hazardous condition by means of the detection device, to initiate a safety measure by means of the safety device.

Panel-sizing circular saw in accordance with the preceding design variant, wherein the safety device is arranged and designed to carry out a safety measure, wherein the safety measure is selected from two or more available safety measures, wherein, preferably, the control device is designed to initiate the safety measure in a situation-dependent and/or time-delayed manner.

Panel-sizing circular saw in accordance with any one of the preceding design variants, wherein the safety device comprises a storage unit for a mitigation element and an output device for outputting the mitigation element, wherein the output device is arranged and designed in such a way as to output the mitigation element from the storage unit in the direction of the circular saw blade as a safety measure.

Panel-sizing circular saw in accordance with any one of the preceding design variants, wherein the output device is arranged and designed to output the mitigation element in a workpiece-related feed direction in front of and/or behind the circular saw blade, and/or the output device is arranged and designed to output the mitigation element within an area below the workpiece support surface, and/or the output device is at least partially encompassed by the splitting wedge, and the mitigation element is preferably output at the splitting wedge.

Panel-sizing circular saw in accordance with any one of the preceding design variants, wherein the mitigation element is a solid and/or hardening and/or flowable material, preferably a hardening and/or viscoelastic plastic, in particular is designed as a plastic cord or a variety of particles, and the output device is arranged and designed to output the mitigation element in such a way that the saw teeth of the circular saw blade are enveloped by the mitigation element.

Panel-sizing circular saw in accordance with any one of the preceding design variants, comprising a protective cover with a protective cover housing, which encloses a protective cover interior and partially accommodates the circular saw blade in the protective cover interior in the saw operating mode, wherein the output device is arranged on the protective cover and designed in such a way as to apply the mitigation element within the protective cover interior onto the circular saw blade.

Panel-sizing circular saw in accordance with any one of the preceding design variants, comprising a shielding element, wherein the shielding element is arranged and designed to shield the saw teeth in the radial direction with respect to the axis of rotation of the circular saw blade at least in sections in a shielding position in the area above the workpiece support surface, wherein, preferably, in the shielding position in the area above the workpiece support surface between an inner circumference of the shielding element and the outer diameter of the circular saw blade in the radial direction of the circular saw blade, there is a distance of less than 2 mm, 5 mm, 10 mm, 15 mm, 20 mm, or 50 mm, the shielding element encloses the saw teeth in the radial direction and/or in the axially lateral direction in relation to the axis of rotation of the circular saw blade, the shielding element in a saw operation mode position is arranged substantially below the workpiece support surface, the shielding element in the saw operating mode position comprises a splitting wedge arranged in a workpiece-related feed direction behind the circular saw blade, the shielding element is arranged and designed in such a way that this is moveable in the essentially tangential direction of the circular saw blade, wherein an axis of rotation of this movement is preferably orientated in parallel, in particular, coaxially, to the axis of rotation of the circular saw blade, and/or the shielding element comprises a first section and a second section, wherein the second section is movably, in particular pivotably, arranged on the first section, wherein the second section can preferably be moved, in particular pivoted, around a horizontal axis, which, in particular, runs in parallel to the rotational axis of the saw blade.

Panel-sizing circular saw in accordance with any one of the preceding design variants, wherein the detection device is designed as, or comprises, an image detection device and preferably comprises at least one capacitive sensor and/or at least one infrared sensor, and/or comprising an image evaluation unit, wherein the image evaluation unit is preferably encompassed by the detection device. Preferably, the detection device designed as an image detection device is designed as, or comprises, a video camera and/or a thermal imaging camera, wherein the video camera and/or the thermal imaging camera is/are preferably designed as high-resolution camera(s), and, furthermore preferably, the detection device designed as an image detection device is designed to capture one, two or more images at the same time, and the image evaluation unit is designed to generate and provide stereoscopic images.

Panel-sizing circular saw in accordance with any one of the preceding design variants, wherein the control device is arranged and designed to evaluate a characteristic of an object detected by the detection device in a monitoring area, in particular a remote monitoring area and a local monitoring area, and the control device is designed in such a way as to identify a hazardous situation assigned to the detected object on the basis of the characteristic and to compare the identified hazardous situation with predetermined hazardous situations, wherein the predetermined hazardous situations are stored in a catalogue, preferably in terms of data technology, and, in the event of an established accordance of the detected hazardous situation with a predetermined hazardous situation, to control the safety device in such a way that it carries out one, two or more predetermined safety measures.

Panel-sizing circular saw in accordance with any one of the preceding design variants, wherein the control device is designed, in the event of an established accordance of the detected hazardous situation with a first predetermined hazardous situation, to control the safety device in such a way that it carries out at least one first safety measure, and, in the event of an established accordance of the detected hazardous situation with a second predetermined hazardous situation, to control the safety device in such a way that it carries out at least one second safety measure.

Panel-sizing circular saw in accordance with any one of the preceding design variants, wherein the first predetermined hazardous situation and/or the second predetermined hazardous situation comprises the presence of an object detected by the detection device in a remote monitoring area, and the first predetermined hazardous situation and/or the second predetermined hazardous situation comprises the presence of an object detected by the detection device in a local monitoring area.

Panel-sizing circular saw in accordance with any one of the preceding design variants, wherein the detection device is arranged and designed to detect a speed and/or an acceleration of an object, and the first predetermined hazardous situation comprises a speed of an object in a first speed range, in particular above a first speed limit, and/or an acceleration of an object in a first acceleration range, in particular above a first acceleration limit, and the second predetermined hazardous situation comprises a speed of an object in a second speed range, in particular above a second speed limit, and/or an acceleration of an object in a second acceleration range, in particular above a second acceleration limit, wherein the second speed or acceleration limit is higher than the first speed or acceleration limit.

Panel-sizing circular saw in accordance with any one of the preceding design variants, wherein the detection device is arranged and designed to detect a movement direction of an object, and the first predetermined hazardous situation comprises the movement direction of an object in the direction of the circular saw blade in a first angular range around the direct direction to the circular saw blade, and the second predetermined hazardous situation comprises the movement direction of an object in the direction of the circular saw blade in a second angular range around the direct direction towards the circular saw blade, wherein the second angular range is smaller than the first angular range.

Panel-sizing circular saw in accordance with any one of the preceding design variants, wherein the safety device initiates a first safety measure if the detection device detects a first hazardous situation in the remote monitoring area, and the safety device initiates a second safety measure if the detection device detects a first or second hazardous situation in the local monitoring area, wherein the second safety measure results in a higher level of safety against injury than the first safety measure and the first safety measure is designed in such a way that it allows further machining of the workpiece without impairing the cutting result.

Panel-sizing circular saw in accordance with any one of the preceding design variants, comprising a control element, in particular a foot-operated control element, for example a pedal, which is arranged and designed to deactivate the safety device when actuated.

Panel-sizing circular saw in accordance with any one of the preceding design variants, characterized in that the detection device comprises an electronic comparator, which is designed to compare positions, movement directions and/or movement speeds of a workpiece, of a component of the panel-sizing circular saw or of a body part of the user, detected by means of a detection device with predetermined work-planning data for carrying out a planned work operation or a sequence of work operations on the workpiece, wherein the detection device is designed, when determining a hazardous condition, to take into account an atypical position, movement direction and/or movement speed of the workpiece, of the component of the panel-sizing circular saw or of the body part determined for this work operation or sequence of work operations, or, in the case of determining an atypical position, movement direction and/or movement speed of the workpiece, of the component of the panel-sizing circular saw or of the body part determined for this work operation or this sequence of work operations, to signal a hazardous condition.

Computer-implemented method for controlling and/or regulating a panel-sizing circular saw, comprising the steps of detection of a hazardous condition for a human body part by means of a detection device, in particular a detection device in accordance with one of the preceding design variants, initiation of a safety measure by means of a safety device, in particular, a safety device in accordance with one of the preceding design variants, wherein the safety measure is selected from the group consisting of an acoustic and/or optical warning signal, a reduction of the speed of a circular saw blade, output of at least one mitigation element from a storage unit in the direction of the circular saw blade, in particular by means of an output device in accordance with one of the preceding design variants, arranging a shielding element in a shielding position, in particular a shielding element in accordance with one of the preceding design variants, lowering of the circular saw blade below a workpiece support surface, wherein the safety measure is selected depending on a detection of the human body part in a remote monitoring area and/or local monitoring area, and/or a speed of the human body part, and/or an acceleration of the human body part, and/or a movement direction of the human body part.

The invention also relates to a safety device for machine tools with a machining tool, which is used for machining a workpiece fed to the machine tool, comprising a detection device which is designed to detect a hazardous situation of an operator of the machine tool, a hazard reduction device that is connected on a signal-engineering level to the detection device and is designed to carry out a measure for reducing the hazardous situation upon obtaining a hazard signal from the detection device, which signals a hazardous situation of the operator.

In principle, machine tools with a machining tool pose a hazard for the operator. Depending on the type of machine tool, this hazard can vary. For example, in the case of machine tools with largely automated operation (NC or CNC machine tools), the hazard can occur particularly when setting up a machining process. In the case of machine tools that have a lower degree of automation, however, the hazard for the user can occur during the actual machining process, for example, because the person performing the machining process has to manually guide the workpiece or operate the machining tool, or has to perform a machine-assisted manual guidance or operation.

A typical example of machine tools that can cause such a hazardous situation for the operator are circular saws such as panel-sizing circular saws. In such panel-sizing circular saws, the workpiece is guided by the operator during the cutting process, so that if operated improperly, the operator's hands can get into the area of the circular saw blade and thus injuries can arise.

Various approaches are known in the prior art with the aim of avoiding or at least reducing such a hazard. From EP 1 273 097 B1, a braking device is already known, which serves to slow down a circular saw blade within a very short time and thus to avoid a hazard for the operator. In the sense of the present invention, this braking device represents a hazard reduction device, which causes a braking or a complete stop of the movement of the machine tool and should thereby avoid the risk of injury. The problem with this type of safety device is the risk of damage to the machining tool or of associated components by the braking process, as such damage possibly makes the replacement of the machine tool necessary, thereby causing significant follow-up costs. For such a type of a hazard reduction device, therefore, a particularly precise detection device is to be assigned in order to avoid that false triggering operations of the hazard reduction device take place. It can be expected that safety devices that cause multiple costly false triggering operations will find no acceptance on the part of the user. However, in connection therewith, the problem arises that a hazardous situation can occur in very different ways and a safe, error-free detection of a hazardous situation in contrast to a non-hazardous situation in the prior art is not guaranteed so false triggering operations can occur.

From DE 20 2010 004458, a protective cover is already known, which can perform a hand detection by means of different sensors. This prior art represents a detection device, which is intended to detect the hand of a user in order to thereby determine approaches of the hand towards the machining tool leading to a hazardous situation. The problem with this type of detection device is the necessary arrangement on the protective cover, which represents a moveable and also moving component of a panel-sizing circular saw within the scope of machining and, due to this, the accuracy of the determination of the hazardous situation is adversely affected. Due to the necessary tolerances to be planned for in the determination of the hazardous situation, hand positions of the user, which do not yet constitute a hazardous situation but lie within the range of a hazardous situation due to the tolerances at hand, must also be used as a trigger criterion for the hazard reduction device. From the user's point of view, this also leads to false triggering operations and therefore makes the system less attractive for efficient and economical work with the machine tool.

From DE 20 2009 007 060, DE 20 2011 101 666, DE 20 2017 103 019 and DE 20 2009 009 757, further safety devices for panel-sizing circular saws are known, which comprise advantages in the field of detecting a hazardous situation and recognizing the measure for reducing the hazardous situation, but also cause impairments for economic and efficient workpiece machining using the machine tool for the sake of the safety to be provided.

The object of the invention is to provide a safety device that allows the user to achieve a significant reduction in the risk of injury while working on the machine tool while maintaining the economical and efficient machining of the workpiece with the machine tool.

According to the invention, this object is achieved by means of a safety device of the type described at the beginning, in which a signalling unit carried by the user and a signal receiving device arranged on the machine tool, which is designed to detect a position component of the signalling unit, and an electronic signal processing device, which is connected on a signal-engineering level to the signal receiving device and is designed to detect, from a signal which is transmitted from the signal receiving device and describes the position component of the signalling unit, whether a hazardous situation, in particular, falling below a predetermined minimum distance between a body part of the user and the machining tool, exists and, if it is determined that such a hazardous situation exists, to send the hazard signal to the hazard reduction device.

The safety device according to the invention, in principle, initially comprises a detection device and a hazard reduction device. The detection device is used to detect a hazardous situation. Such a hazardous situation is, in principle, according to the invention, that a body part of an operator enters a position in which it can be injured by the machine tool, typically by the machining tool of the machine tool. For example, such an injury can occur due to a drill of a drill machine, a cutter of a milling machine, or a saw blade of a sawing machine, but also by the rotating chuck of a lathe, in which the machining tool does not carry out any cutting movement. The hazardous situation, which is detected by the detection device, must take the form of a prognosis, meaning a prediction of an injury occurring, i.e., at a point in time at which no injury has yet occurred but a future injury occurs with such a high probability that a measure must be taken by the safety device in order to prevent it from taking place. In principle, the aim is that the detection device detects the hazardous situation with a high prognosis probability, as well as very early, meaning with as great a time interval as possible from the predicted injury, in order to give the hazard reduction device as much time as possible to carry out an appropriate measure to reduce or avoid the hazard. The detection device can use different signals, which it recognizes or determines by processing. On the one hand, the detection device can detect the distance between the endangered body part and the component of the machine tool triggering the hazard, in particular the machining tool, and, if a minimum distance is fallen below, determine that a hazardous situation exists. Alternatively, but in particular complementary to this, the speed of the body part, if necessary in combination with a movement speed of the hazard-triggering component of the machine tool or as a relative speed, can also be used as a criterion to identify a hazardous situation as early as possible. For example, at an uncharacteristically high movement speed of the body part or an uncharacteristically high relative approach speed between the body part and the machine tool component, which is above a maximum speed, it can be determined that a hazardous situation exists. In particular, a hazardous situation can be determined from a combination of the distance and the relative speed between a body part and a component of the machining tool. Furthermore, in addition or as an alternative, an acceleration of the body part or a relative acceleration between the body part and the machine tool component, which triggers the hazard, can also be used to determine whether a hazardous situation exists. High accelerations above an acceleration limit value can therefore serve as an assessment criterion, in particular in connection with a distance and/or a speed, as to whether a hazardous situation exists.

The detection device is coupled with a hazard reduction device on a signal-engineering level. If it is determined that a hazardous situation exists, a signal is sent to the hazard reduction device. The hazard reduction device is designed to carry out a measure to reduce the hazardous condition. In principle, this measure can greatly vary. For example, the movement of the machine tool component, in particular the machining tool, can be braked or stopped. The component can be moved in such a way that the hazardous situation is avoided, meaning moved away from the critical area to the body part. A shielding can be carried out, which shields the body part from the machine tool component or actively pushes the body part away. Furthermore, the risk of injury can be reduced by deactivating the machining tool. These measures can be carried out individually or in combination with one another.

In principle, it is to be understood that the safety device can be configured in such a way that the detection device is designed to send exactly one hazard signal to the hazard reduction device, with which then exactly one measure or combination of measures to reduce or avoid the hazardous situation is carried out by the hazard reduction device. Likewise, the detection device can alternatively be designed to send two or more different hazard signals to the hazard reduction device, which characterize a different severity of the hazardous situation and the hazard reduction device can be designed to carry out correspondingly different measures or combinations of measures to reduce the hazardous condition according to these hazard severity levels designated by the hazard signals. For example, in a first step, the hazard reduction device can merely output a warning signal to the user, if a further hazard signal is received, the speed of the machining tool can be reduced, and if another hazard signal is received that identifies the hazardous situation as having an even higher degree of severity, the machining tool can be stopped completely.

The detection device comprises in principle a plurality of components, namely at least one signalling unit, at least one signal receiving device and at least one signal processing device. The signalling unit is carried by the user, thus is designed in such a way that a user can carry it with him/her, in particular can attach it to a body part. This allows the user or body part to be recognizable for the signal receiving device and be spatially detected with high precision with regard to its position. Depending on the required resolution for the corresponding machine tool, a signalling unit can therefore be used, which can be carried, for example, on the torso of the operator, on the arm of the operator, on the wrist of the operator or on one or individual fingers of the operator, in order to achieve a corresponding resolution and differentiated position detection of the body part.

The signal receiving device is designed to locate the signalling units, meaning to detect at least one position component of the signalling unit. It is to be understood that this position component represents a relative indication of the position of the signalling unit with respect to the signal receiving device in at least one direction. In principle, the signal receiving device can also preferably be designed so that it determines the relative position of the signalling unit to the signal receiving device or to a virtual reference point in a three-dimensional manner, for example in an XYZ coordinate system or a polar coordinate system or other suitable coordinate systems. The position component or position determined in this way are transmitted by the signal receiving device to the signal processing device.

The signal processing device is designed to determine from this position component or position whether a hazardous situation exists. For this purpose, the signal processing device can be designed or programmed in various ways. Thus, in a simple processing mode, the distance calculated from the position component or position between the signalling unit and a component triggering the hazard such as the machining tool, can be determined and compared with a minimum distance, so that, if the calculated distance falls below this minimum distance, a hazardous situation is concluded. However, the signal processing device can also be designed in such a way that it determines a progression of the position components or positions from successive position components or positions received from the signal receiving device, determines therefrom a movement direction, if necessary also a movement speed and further if also a motion acceleration of the signalling unit and includes these in the determination as to whether a hazardous situation exists. The signal processing device can also be designed to take into account geometric dependencies between the signalling unit and the body geometry. This can be done in a simple manner in such a way that in the signal processing device, for a particular signalling unit, which is assigned to a specific location on the user's body by means of, for example, a transmitted encoding, a geometric characteristic value, which describes the contour of the body parts that extend from this carrier location of the signalling unit on the body, is assigned. For example, a wrist-worn signalling unit with a geometric range characteristic, which defines the length from the wrist to the fingertips, can be processed by the signal processing device, so that, starting from the position of the signalling unit, a hazardous situation is also detected if the signalling unit is at such a distance from the component of the machine tool which triggers the hazard that the minimum distance is undershot when the distance of the signalling unit from the tip of the fingertip is subtracted. Furthermore, the signal processing device can be designed to process the position component taking into account stored biomechanical motion patterns and thereby determine whether a hazardous situation exists. Thus, typical movement patterns defined by joints and body part dimensions can always be taken into account when determining the hazardous situation, which leads to a more precise determination of a hazardous situation, since starting from a certain position of the signalling unit on the body part only realistically occurring movement forms are taken into account.

Basically, the signal processing device can be designed to store position and/or movement data of components of the machine tool, to retrieve it for the distance calculation, or to receive such data via an interface and process it accordingly, preferably in real time.

With the safety device according to the invention, it is thus possible to use a signalling unit, which is carried by the user, with the help of the signal receiving device, which determines a position component or a plurality of position components, which characterizes a relative position of the signalling unit to the signal receiving device, to capture the spatial position of the signalling unit and to determine the exact position of a body part. The invention is based on the fact that a distinctive and precise detection of the position of the signalling unit can be realized by the signal receiving device, which is superior to the detection devices known in the prior art, which aim for a direct detection of the body part. The targeted signal processing of the relative position of the signalling unit to the signal receiving device enables real-time data processing, so that hazardous situations can be detected in real time and appropriate measures for risk reduction or risk avoidance can be carried out in good time.

Alternatively or in addition to the signalling unit carried by the user, a body part of the user can also be detected by the detection device or an image evaluation unit and image capturing device, described in greater detail below, and processed accordingly in the electronic signal processing device. In this case, the body part, for example a hand of the user, can be detected by means of an image evaluation and a comparison with anatomical geometries which takes place in the process, and be differentiated with relation to the environment, without the user having to wear a signalling unit for this purpose.

The safety device explained in greater detail below with a detection device comprising an image capturing device and an image evaluation unit can be combined with the safety device mentioned above. In particular, it is preferred that the two safety devices are used as redundant systems. The safety device mentioned above can also comprise features of the safety device explained in more detail below and vice versa.

In accordance with a first preferred embodiment, it is provided that the signalling unit is an actively transmitting unit, which is designed to send a presence signal to the signal receiving device in a wireless and contactless manner.

By an actively transmitting signalling unit is to be understood a preferably electronic unit, which sends a signal data set to the signal receiving device. For example, this signal dataset can contain an identifier that makes the signalling unit individually and uniquely identifiable. The signal dataset can also contain a position component that describes, for example, a relative position with respect to a specific spatial axis, such as an alignment or angular position. This can be done, for example, by the signalling unit detecting an alignment with respect to field lines generated by the signal receiving device and sending this to the signal receiving device. Similarly, an alignment with respect to gravity could be included in the signal data set or with respect to an acceleration of the signalling unit. From the transmission signal thus sent in the form of the signal dataset, the signal receiving device can then derive the position component and pass it on to the signal processing device so that it is processed there accordingly.

It is even furthermore preferred that the signalling unit comprises an energy source, a receiving unit, a transmitting unit, and a control unit connected to the receiving unit and the transmitting unit, which is designed to receive and process a request signal received by the receiving unit, in response to such a request signal to control the transmitting unit in order to send out a response signal, which contains an alignment or position indication as part of the signal describing the position component of the signalling unit.

In accordance with this further development, the signalling unit is further developed to become a logical unit with its own energy source, which is able to respond to a request signal, which is sent out by the signal receiving device and received by the receiving unit in the signalling unit, by sending out a response signal, which in turn contains a presence signal containing alignment and/or position information. The presence signal can also additionally or only contain an identification signal, which includes an individual or characteristic-related encoding, with which the respective signalling unit is identifiable and, for example, can be associated with a specific user or a specific anatomical position by the signal receiving device or the signal processing device. This embodiment allows a tracking of the position of the signalling unit with a sampling frequency, which is determined by the frequency of the sequence of request signals and can thus be processed signal-technically in the signal processing device.

It is even furthermore preferred that the signalling unit comprises one, two, or three position sensors and the control unit is designed to control the transmitting unit in response to a request signal to send a response signal, which contains alignment information of the signalling unit with respect to correspondingly one, two, or three spatial axes as part of the signal describing the position component of the signalling unit.

In accordance with this form of further development, one or a plurality of position sensors are contained in the receiving unit, in particular, two position sensors can be used here that detect a position in relation to two axes that are perpendicular to each other, or three position sensors can be used, which detect a position in relation to three axes that are in each case perpendicular to each other. The position sensors can work in different reference fields. For example, the position sensors can respond to a reference field of field lines generated by the signal receiving device, for example, an electromagnetic field or the position sensors can react to gravity and detect a position with respect to gravity. This further development makes it possible to determine the position of the signalling unit in relation to a spatial axis, two or three spatial axes, so that, in particular, when using three position sensors with appropriate detection of the orientation of the signalling unit in relation to three spatial axes, which are preferably each perpendicular to each other, the exact alignment of the signalling unit is detected and sent to the signal receiving device.

It is even furthermore preferred that the signalling unit comprises one, two, or three distance sensors and the control unit is designed to control the transmitting unit in response to a request signal to send a response signal, which contains a correspondingly one-, two-, or three-dimensional distance indication of the signalling unit with respect to a corresponding reference system as part of the signal describing the position component of the signalling unit.

In accordance with this form of further development, the signalling unit comprises one or a plurality of distance sensors, which can detect a distance of the signalling unit from a reference point in relation to a corresponding reference system, so that this distance signal can be sent to the signal receiving device. The distance sensors can be designed to detect a distance to the reference point along a spatial axis, along two spatial axes perpendicular to each other, or along three respective perpendicular spatial axes or a direct absolute distance, for example, by determining a strength of an electromagnetic field and determining the distance based on the strength. The distance determination by means of such distance sensors can be used alone or for a position determination by means of position sensors to achieve a precise determination of the position of the signalling unit. It is to be understood that, in particular, a field defined by the signal receiving device can always be used as a reference field and, for example, a point in the signal receiving device can be used as a reference point, which may also be the technically related centre point of an electromagnetic field.

In accordance with an embodiment that is alternative to this, it is provided that the signalling unit is a passively operating unit, which is designed to be detected wirelessly and contactlessly by the signal receiving device. A passively operating unit is to be understood as a signalling unit which can be detected by the signal receiving device in relation to its location and/or position, but, in turn, does not actively transmit location or position data to the signal receiving device. The advantage of such a passive signalling unit is that it can usually be built more compactly and can do without its own energy supply.

In accordance with another preferred embodiment, it is provided that the signalling device comprises an acceleration sensor and is designed to send an acceleration of the signalling device in one, two, or three spatial directions as an integral component of the signal describing the position component of the signalling unit to the signal receiving unit. In accordance with this embodiment, an acceleration sensor is integrated into the signalling device so that the signalling unit can immediately detect an acceleration, wherein this acceleration can be detected along one, two, or three spatial axes, which are preferably perpendicular to each other respectively. This makes it possible to send acceleration data of the signalling unit directly to the signal receiving device and thereby further increase the measurement accuracy.

It is even furthermore preferred that the electronic signal processing device is designed to determine that the hazardous situation exists when the body part in a current position of the body part calculated from the position component is spaced away at a distance that is less than a minimum distance from the machining tool, or the body part in a current position of the body part calculated from the position component is spaced away over the or at the minimum distance from the machining tool and, as a result of a current movement of the body part calculated from the change of at least two temporally consecutive position components within a predetermined period of time, is moved into a position that is spaced away at a distance that is less than the minimum distance from the machining tool.

In accordance with this embodiment, in a first variant, the hazardous situation is determined on the basis of a minimum distance of the body part from the machining tool being fallen below, wherein this minimum distance can be a distance in a certain spatial axis, different minimum distances along two or three different spatial axes or an absolute distance from a point or an encasing surface of the machining tool. In particular, the distance can be calculated by the signal processing device as the minimum distance from the surface of the machine tool. The signal processing unit calculates the distance from position data of the machining tool stored by it or transmitted to it. In the simplest approach, the position of the signalling unit can be taken as a basis as the position of the body part, but also the possible positions of body parts arranged adjacent to the signalling unit carried by the user can be included in the calculation of the hazardous condition on the basis of body-related data stored in the signal processing unit.

In accordance with a second variant, in addition to the position, a movement of the body part or the signalling unit is also taken into consideration. This movement is included as a speed in determining whether a hazardous situation exists. In the simplest approach, the speed of the signalling unit itself can be used as a basis; in a variant for more precise determination, the movement speed of two signalling units, which are worn spaced apart on the body of one and the same user, can also be included in the calculation to attain a more precise movement of a body part or, if necessary with a cross-joint distance of the two signalling devices, taking an angular acceleration into account. Furthermore, anatomical and geometric data can also be included in determining the speed of the body part in order to be able to calculate a speed of a body part from a speed and position change determined for the signalling unit.

It is even furthermore preferred that the signal receiving device is designed to detect a distance between the signalling unit and the signal receiving device in a wireless and contactless manner. A wireless and contactless distance measurement determines a parameter, that can be processed quickly in real time, which can characterize a hazardous situation and can be used as a basis for determining whether such a hazardous situation exists.

It is even furthermore preferred that the signal receiving device is designed to detect a direction or direction component extending from the signalling unit to the signal receiving device in a wireless and contactless manner. In accordance with this form of further development, a direction is determined in which the signalling unit is located starting from a reference point, in particular, a reference point represented by the signal receiving device. This direction represents an alternative or complementary item of information as to whether a hazardous situation exists. In particular, in addition to the absolutely determined direction, a movement of the signalling unit can also be concluded by means of a determination due to a change of direction, and from this a hazardous situation can be determined.

It is even furthermore preferred that the signal processing device is designed to determine a distance between the signalling unit and the signal receiving device and/or a direction extending from the signal receiving device to the signalling unit and to determine whether a hazardous situation exists, taking into account this distance and/or this direction. In accordance with this form of further development, it is determined by means of the signal processing device whether a hazardous situation exists based on a determined distance and/or a determined direction between the signalling unit and the signal receiving device. This determination can be carried out in a snapshot based on a distance or direction, or on the basis of the analysis of two or more consecutive distances or directions, to conclude a movement form of the signalling unit in relation to the signal receiving device from this and to take this movement form into account when determining the hazardous situation.

It is even furthermore preferred if the signal processing device is further designed to process a predetermined geometric constellation between the body part of the user and the signalling unit carried by the user and, under consideration of this geometric constellation, to determine whether a hazardous situation exists. This further consideration of a biomechanical constellation, i.e., an anatomical relationship between the location where the signalling unit is carried by the user and an endangered body part or a biomechanical parameter, which describes movement possibilities of a body part by joints that lie between the signalling unit and the body part, can be used for a more precise determination as to whether a hazardous situation exists for a certain body part. For this purpose, corresponding geometric constellations between the body part and the place where the user carries the signalling unit are stored in the signalling unit or stored in the signal processing unit and transmitted and can, therefore, be included and taken into account when determining whether a hazardous situation exists. It is particularly preferred if the signalling unit sends an identification code to the signal receiving device, which allows an individual detection of the signalling unit and from this allows the signal processing unit to determine the location where the signalling unit is carried, for example, by the identification code containing a direct statement about this location or by the identification code being able to be assigned to a carrier location on the user using a table.

It is even furthermore preferred if the signalling unit is arranged on a clothing accessory, in particular, on a glove, on a strap worn around the arm, such as an arm ring, a bracelet or a watch strap, on a finger ring, or in an implant. In accordance with this embodiment, various preferred carrier forms for the signalling unit or for a plurality of signalling units are used according to the invention. For example, a work glove typically worn by the user can be equipped with one or a plurality of signalling units, for example, signalling units can be placed in the area of the wrist, the knuckles, the fingertips, or the like in order to be able to determine exactly one position for the user's hand, which is particularly vulnerable to injury, and be able to protect it from hazards. The glove can be constructed in such a way that it has sensory elements, which are necessary for the position determination of the signalling unit in a locally resolved manner, in the area of the wrists, finger joints, and/or fingertips. For the position determination of the signalling unit, non-location-critical components such as an energy source, a transmitting unit or a receiving unit can be arranged at another point of the glove, for example, in the area of the wrist, and can be connected to the sensory-relevant components of the signalling unit for signalling and energy transmission. In this way, the glove can be constructed in such a way that it does not or hardly obstructs the activity of the user and the equipping of the glove with the signalling unit is not haptically observed to the user. In addition to the glove, a band worn around the arm or a finger ring can also be put on by the user, or other personal equipment, such as glasses or headgear, can be used that contain an appropriate signalling unit to perform a location determination.

In an embodiment that is alternative or complementary to this, the signalling unit can also be designed as a small implant that is inserted under the user's skin, thereby making a continuous detection of the position of the body part possible, which detection is not disturbing on a haptic level due to the correspondingly small size of the signalling unit.

It is furthermore preferred if the signalling unit stores data information that comprises a safety criterion and the signal receiving device is designed to receive this data information from the signalling unit and to determine whether a hazardous situation exists depending on the safety criterion. In accordance with this form of further development, the signalling unit stores a safety criterion which contains an indication of the level of safety to be observed in relation to this signalling unit. This safety criterion is sent from the signalling unit to the signal receiving device and can, therefore, be processed by the signal processing device to determine whether a hazardous situation exists, taking into account this safety criterion. The safety criterion can describe, for example, whether the signalling unit is carried on a body part that can potentially be moved very quickly, for example, a finger or a hand, or rather less quickly, for example, a torso, to determine a hazardous situation with correspondingly different criteria depending on this potential movement speed. The safety criterion can also be chosen depending on the user, for example, the safety criterion can characterize the user in terms of his/her level of education and, for users with a lower level of training, a different criterion for determining a hazardous situation than is the case for users with a higher level of education can apply. For example, trainees or unskilled workers working with the machine tool can cause an earlier detection of a hazardous condition, for example, if a larger minimum distance is fallen short of, than experienced or trained professionals for whom a smaller minimum distance from the safety device is set as a basis.

It is even furthermore preferred if the signalling unit stores data information that comprises a safety criterion and the signal receiving device is designed to receive this data information from the signalling unit and send it to the signal processing device, and that the signal processing device is designed to determine a predetermined minimum distance between the machining tool and the body part of the user and/or a predetermined maximum movement speed of the signalling unit depending on the safety criterion, to determine a current distance between the machining tool and the body part of the user from a position component and/or to determine a current movement speed of the signalling unit from two time-sequential position components and to determine that a hazardous situation exists if the current distance falls below the minimum distance and/or the current speed exceeds the maximum movement speed. In accordance with this embodiment, depending on the distance and the movement speed, in particular, a movement speed component in the direction of the machining tool, it is determined whether a hazardous situation exists and, in this case, a safety criterion is taken into consideration that characterizes the previously described characteristics in relation to a position on a particular part of the body or in relation to the wearing by a particular user.

It is even furthermore preferred if the signal processing device is designed in order to determine a movement speed and/or an acceleration of the body part, and in order to determine if a hazardous situation exists depending on the movement speed and/or the acceleration of the body part. In accordance with this form of further development, a speed or acceleration of the body part is determined by the signal processing device and, depending on this speed and/or acceleration, it is determined whether a hazardous situation exists. In a simple approach, such as speed or acceleration of the body part, the speed or acceleration of the signalling unit can be used as a basis. However, in a better approach, from the data from two signalling units, which are carried on a user, position changes, angular accelerations, or speeds of body parts can be calculated taking into account anatomical data in order to detect a hazardous situation in a precise manner, even for such body parts on which a signalling unit is not directly worn, for example, in order to determine a prognosis for a position of the user's fingertips from the position and speed, which are worn on the knuckle.

In accordance with another preferred embodiment, it is provided that the signal processing device is designed to receive a machining parameter that characterizes an operating parameter of the machine tool, and, depending on the machining parameter, to determine whether a hazardous situation exists. In accordance with this embodiment, a machining parameter is additionally taken into account when determining whether a hazardous situation exists. This machining parameter characterizes an operating parameter and can, therefore, also be incorporated directly into the determination as an operating parameter. An operating parameter is to be understood here as a parameter that describes a setting of the machine tool or a machining progress on the machine tool. Typical such operating parameters are, for example, a cutting speed, an angular adjustment with which a machining process is carried out, for example, a pivoting of a saw blade, a feed speed or a feed position of a slide, which carries the workpiece or tool, or a machining specification that describes a sequence of machining steps. Operating parameters can have a direct influence on a hazardous situation, for example, an operating parameter can affect the hazardous area of a machining tool, because, for example, pivoting a circular saw blade results in a different hazardous area than in the case of a non-pivoted circular saw blade. Operating parameters can be processed as an indication of the operator's movements, which are typical and characteristic for a particular machining method with the help of the operating parameter, and, therefore, enable a more precise detection adapted to the respective machining process as to whether a hazardous situation exists or not. For example, for certain operating parameters, the positioning of the hand can typically be chosen differently by the operator than with other operating parameters and, by taking into account the operating parameter, the hazardous situation can be detected as a result in a more realistic way.

It is even more preferred if the signal processing device is designed to perform a plausibility analysis on the basis of the machining parameter by determining a position, a movement direction and/or a movement speed of the signalling unit one or a plurality of position components, to compare the position, movement direction, and/or movement speed with a plausible position, movement direction, or movement speed assigned to the machining parameter position, and to determine a deviation between the determined position, movement direction, and/or movement speed and the assigned, plausible position, movement direction, or movement speed and to determine whether a hazardous situation exists depending on this deviation.

In accordance with this further development, the operating parameter and the position component(s) are used to check whether a typical operating situation is taking place by the user by detecting the position of one or a plurality of body parts of the operating parameter based on the position component for a certain machining method that is specified by the operating parameter or is usual for the operating parameter and comparing it with typical positions. This can be done by means of corresponding comparison tables or algorithms stored in the signal processing device. This checks whether a plausible position, movement direction, or movement speed of the body part is carried out, which is suitable for the respective machining parameter, in order to carry out a realistic detection, which is well adapted to the respective machining situation, as to whether a hazardous situation exists. Such a plausibility analysis is also understood to involve comparing components guided for example by the user, which he/she for example moves by hand and for which a position specification is available as an operating parameter and can be used for comparison, with the user's guide movement, i.e., his/her hand movement, in order to check whether the user may have slipped with his/her hand and an undesirable relative movement between the hand and component of the machine tool which could be classified as a hazardous situation takes place.

It is even furthermore preferred if the safety device has a second signalling unit and that the signalling unit is designed to send a first individual identification code to the receiving unit, the second signalling unit is designed to send a second individual identification code to the receiving unit, the signal receiving device is designed to detect a second position component of the second signalling unit, and the signal processing unit is designed to assign the signalling unit and the second signalling unit to a first and a correspondingly second body part of a user based on the first and second individual identification code transmitted by the signal receiving device and a signal transmitted by the signal receiving device describing the second position component of the signalling unit and to determine whether a hazardous situation exists with regard to the second body part, in particular, falling short of a predetermined minimum distance between a second body part of the user and the machining tool, and, if it has been determined that such a hazardous situation exists, to send the hazard signal to the hazard reduction device.

In accordance with this embodiment, a user carries two signalling units, which are each recognizable by different individual identification codes of the receiving unit, so that the safety device is capable of monitoring two body parts of the user for any hazardous situation. The term body part according to the invention is to be understood in such a way that these can mean two different body parts, for example, the left and the right hand of a user or the pointing finger and the thumb of a user, and this can also just as well include a position detection of a hand or forearm with the aid of two signalling units arranged on the hand or on the forearm being performed, in order to determine an exact orientation of the arm or the hand from the two positions.

In principle, it should be understood that the further development with an additional, second signalling unit can also comprise more than two signalling units for the detection of correspondingly more than two body parts of the user in another further development in such a way that a reliable, depending on the hazard situation at the machine tool, makes it possible for all of the body parts detected to be in hazardous situations to be monitored in the safety device.

In accordance with another preferred embodiment with a second signalling unit, it is provided that the signalling unit is designed to send a first individual identification code to the receiving unit, the second signalling unit is designed to send a second individual identification code to the receiving unit, the signal receiving device is designed to detect a second position component of the second signalling unit, and the signal processing unit is designed to assign the signalling unit to a body part of a first user and to assign the second signalling unit to a body part of a second user based on the first and second individual identification code transmitted by the signal receiving device and a signal transmitted by the signal receiving device describing the second position component of the second signalling unit to determine whether a hazardous situation exists with regard to the second user, in particular, a falling short of a predetermined minimum distance between the body part of the second user and the machining tool, and, in the case it is determined that such a hazardous situation exists, to send the hazard signal to the hazard reduction device.

In accordance with this embodiment, the monitoring of two users working on a machine tool is made possible with the help of the first and second signalling unit. Here, too, it is to be understood that in addition to two, three, four, or more users can also be monitored with the help of correspondingly three, four, or more signalling units. In particular, it is also to be understood that this embodiment for monitoring a plurality of users on a machine tool can also be combined with a monitoring of a plurality of body parts of the respective user by correspondingly additional signalling units.

It is furthermore preferred if the signal processing unit is designed to use a first assessment criterion to determine whether a hazardous situation exists in relation to the user and to use a second assessment criterion to determine whether a hazardous situation exists in relation to the second user, wherein the first assessment criterion is different from the second assessment criterion.

In principle, a hazardous situation can be determined for each user with the same standards and criteria. In certain operating situations, however, it is favourable if no coinciding criteria are set for two users—rather the users are evaluated differently with regard to a possible hazardous situation by means of a first and a second assessment criterion which differ from one another. For example, in this way, a user who is responsible for the material supply or material removal at the machine tool but not for the actual machining process, can have a typical working area that is far from the machining tool. For this user, a hazardous situation could already exist if an atypical feeding to the machining tool is carried out for this activity. The hazardous situation would, therefore, be detected at a distance from the machining tool which for another user who performs the machining process and is, therefore, typically closer to the machining tool would not result in detection of a hazardous situation.

In accordance with another preferred embodiment, the safety device can be further developed with a component signalling unit, which is attached to a moveable component of the machine tool, wherein the signal receiving device is designed to detect a distance from and/or a direction towards the component signalling unit and the signal processing unit is designed to determine a position component of the moveable component from a signal transmitted by the signal receiving device describing a position component of the component signalling unit and to determine whether a hazardous situation exists depending on the position component of the component.

In principle, the hazardous situation can be determined for all components and tools of the machine tool whose position and dimensions are know, which are, therefore, known in terms of position and spatial dimensions, for example, because they have a constant and unchangeable spatial area or because although these components change their position or dimensions during machining, this can be detected by appropriate operating parameters and, therefore, can be taken into account in the case of determining the hazardous condition. However, a hazardous situation can also result from components of the machine tool, the position of which is variable and is not characterized by a corresponding operating parameter. In this case, the corresponding component of the machine tool that causes the hazard can be provided with a component signalling unit to enable a position determination of this component. This allows the position of the component to then be determined by the signal receiving devices and taken into account when determining whether a hazardous situation exists. Thereby, safety-relevant components can also be monitored with the aid of such a component signalling unit in such a way that these are arranged by the user in the correct position and orientation necessary for the safety function in order to likewise detect a hazardous situation, which occurs independently of the position of a body part of the user solely as a result of the user not using a safety-relevant component correctly or not using it at all.

The safety device according to the invention can be further developed with a workpiece signalling unit, which is attached to a workpiece machined using the machine tool, wherein the signal receiving device is designed to detect a distance from and/or a direction towards the workpiece signalling unit and the signal processing unit is designed to determine a position component of the workpiece from a signal transmitted by the signal receiving device describing a position component of the workpiece signalling unit and to determine whether a hazardous situation exists depending on the position component of the component.

In accordance with this embodiment, the workpiece movement is detected by means of a workpiece signalling unit, which can be attached to a workpiece, and can be taken into account in the determination of a hazardous condition. This can, for example, allow for a plausibility analysis of a synchronous movement of a body part of the user with the workpiece in order to detect a sliding of the body part of the user from the workpiece and determine it as a hazardous situation.

In particular, it can be provided that the signal processing device is designed to determine a user movement pattern of a signalling unit carried by the user and to determine a component movement pattern or workpiece movement pattern of a component signalling unit attached to the component or of a workpiece signalling unit attached to the workpiece, respectively, to compare the user movement pattern with the component movement pattern or the workpiece movement pattern, and to determine a deviation between the user movement pattern and the component or workpiece movement pattern and, depending on this deviation, to determine whether a hazardous situation exists. [In particular, a difference greater than a predetermined deviation tolerance can be taken into account as a deviation when determining the hazardous situation/falling below the predetermined minimum distance between the body part and the machining tool.]

In accordance with this embodiment, by comparing a movement of the component or workpiece with the movement of a body part of the user, it is determined whether a hazardous situation exists. This is done by comparing movement patterns, i.e., typical movement speeds, typical trajectories, or sequence of trajectories, typical changes of movement direction, and/or typical positions at which a movement begins, which a movement passes through or at which a movement ends. It is to be understood that such a comparison does not necessarily have to classify a one-to-one accordance between a user movement pattern or workpiece movement pattern as normal condition, i.e., non-hazardous condition, rather certain movement conditions, i.e. deviation motion patterns, can also be recognized as typical if this is stored as a plausible movement of the body part of the user for certain machining operations, which can be assigned to a component movement pattern or a workpiece movement pattern. Basically, it is to be understood that this embodiment can be carried out, in particular, if corresponding movement patterns for the user, i.e., the corresponding body parts of the user, are monitored for safety and stored for the component or workpiece to enable a corresponding comparison and a plausibility analysis. Thereby, the signal processing device can be designed in such a way that, based on a preprogrammed machining procedure, it falls back on corresponding movement patterns for a component, workpiece, and body part of the user and retrieves these from a storage or the signal processing device can be designed in such a way that it can conclude that a typical machining process is taking place based on a fragment of such a movement pattern, meaning of the beginning of such a movement pattern, for example, and then takes this typical machining process as a basis for the further assessment and comparison. In particular, a deviation which is greater than a predetermined deviation tolerance, which is then taken into account in determining the hazardous situation, in particular, the undershooting of the predetermined minimum distance, can be understood as a deviation.

Furthermore, it is preferred if the signal receiving device comprises a plurality of signal receiving units, which are arranged at a distance from each other, and each are designed to detect a distance from and/or a direction towards the signalling unit. In accordance with this embodiment, the signals of the signalling units are detected by two, three, or more signal receiving units, which are spaced from each other. Such a detection by means of a plurality of signal receiving units from different locations allows for a more precise determination of the position of a signalling unit since a plurality of direction bearings are available and, therefore, based on a plurality of determined distances or directions in the manner of a cross-directional bearing or in the manner of further logical links of such positioning parameters, the position of the signalling unit can be determined very precisely.

In accordance with another preferred embodiment, it is provided that the signal processing unit is designed to determine a first movement pattern from a plurality of signals received over a first time period and describing a position component of the signalling unit, to determine a second movement pattern from a plurality of signals received over a second time period and describing a position component of the signalling unit, to compare the first and the second movement pattern and to determine a deviation between the first and the second movement pattern and, depending on this deviation, to determine whether a hazardous situation exists. This embodiment is used to use recurring movement patterns of a body part of the user as a basis for determining a hazardous situation. The principle is based on the fact that such recurring movement patterns usually run in the same or very similar manner and then, if such a match or similarity does not exist, a hazardous situation can exist. Basically, this can be understood as monitoring of recurring machining steps. However, this further development can also just as well be carried out as a learning-capable monitoring, in which a movement pattern is first taught in a first period in order to use this movement pattern as a comparison in subsequent machining operations, if these machining operations make an identical or similar movement pattern expectable.

In accordance with a further embodiment, it is provided that the hazard reduction device is designed to output an optical and/or acoustic warning signal, to decelerate the machining tool, to shield the machining tool, to move the machining tool into a non-hazardous situation, and/or to decelerate a workpiece feed device. In accordance with this embodiment, one or a plurality of different measures are taken as a hazard reduction measure to establish the safety of the user. These measures begin with signalling of the hazardous situation to the user so that the user independently identifies the hazardous situation and can take measures to prevent it, all the way to measures that are carried out automatically on the machine tool in order to eliminate the hazardous situation.

In accordance with a further form of further development, the safety device according to the invention can be further developed by means of an optical information unit, which is designed to detect a viewing direction of the operator and send a viewing direction signal to the signal processing unit, which is designed to determine, depending on this viewing direction signal, whether a hazardous situation exists and/or to project a processing or warning signal into the operator's eye, which contains information about a hazardous situation of a body part of the user and/or information about a machining step on the workpiece. In principle, it is to be understood that this aspect of the invention can also be carried out independently of the above embodiment of a safety device, such as, i.e., the use of signalling units that send corresponding position components. In the case of this further development, with the aid of an optical device, which can be worn by the user, for example, glasses, the direction of the operator's gaze is determined in order to allow this to be included in the determination as to whether a hazardous situation exists. For example, situations that are considered critical because a close proximity of a body part of the user to a potentially harmful component of the machine tool has been detected can be further checked to see whether the user is keeping an eye on precisely this hazardous situation or whether the user's gaze is directed elsewhere, for example, because the user is distracted, so that the hazardous situation then appears to be more acute and possibly makes a risk reduction measure necessary. In particular, in this further development, it can also be alternatively or additionally provided that a signal is projected into the eye of the operator, which is executed as a machining or warning signal. This signal can further increase the operating safety by there being a warning signal that is unavoidably visible to the user at all times and cannot be overseen by him/her. Furthermore, operating safety can be facilitated for the user by him/her getting direct machining sequences projected into the eye, for example, machining instructions, graphical positioning information of workpieces corresponding to his/her viewing direction on a workpiece support surface, or the like.

It is even furthermore preferred if the signal receiving device comprises a first signal receiving unit, which is arranged below a workpiece support surface of the machine tool. A signal receiving unit, which is arranged below a workpiece support surface, has proven to be particularly suitable for achieving an exact position of the signalling units, which are typically arranged above or next to this workpiece support surface.

This can be further developed in that the signal receiving device comprises a second signal receiving unit, which is arranged below the workpiece support surface of the machine tool and spaced from the first signal receiving unit. In accordance with this embodiment, two signal receiving units are provided, which are arranged below the workpiece support surface of the machine tool, and, by a simultaneous detection of position components of a signalling unit by both signal receiving units, a particularly precise determination of the location of the respective signalling unit is made possible. Basically, it is to be understood that, in the area of the one or a plurality of signal receiving units, the workpiece support surface can be designed with a specific material, which enables the detection of the position component particularly well, for example only shielding a signal exchange between the signal receiving unit and the signalling unit to a lesser extent or not at all or slightly distorting or shielding electromagnetic fields that are used to detect the position component.

It is even furthermore preferred if the signal receiving device comprises a signal receiving unit attached to a moveable component of the machine tool and an additional signalling unit, wherein the signal processing device is designed to determine the position of the signal receiving unit on the basis of request and response signals exchanged between the signal receiving device and the additional signalling unit. In accordance with this embodiment, a signal receiving unit is attached to a moveable component of the machine tool.

This signal receiving unit can be the only signal receiving unit of the signal receiving device, or it can be provided in addition to other signal receiving units, for example, in addition to another signal receiving unit attached to the moveable component and/or in addition to a signal receiving unit(s) installed at another position, for example, in a stationary manner. For the signal receiving unit(s) installed on the moveable component, it is preferred if their position can be reliably determined absolutely or relative to stationary components of the machine tool, for example, the machining tool. This is done by providing a signalling unit attached to the machine tool. This signalling unit can be integrated, for example, into the signal receiving unit on the moveable component so that, by means of detecting the position of this signalling unit by means of another signal receiving unit attached in a stationary manner to the machine tool, a direct detection of the position of the signal receiving unit on the moving component can occur. The signalling unit can also be arranged independently of the signal receiving unit in a stationary manner on the machine tool so that, by determining the position of the signalling unit by means of the signal receiving unit(s) arranged on the moveable component, a reliable relative position determination of the signal receiving unit with respect to a stationary reference position on the machine tool can occur.

This makes it possible, for example, to position a signal receiving unit above the workpiece support surface, which is not stationary but moveable. The position and, if necessary, the movement of the signal receiving unit can be detected intrinsically within the safety device and taken into account in the position determination of a signalling unit carried by the user by the component, to which the signal receiving unit is attached, being equipped with a signalling unit itself, the position of which can be precisely determined, or a (reference) signalling unit being arranged in a stationary manner on the machine tool and located by means of the moveably arranged signal receiving unit. In this way, the signal processing device can directly calculate the position of the signal receiving unit attached to the moveable component and consequently take it into account in the further calculation of the position of a signalling unit arranged on a body part of a user. For example, a signal receiving unit can be attached to a moveable protective cover or shielding device of the machining tool itself, which is moveable and the position of which is precisely determined by a signalling unit arranged thereon.

In accordance with another preferred embodiment, it is provided that the signal processing device is designed to store a calibration dataset containing calibration data that described a signal correction depending on the position component received by a signalling unit and to determine the position of the signalling unit from the position component and the calibration data. In accordance with this embodiment, a calibration dataset is stored in the signal processing device, which contains location-related calibration data. This allows for a consideration of calibration data for each position component or position of a signalling unit to occur, which has been determined individually for this position and has been stored. Such a calibration dataset can take into account a field or measurement error that affects the accuracy of the position determination due to distractions, inhomogeneity, or other influences in such a way that an exact position determination is achieved.

Thereby, it is even more preferred if the signal processing device is designed to receive at least one machine parameter of the machine tool, which describes a current machine setting of the machine tool, and to store a calibration dataset, which contains calibration data that describe a signal correction depending on the machine parameter received and to determine the position of the signalling unit from the position component, the received machine parameter, and the calibration data. While, in principle, the machine tool itself, which often comprises a larger number of metallic components and component parts, results in an influence on the position determination, which can be compensated by a calibration. This influence due to the machine tool also changes due to adjustable or moveable components of the machine tool, particularly if they are made of metal or generate an electromagnetic field themselves. In this case, it is necessary for the accuracy of the position determination of a body part of the user or conducive to accuracy if machine parameters of the machine tool are received by the signal processing device, which describe a corresponding position or orientation or an operating state of a component of the machine tool, in order to allow this machine parameter to be included in calibration considerations. This can be done by falling back on correspondingly individual calibration data, which are selected depending on the machine parameter, or by a calibration dataset being adapted by means of an algorithm which processes the machine parameter.

It is even furthermore preferred if the signal processing device is designed to control the signal receiving unit for sending a query signal to the signalling unit with a query frequency and to change the query frequency depending on the determined distance and/or the speed of the body part from the machining tool in such a way that the query frequency is increased when the distance decreases and/or if the speed increases.

In principle, a particularly precise position determination can be made by a communication between the signal receiving unit and the signalling unit, which takes place at a certain frequency. This sequence of query and response at a certain frequency requires computing time and must, therefore, be managed in terms of achieving the objective of the real-time processing of the data in such a way that the processing power is not overloaded to such an extent that a real-time processing can no longer be achieved. In accordance with this embodiment, the query frequency is, therefore, not kept constant, but is adjusted depending on the probability of a hazardous situation. For example, to this end, the query frequency is increased in one or a plurality of steps when a body part approaches a hazardous component of the machine tool or when a body part exceeds a speed level. In this way, signalling units arranged on body parts can be queried at a higher frequency if these signalling units are located below a first critical distance from the machining tool or if these body parts move at a high speed that can quickly result in an approach towards a machining tool. By contrast, signalling units arranged on body parts that are far from a hazardous component or that move very slowly must be queried only at a lower frequency, since here a hazardous situation cannot be immediately imminent.

It is even furthermore preferred if the signal processing device is designed to control the signal receiving unit for sending a first query signal to a first signalling unit at a first query frequency and to control the signal receiving unit for sending a second query signal to a second signalling unit at a second query frequency and to set the first query frequency lower than the second query frequency. In accordance with this embodiment, the signal processing device is designed to query two or more different signalling units with correspondingly two or more different query frequencies. This enables a differentiated detection of the position components or positions of a plurality of signalling units, which can be controlled depending on the probability of an imminent hazardous situation. It is to be understood that the query frequency can also be changed, in particular depending on a change in the position of the respective signalling unit, if these approach a machining tool, for example, in such a way that a hazardous situation becomes more likely, in order to then increase the frequency or if the signalling unit is removed from an originally dangerous situation again in order to then reduce the frequency.

In accordance with another preferred embodiment, it is provided that the signalling unit is attached to a glove and comprises a first signalling unit in the area of a first finger or knuckle and a second signalling unit in the area of the wrist or the signalling unit is attached to a glove and comprises a first signalling unit in the area of a first finger or knuckle and a second signalling unit in the area of a second finger or knuckle. These embodiments are particularly suitable to monitor the fingers or hand of a user and to thereby achieve a reliable determination of the finger or a plurality of fingers of the hand.

Finally, it is even more preferred if the signal processing unit comprises an electronic buffer memory and is designed to send position components of the detected signalling units and machine operating data received by a machine control system to an electronic buffer memory coupled on a signal-engineering level and to store them therein.

In accordance with this embodiment, all data necessary for an assessment of safety, in particular, the position components of the signalling units and any machine operating data of the machine tool, are stored. This storage can be carried out over a predetermined period of time, for example, over a whole day, an hour, or the like, or can at certain self-contained the storage can also be carried out in such a way that a continuous overwriting of previously stored data takes place so that a tracking of the previous period is always possible without requiring too much memory space.

In accordance with a further embodiment, it is provided that the signal processing unit comprises a user interface and is designed with the safety device in a first mode, in which a monitoring for a hazardous situation takes place, and the safety device in a first mode, in which a monitoring for a hazardous situation is carried out, wherein the switching between the first and the second mode takes place via the user interface and the safety device preferably comprises an interface to a control unit of the machine tool and is designed to block, via the interface, an activation of safety-relevant components of the machine tool, unless at least one signalling unit carried by the user is detected within a predetermined monitoring area. This embodiment makes it possible to also switch off the safety device and, therefore, operate the machine tool in an unsecured mode.

In general, it is advantageous both in the case of the possibility of shutting down the safety device as well as in the case of safety devices that carry out safety monitoring on a continuous basis and cannot be switched off if the safety device can block the activation of hazardous components via an appropriate interface to the machine tool unless at least one user-worn signalling unit is detected in the area of the machine tool, i.e., a predetermined monitoring area, for example. This prevents a user from forgetting to wear a glove or the like equipped with signalling units and nevertheless mistakenly operating the machine tool, believing themselves to be working in a safe mode.

It is furthermore preferred if the signalling device comprises a glove, in particular, is formed by a glove, and that the signal receiving device is designed to receive and evaluate a colour, texture, light reflection characteristic, or a light-dark value of the glove and to detect the position component of the signalling unit based on the colour, texture, light reflection characteristic, or the light-dark value. In accordance with this embodiment, a glove is used as a signalling device, which also entails the use of two gloves on both hands of the user. This glove enables a safe and quick detection of the position of the user's hands. The use of gloves and identification of the position of the user's hands therefrom results from the knowledge that, on the one hand, hands are often significantly involved in injuries, and, on the other hand, from the fact that the position and location of other body parts of the user, which can be affected by injuries, such as the forearms of the user, can also be determined with sufficient accuracy from the position of one or both hands of the user.

In addition, the use of a glove as a signalling device has the advantage that a garment usually worn in any case by a user or operator of a machine tool is used for the purposes of the invention. The glove can be a garment specially manufactured for the use of the safety device, for example, a glove characterized by certain reflexive characteristics, a particular colour, or a particular texture that particularly stands out from the typical environment, such as the tool support surface in the area around a cutting tool of the machine tool or from a workpiece surface. Such a contrast between the environment and the glove, which is particularly highlighted by the glove, leads to a fast, error-free detection of the position of the glove by the signal receiving device. Basically, the signal receiving device can fall back on a single characteristic, such as only the colour or only the light-dark value of the glove compared to the environment, in order to detect the position component. However, the signal receiving device can also fall back on a plurality of these characteristics, for example, in order to make a quick determination of the position component on the basis of a quickly detectable value and in order to verify this, if applicable, based on a more precise calculation. In particular, the determination of the position component based on colour, texture, light reflection characteristic, or light-dark value can also be combined with the position determination by means of an actively transmitting signalling device or by means of a signalling device passively transmitting in response to an emitted electromagnetic signal, such as an RFID sensor. In this way, the determination of the position component can be carried out by two system-independent calculation paths, which increases the certainty of the accuracy of the position component, however, at the same time, the speed of the determination of the position component does also not need to be reduced.

It is even furthermore preferred if the signal receiving device and the signal processing device are designed to perform a calibration on a detection characteristic of the signalling device at a calibration step, in particular, in order to store a calibration value in relation to a data transfer parameter, such as a signal frequency of an active emitting signalling device, or in relation to a colour, texture, light reflection characteristic, or a light-dark value of a passively emitting signalling device, such as a glove, in an electronic storage unit, and in order to detect the position component of the signalling unit during a monitoring process following the calibration step based on a comparison of the calibration value with a signal detected by the signal receiving device. In accordance with this embodiment, a calibration step precedes the monitoring of the hazardous situation. In this calibration step, a user can program a specific detection characteristic of the signalling device into the signal receiving device. This calibration can consist of the fact that, for example, a certain signal transmission parameter, such as a signal transmission frequency, a signal sequence frequency, a frequency modulation, or the like, of an actively or passively emitting signalling unit is transmitted to the receiver device and the signal receiving device is thereby informed of which signalling unit it should monitor and locate. This makes it possible, for example, that when a plurality of users use a machine tool, the monitoring is reduced, in a time-sequential manner or simultaneously, to a specific signalling unit which is carried by a user who can run into a hazardous situation. Furthermore, the calibration step makes it possible that, when using a glove as a signalling unit, the signal receiving device is calibrated to a non-system glove, for example, to a standard working glove, which is worn by the user for direct protection against mechanical effects on his/her skin. At the calibration step, the colour, a pattern, a texture, a reflex characteristic, or a light-dark value of this glove is then detected and stored and the value stored in this way is used in the subsequent operational process, in which the safety monitoring is carried out by the safety device in order to detect the glove via the signal receiving device and to determine its position component. In principle, for this further development, the user interface can be designed to allow the user to make an input that signals the execution of a calibration step and which ends the execution of the calibration step. In particular, the calibration step can be carried out by the signal receiving device in this way and, if necessary, repeated until sufficient reception data of the signalling device have been received, which are sufficient for making a differentiation with relation to the environment.

It is furthermore preferred if the signal receiving device is an image capturing device, in particular, a moving-image capturing device, such as a video camera that records in the visible light spectrum or in the infrared spectrum. In accordance with this embodiment, a video camera or a plurality of video cameras with a central image processing unit is used as a signal receiving device. The video cameras can be orientated towards the hazardous area of the machine tool and monitor this in a three-dimensional manner. By means of the video cameras, on the one hand, signals in the visible light area can be reliably detected, for example, a special colour of a glove immanent to the system, a colour, or other detection characteristic of a glove previously defined via calibration and the like. In addition or as an alternative, one or a plurality of video cameras can be used, which enable image capturing within the infrared spectrum. In this way, a body part of a user, such as his/her hand, can be reliably detected using body temperature and be differentiated from the environment. Infrared monitoring can be carried out in combination with a monitoring in the visible light range. Infrared monitoring and/or monitoring in the visible light range can also be carried out in combination with monitoring by means of actively or passively transmitting signalling devices. These combinations of different elements in the signal receiving device lead to an improved and error-free detection of the position component of the signalling unit or of the body part of the user.

Another aspect of the invention is a method for operating a machine tool, comprising the steps: arranging a signalling unit on a user's body part, capturing a position, a speed and/or an acceleration of the signalling unit by means of a signal receiving device arranged on the machine tool, determining, on the basis of the detected position, speed or acceleration, whether the body part of the user is exposed to a hazardous situation, and reducing or avoiding the hazardous situation by means of a hazard reduction measure at the machine tool when a hazardous situation has been identified.

The method can be further developed with the step: attaching the signalling unit to a garment part, in particular, a glove, finger ring, or bracelet, or implanting the signalling unit into a body part of the user.

The method can be further developed with the step: transmitting a position signal and/or an acceleration signal from the signalling unit to the signal receiving device.

The method can be further developed with the step: generating an electromagnetic field by means of the signal receiving device, wherein the detection of the position is carried out by determining the field strength of the electromagnetic field in the signalling unit, preferably by the field strength of the electromagnetic field being determined in the signalling unit in three directions that are perpendicular to one other.

The method can be further developed with the steps: transmitting an identification signal from the signalling unit to the signal receiving device and assigning the signalling unit to the user and/or the body part of the user, wherein a plurality of signalling units are arranged on different body parts and/or different users and each signalling unit sends out an individual identification signal.

The method can be further developed with the steps: determining whether a first body part of a first user is exposed to a hazardous situation, based on the detected position, speed, or acceleration of a first signalling unit that sends a first identification code, because a first hazard level has been fallen short of, determining, based on the detected position, speed, or acceleration of a second signalling unit, which sends a second identification code, whether a second body part of the first user or whether a first body part of a second user is exposed to a hazardous situation because a second level of risk has been fallen short of, wherein the first hazard level is different from the second hazard level.

The method can be further developed with the step: considering a machining parameter received from the machine tool, such as an on/off position of a machining tool, a position, or alignment of a machining tool, when determining whether a hazardous situation exists.

The method can be further developed with the steps: comparing a position or movement speed of a machine tool component with a position or movement speed of a body part of the user that guides this component, and determining a hazardous condition of the body part depending on whether a predetermined maximum position difference or a predetermined maximum relative speed has been exceeded.

In principle, it is to be understood that the method and its further developments can preferably be carried out with the previously explained safety device. The individual steps of the method can use corresponding features of the previously explained safety device and it is to be understood that, with regard to the advantages, variants and characteristics of these method steps, reference is made to the preceding description of the device features of the safety device corresponding to these.

The safety device or individual features thereof described above can also be combined with the safety device or individual features of this safety device, which is explained in more detail below.

Particularly preferred design variants of the safety device and of the method are in particular the following:

Safety device for machine tools with a machining tool used for machining a workpiece supplied to the machine tool, comprising: a detection device that is designed to detect a hazardous situation of an operator of the machine tool, a hazard reduction device which is connected on a signal-engineering level to the detection device and is designed to carry out a measure for reducing the hazardous situation upon receiving a hazard signal from the detection device, which signals a hazardous situation of the operator, characterized in that the detection device a signalling unit worn by the user and a signal receiving device arranged on the machine tool, which is designed to detect a position component of the signalling unit, and an electronic signal processing device, which is connected on a signal-engineering level to the signal receiving device and is designed to determine, from a signal which is transmitted from the signal receiving device and which describes the position component of the signalling unit, whether a hazardous situation exists, in particular falling below a predetermined minimum distance between a body part of the user and the machining tool, and, if it is determined that such a hazardous situation exists, to send the hazard signal to the hazard reduction device.

Safety device according to the preceding design variant, characterized in that the signalling unit is an actively transmitting unit, which is designed to send a presence signal to the signal receiving device in a wireless and contactless manner.

Safety device in accordance with any one of the preceding design variants, characterized in that the signalling unit comprises an energy source, a receiving unit, a transmitting unit and a control unit connected to the receiving unit and the transmitting unit, which is designed to receive and process a request signal received by the receiving unit, in response to such a request signal to control the transmitting unit to send out a response signal, which contains an alignment or position indication and, if applicable, an identification code as part of the signal describing the position component of the signalling unit.

Safety device in accordance with any one of the preceding design variants, characterized in that the signalling unit comprises one, two, three or a plurality of position sensors and the control unit is designed to control the transmitting unit in response to a request signal in order to send out a response signal, which contains an alignment indication of the signalling unit with respect to correspondingly one, two or three spatial axes as part of the signal describing the position component of the signalling unit.

Safety device in accordance with any one of the preceding design variants, characterized in that the signalling unit comprises one, two, three or a plurality of distance sensors and the control unit is designed to control the transmitting unit in response to a request signal in order to send out a response signal, which contains a correspondingly one-, two- or three-dimensional distance indication of the signalling unit with respect to a corresponding reference system as part of the signal describing the position component of the signalling unit.

Safety device in accordance with any one of the preceding design variants, characterized in that the signalling unit is a passively working unit, which is designed to be detected wirelessly and contactlessly by the signal receiving device.

Safety device in accordance with any one of the preceding design variants, characterized in that the signalling device comprises an acceleration sensor and is designed to send an acceleration of the signalling device in one, two or three spatial directions as an integral component of the signal describing the position component of the signalling unit to the signal receiving unit.

Safety device in accordance with any one of the preceding design variants, characterized in that the electronic signal processing device is designed to determine that the hazardous situation exists if the body part in a current position of the body part calculated from the position component is less than a minimum distance from the machining tool, or the body part in a current position of the body part calculated from the position component is spaced away over the or at the minimum distance from the machining tool and, as a result of a current movement of the body part calculated from the change of at least two temporally consecutive position components within a predetermined period of time, is moved into a position that is spaced away from the machining tool at a distance that is less than the minimum distance.

Safety device in accordance with any one of the preceding design variants, characterized in that the signal receiving device is designed to detect a distance between the signalling unit and the signal receiving device in a wireless and contactless manner.

Safety device in accordance with any one of the preceding design variants, characterized in that the signal receiving device is designed to detect a direction or direction component extending from the signalling unit to the signal receiving device in a wireless and contactless manner.

Safety device in accordance with any one of the preceding design variants, characterized in that the signal processing device is designed to determine a distance between the signalling unit and the signal receiving device and/or a direction extending from the signal receiving device to the signalling unit and to determine whether a hazardous situation exists, taking into account this distance and/or this direction.

Safety device in accordance with any one of the preceding design variants, characterized in that the signal processing device is further designed to process a predetermined geometric constellation between the body part of the user and the signalling unit carried by the user and, under consideration of this geometric constellation, to determine whether a hazardous situation exists.

Safety device in accordance with any one of the preceding design variants, characterized in that the signalling unit is arranged on a clothing accessory, in particular on a glove, on a band worn around the arm, such as an arm ring, bracelet or watch strap, or on a finger ring, or that the signalling unit is arranged in an implant.

Safety device in accordance with any one of the preceding design variants, characterized in that the signalling unit stores data information that comprises a safety criterion and the signal receiving device is designed to receive this data information from the signalling unit and to determine whether a hazardous situation exists depending on the safety criterion.

Safety device in accordance with any one of the preceding design variants, characterized in that the signalling unit stores data information that comprises a safety criterion and the signal receiving device is designed to receive this data information from the signalling unit and sent it to the signal processing device and in that the signal processing device is designed in order to determine a predetermined minimum distance between the machining tool and the body part of the user and/or a predetermined maximum movement speed of the signalling unit depending on the safety criterion, determine a current distance between the machining tool and the body part of the user from a position component and/or determine a current movement speed of the signalling unit from two temporally consecutive position components, and determine that a hazardous situation exists if the current distance falls below the minimum distance and/or the current speed exceeds the maximum movement speed.

Safety device in accordance with any one of the preceding design variants, characterized in that the signal processing device is designed to determine a movement speed and/or acceleration of the body part, and depending on the movement speed and/or the acceleration of the body part, to determine whether a hazardous situation exists.

Safety device in accordance with any one of the preceding design variants, characterized in that the signal processing device is designed to receive a machining parameter that characterizes an operating parameter of the machine tool, and to determine whether a hazardous situation exists, depending on the machining parameter.

Safety device in accordance with any one of the preceding design variants, characterized in that the signal processing device is designed to carry out a plausibility analysis based on the machining parameter by determining a position, a movement direction and/or a movement speed of the signalling unit one or a plurality of position components, to compare the position, movement direction and/or movement speed with a plausible position, movement direction or movement speed assigned to the machining parameter, and to determine a deviation between the determined position, movement direction and/or movement speed from the assigned, plausible position, movement direction or movement speed and to determine, depending on this deviation, whether a hazardous situation exists.

Safety device in accordance with any one of the preceding design variants with a second signalling unit, characterized in that the signalling unit is designed to send a first individual identification code to the receiving unit, the second signalling unit is designed to send a second individual identification code to the receiving unit, the signal receiving device is designed to detect a second position component of the second signalling unit, and the signal processing unit is designed to assign the signalling unit and the second signalling unit to a first and a correspondingly second body part of a user based on the first and second individual identification code transmitted by the signal receiving device and a signal transmitted by the signal receiving device describing the second position component of the signalling unit and to determine whether a hazardous situation exists with relation to the second body part, in particular falling short of a predetermined minimum distance between a second body part of the user and the machining tool, and, if it is determined that such a hazardous situation exists, to send the hazard signal to the hazard reduction device.

Safety device in accordance with any one of the preceding design variants with a second signalling unit, characterized in that the signalling unit is designed to send a first individual identification code to the receiving unit, the second signalling unit is designed to send a second individual identification code to the receiving unit, the signal receiving device is designed to detect a second position component of the second signalling unit, and the signal processing unit is designed to assign the signalling unit to a body part of a first user and to assign the second signalling unit to a body part of a second user based on the first and second individual identification code transmitted by the signal receiving device and a signal transmitted by the signal receiving device describing the second position component of the second signalling unit and to determine whether a hazardous situation exists with relation to the second user, in particular falling short of a predetermined minimum distance between the body part of the second user and the machining tool, and, if it is determined that such a hazardous situation exists, to send the hazard signal to the hazard reduction device.

Safety device in accordance with any one of the preceding design variants, characterized in that the signal processing unit is designed to use a first assessment criterion to determine whether a hazardous situation exists with regard to the user, to use a second assessment criterion to determine whether a hazardous situation exists with regard to the second user, wherein the first assessment criterion is preferably different from the second assessment criterion.

Safety device in accordance with any one of the preceding design variants, characterized by a component signalling unit, which is attached to a moveable component or tool of the machine tool, wherein the signal receiving device is designed to detect a distance from and/or a direction towards the component signalling unit and the signal processing unit is designed to determine a position component of the moveable component from a signal transmitted by the signal receiving device describing a position component of the component signalling unit and to determine whether a hazardous situation exists depending on the position component of the component.

Safety device in accordance with any one of the preceding design variants, characterized by a workpiece signalling unit, which is attached to a workpiece machined using the machine tool, wherein the signal receiving device is designed to detect a distance from and/or a direction towards the workpiece signalling unit and the signal processing unit is designed to determine a position component of the workpiece from a signal transmitted by the signal receiving device describing a position component of the workpiece signalling unit and to determine whether a hazardous situation exists depending on the position component of the component.

Safety device in accordance with any one of the preceding design variants, characterized in that the signal processing device is designed to determine a user movement pattern of a signalling unit worn by the user, and to determine a component movement pattern or workpiece movement pattern of a component signalling unit attached to the component or a workpiece signalling unit attached to the workpiece, to compare the user movement pattern with the component movement pattern or workpiece movement pattern, and to determine a deviation between the user movement pattern and the component or workpiece movement pattern and, depending on this deviation, to determine whether a hazardous situation exists.

Safety device in accordance with any one of the preceding design variants, characterized in that the signal receiving device comprises a plurality of signal receiving units, which are arranged at a distance from each other, and each are designed to detect a distance from and/or a direction to the signalling unit.

Safety device in accordance with any one of the preceding design variants, characterized in that the signal processing unit is designed to determine a first movement pattern from a plurality of signals received over a first time period describing a position component of the signalling unit to determine a second movement pattern from a plurality of signals received over a second time period describing a position component of the signalling unit, to compare the first and second movement patterns, and to determine a deviation between the first and the second movement pattern and, depending on that deviation, to determine whether a hazardous situation exists.

Safety device in accordance with any one of the preceding design variants, characterized in that the hazard reduction device is designed to output an optical and/or acoustic warning signal, to decelerate the machining tool or bring it to a standstill to shield the machining tool or render it harmless, to move the machining tool into a non-hazardous situation, and/or to decelerate a workpiece feed device.

Safety device in accordance with any one of the preceding design variants, characterized by an optical information unit, which is designed to detect the operator's viewing direction and to send a viewing direction signal to the signal processing unit, which is designed to determine, and depending on that viewing direction signal, whether a hazardous situation exists, and/or to project a machining or warning signal into the operator's eye, which contains information about a hazardous situation of a body part of the user and/or information about a machining step on the workpiece.

Safety device in accordance with any one of the preceding design variants, characterized in that the signal receiving device comprises a first signal receiving unit, which is arranged below a workpiece support surface of the machine tool.

Safety device in accordance with any one of the preceding design variants, characterized in that the signal receiving device comprises a second signal receiving unit, which is arranged below the workpiece support surface of the machine tool and spaced from the first signal receiving unit.

Safety device in accordance with any one of the preceding design variants, characterized in that the signal receiving device comprises a signal receiving unit attached to a moveable component of the machine tool and an additional signalling unit, wherein the signal processing device is designed to determine the position of the signal receiving unit on the basis of request and response signals exchanged between the signal receiving device and the additional signalling unit.

Safety device in accordance with any one of the preceding design variants, characterized in that the signal processing device is designed to store a calibration dataset containing calibration data that described a signal correction depending on the position component received by a signalling unit and to determine the position of the signalling unit from the position component and the calibration data.

Safety device in accordance with any one of the preceding design variants, characterized in that the signal processing device is designed to receive at least one machine parameter of the machine tool, which describes a current machine setting of the machine tool, and to store a calibration dataset, which contains calibration data that describe a signal correction depending on the machine parameter received and to determine the position of the signalling unit from the position component, the received machine parameter and the calibration data.

Safety device in accordance with any one of the preceding design variants, characterized in that the signal processing device is designed to control the signal receiving unit for sending a query signal to the signalling unit at a query frequency and to change the query frequency depending on the determined distance and/or the speed of the body part from the machining tool in such a way that the query frequency is increased when the distance decreases and/or if the speed increases.

Safety device in accordance with any one of the preceding design variants, characterized in that the signal processing device is designed to control the signal receiving unit for sending a first query signal to a first signalling unit at a first query frequency and to control the signal receiving unit for sending a second query signal to a second signalling unit at a second query frequency and to set the first query frequency lower than the second query frequency.

Safety device in accordance with any one of the preceding design variants, characterized in that the signalling unit is attached to a glove and comprises a first signalling unit in the area of a first finger or knuckle and a second signalling unit in the area of a second finger or knuckle.

Safety device in accordance with any one of the preceding design variants, characterized in that the signalling unit is attached to a glove and comprises a first signalling unit in the area of a first finger or knuckle and a second signalling unit in the area of the wrist.

Safety device in accordance with any one of the preceding design variants, characterized in that the signal processing unit comprises an electronic buffer memory and is designed to send position components of the detected signalling units and machine operating data received by a machine control system to an electronic buffer memory coupled on a signal-engineering level and to store them therein.

Safety device in accordance with any one of the preceding design variants, characterized in that the signal processing unit comprises a user interface and is designed the safety device in a first mode, in which a monitoring for a hazardous situation takes place, and the safety device in a first mode, in which a monitoring for a hazardous situation is carried out, wherein the switching between the first and the second mode is carried out via the user interface and the safety device preferably comprises an interface to a control unit of the machine tool and is designed to block an activation of safety-relevant components of the machine tool via the interface unless at least one signalling unit worn by the user is detected in a predetermined monitoring area.

Safety device in accordance with any one of the preceding design variants, characterized in that the signalling device comprises a glove, in particular is formed by a glove, and in that the signal receiving device is designed to receive and evaluate a colour, texture, light reflection characteristic or a light-dark value of the glove and to detect the position component of the signalling unit based on the colour, texture, light reflection characteristic or light-dark value.

Safety device in accordance with any one of the preceding design variants, characterized in that the signal receiving device and the signal processing device are designed to perform a calibration on a detection characteristic of the signalling device at a calibration step, in particular in order to store a calibration value in relation to a data transfer parameter, such as a signal frequency of an actively emitting signalling device, or a colour, texture, light reflection characteristic or a light-dark value of a passively emitting signalling device, such as a glove, in an electronic storage unit, and in order to detect the position component of the signalling unit during a monitoring process following the calibration step based on a comparison of the calibration value with a signal detected by the signal receiving device.

Safety device in accordance with any one of the preceding design variants, characterized in that the signal receiving device is an image capturing device, in particular a moving-image capturing device, such as a video camera that records in the visible light spectrum or in the infrared spectrum.

Method for operating a machine tool, comprising the steps: arranging a signalling unit on a user's body part, detecting a position, speed and/or acceleration of the signalling unit by means of a signal receiving device arranged on the machine tool determining whether the user's body part is exposed to a hazardous situation based on the detected position, speed or acceleration, reducing or avoiding the hazardous situation by means of a hazard reduction measure on the machine tool if a hazardous situation has been identified.

Method in accordance with the preceding design variant, comprising the step: attaching the signalling unit to a garment part, in particular a glove, finger ring or bracelet, or implanting the signalling unit into a body part of the user.

Method in accordance with any one of the preceding design variants, comprising the step: transmitting a position signal and/or an acceleration signal from the signalling unit to the signal receiving device.

Method in accordance with any one of the preceding design variants, comprising the step: generating an electromagnetic field by means of the signal receiving device, wherein the detection of the position is carried out by determining the field strength of the electromagnetic field in the signalling unit, preferably by the field strength of the electromagnetic field being determined in the signalling unit in three directions that are perpendicular to one other.

Method in accordance with any one of the preceding design variants, comprising the steps: transmitting an identification signal from the signalling unit to the signal receiving device and assigning the signalling unit to the user and/or the body part of the user, wherein a plurality of signalling units are arranged on different body parts and/or different users and each signalling unit emits an individual identification signal.

Method in accordance with any one of the preceding design variants, comprising the steps: determining whether a first body part of a first user is exposed to a hazardous situation, based on the detected position, speed or acceleration of a first signalling unit that sends a first identification code, because a first hazard level has been fallen short of, determining whether a second body part of the first user or whether a first body part of a second user is exposed to a hazardous situation, based on the detected position, speed or acceleration of a second signalling unit that sends a second identification code, because a second hazard level has been fallen short of, wherein the first hazard level is different from the second hazard level.

Method in accordance with any one of the preceding design variants, comprising the step: considering a machining parameter received from the machine tool, such as an on/off position of a machining tool, a position or alignment of a machining tool, when determining whether a hazardous situation exists.

Method in accordance with any one of the preceding design variants0, comprising the steps: comparing a position or movement speed of a machine tool component with a position or movement speed of a body part of the user that guides that component, and determining a hazardous condition of the body part depending on whether a predetermined maximum position difference or a predetermined maximum relative speed is exceeded.

Furthermore, the invention relates to a safety device for machine tools, in particular, for a panel-sizing circular saw and/or an edge-gluing machine, with a machining tool used for machining a workpiece supplied to the machine tool, comprising a detection device and a hazard reduction device.

A safety device for circular saws is known, for example, from US 2002/0017184 A1. A safety mechanism to prevent accidents at work is triggered in this device when contact between a body part and the saw blade occurs. Consequently, as a measure, the position of the saw blade can be changed, in particular the saw blade can be moved under a table, to avoid further contact and cutting effects between the circular saw blade and a body part. Although this safety device can limit the injury of the body part, a complete avoidance of injury to a body part cannot be ensured due to the contact to the saw blade.

From DE 20 2006 007 555 U1, a safety device for saws is known, in which a safety mechanism for the protection of the user is triggered by means of a sensor device. The safety device uses sensor devices attached to the protective cover to detect whether a body part is in a potential hazardous area. If this is the case, a cutting stop device is activated, which decelerates the saw blade and moves it out of the hazardous area, so that the body of a user ideally remains intact. The disadvantage of this solution, however, is that in unfavourable cases, especially when a saw blade with a large moment of inertia is used, as is common with panel-sizing circular saws, and is operated at high speed, an injury to the user cannot be reliably avoided when the user's hand approaches the saw blade with a fast movement.

In the prior art, it is generally known to monitor hazardous areas of sawing machines with infrared sensors or capacitive sensors in order to thus detect human body parts. However, these sensors, taken in isolation, have the disadvantage that they do not ensure a safe detection of a human body part in all applications. In addition, the safety devices known in the prior art are regularly characterized by the fact that they have a low acceptance by the operator of the machine tool. In particular, false triggering operations of the safety device cause the operator to be inclined to bypass or deactivate the safety device.

It is, therefore, an object of the invention to provide a safety device for machine tools, in particular panel-sizing circular saws and/or edge-gluing machines, by means of which the risk of an occupational accident can be further reduced compared to the prior art and which simultaneously have a high level of acceptance among the machine tool operators.

In accordance with a first aspect of the invention, the object mentioned at the beginning is achieved by means of a safety device for machine tools, in particular for a panel-sizing circular saw and/or an edge-gluing machine, with a machining tool, which is used for machining a workpiece supplied to the machine tool, comprising: a detection device designed to detect a hazardous situation of an operator of the machine tool, a hazard reduction device that is designed to initiate a safety measure for reducing the risk of injury of the operator upon receiving a hazard signal that characterizes a hazardous situation of the operator, characterized in that the detection device comprises an image capturing device coupled with an image evaluation unit for the three-dimensional detection of objects in a monitoring area, and the image evaluation unit is designed to detect a human body part, in particular a hand, preferably a bare hand and/or a hand wearing a glove, based on a comparison of images with pre-stored pattern contours and/or pattern movements and/or pattern deformations captured in real time, and is set up to generate a first position signal based on the detected body part, wherein the first position signal represents an absolute position of the human body part in the monitoring area or a relative position of a human body part to the machining tool, an electronic signal processing device is provided, which is coupled on a signal-engineering level with the detection device and the hazard reduction device and is designed to determine from the first position signal whether a hazardous situation exists, in particular, falling below a predetermined minimum distance between a body part of the user and the machining tool, and, if it has been determined that such a hazardous situation exists, to send the hazard signal to the hazard reduction device.

The detection device is designed to detect a hazardous situation of an operator of the machine tool. For this purpose, the detection device comprises an image capturing device. The image capturing device is designed for three-dimensional detection of objects within a monitoring area. The three-dimensional detection of objects involves in particular the recording of three-dimensional images, wherein this recording is preferably recorded with a high frequency of several Hertz.

The image capturing device is preferably designed as an RGB camera, as a CCD camera, as a stereo camera, as a triangulation system, as a TOF camera, as an interferometry system, and/or as a light field camera. The previously mentioned images are compared, in particular, in real time with pre-stored pattern contours and/or pattern movements and/or pattern deformations. This comparison preferably takes place in the image evaluation unit, which is coupled with the image capturing device. In the image evaluation unit, preferably, the pattern contours and/or pattern movements and/or pattern deformations are stored. For example, a pattern contour can be the characteristic geometry of a hand with fingers and a palm. A pattern movement, for example, be a typical movements of a hand and/or of fingers of a hand, which includes, for example, gripping. For example, a pattern deformation can be the bending of a finger. The image evaluation unit can be a part of the detection device or a part of the electronic signal processing device. In addition, the image evaluation unit can also be part of the hazard reduction device or be provided separately.

The image evaluation unit is also set up to generate the first position signal based on the detected body part. The first position signal represents either an absolute position of the human body part in the monitoring area or a relative position of a human body part to the machining tool. For example, the monitoring area can be a predefined space. The monitoring area is further preferably describable by coordinates relative to a fixed zero point of the safety device and/or the machine tool. The relative position of the human body part to the machining tool can occur, for example, with three-dimensional vector coordinates. For this, it is preferred that a zero point is set at a predefined position of the machining tool.

The electronic signal processing device is coupled on a signal-engineering level with the detection device and the hazard reduction device. This coupling can be wired or wireless. Furthermore, this coupling can take place directly and/or indirectly. The electronic signal processing device is furthermore designed to determine, from the first position signal, whether a hazardous situation exists.

A hazardous situation exists, in particular, when a predetermined minimum distance between a body part of the user and the machining tool has been fallen short of. However, the hazardous situation can also be defined by a multitude of other parameters. In particular, the direction of the human body part, as well as the speed of the human body part, can be taken into account. For example, there is a higher risk of injury if the direction of the human body part is directed directly towards a cutting edge of the machining tool.

In addition, there is also a higher risk of injury if the speed of the human body part is high. A low speed of the human body part in the direction of the machining tool can also occur, for example, during a typical machining, however, this is not necessarily to be assessed as a hazardous situation.

In the event that the electronic signal processing device has determined that there is in fact a hazardous situation, it sends a hazard signal to the hazard reduction device. In this context, sending means, in particular, that the hazard signal is provided. Of course, there is also the possibility that the hazard reduction device asks with a high frequency at the electronic signal processing device whether a hazardous situation exists.

The invention is based on the findings that the detection of human body parts by means of capacitive sensors and/or infrared sensors is not sufficient to be able to adequately assess a hazardous situation. In particular, the use of an image capturing device for the three-dimensional detection of human body parts offers the particular advantage that a secure detection is usually possible. In particular, due to the characteristic geometry of a hand as well as characteristic movements and deformations of the hand together with the fingers, these allow a safe detection and subsequent evaluation.

The inventors have found that the three-dimensional detection of human body parts has a low error rate. This is especially improved compared to the use of capacitive or infrared sensors. Both sensors are fault-loaded in the environment of machine tools. Infrared sensors in particular can regularly lead to misjudgements of situations in warm environments.

In accordance with a preferred design variant, it is provided that the image evaluation unit is set up to determine a second position signal based on a first detected human body part, in particular based on a finger, a hand and/or an arm, and based on pre-stored anatomical data, wherein the second position signal represents an absolute position of a second human body part in the monitoring area or a relative position of a second human body part with relation to the machining tool.

By using pre-stored anatomical data, an absolute position or a relative position of a second human body part can be determined after the detection of a first human body part. For example, by detecting a hand and the known human anatomy, the location of the corresponding lower and/or upper arm with respect to this hand can be inferred. Finally, the position of the lower and/or upper arm, which is not directly detected, can, therefore, also be taken into account when assessing the hazardous situation. As a result, the risk of injury for an operator is further reduced.

It is particularly preferred that the anatomical data are stored in a catalogued manner. The pre-stored anatomical data can be stored, for example, in the image evaluation unit, the electronic signal processing device, the detection device, and/or the hazard reduction device.

In another preferred further development of the safety device, it is provided that the image capturing device is designed as a 3D camera.

For example, the 3D camera can be designed as a stereo camera, as a triangulation system, as a TOF (time of flight) camera, as an interferometry system and/or as a light field camera. On the one hand, 3D cameras are used to give the viewer a spatial impression. On the other hand, they are used in technology for surveying or control or automation. From a technical point of view, 3D cameras are characterized, in particular, by the fact that they allow a visual representation of distances in a monitoring area.

The three-dimensional images captured with a 3D camera thus open up the possibility of measuring distances within the image. If the presence of a human body part is additionally detected in this image, a removal of this body part to predefined points, in particular, a zero point lying on the machining tool, can be made possible.

In accordance with another preferred design variant of the safety device, it is provided that the detection device comprises an infrared sensor, the output signal of which is designed to generate a third position signal via the image evaluation unit, wherein the third position signal represents a position of a human body part in the monitoring area.

The additional use of an infrared sensor makes it possible to determine a human body part even in the case of difficult-to-evaluate three-dimensional images. For example, it can be difficult for the image evaluation unit to recognize a hand on a workpiece whose surface colour corresponds to that of the human body part. In this case, either alone or, in particular, preferably in addition, the information of the infrared sensor can also be used in order to clearly identify the hand. In particular, in the case of wooden workpieces, this can be particularly favourable since wooden workpieces usually have a different surface temperature than human body parts.

In another preferred design variant of the safety device, it is provided that two or more safety measures can be initiated with the hazard reduction device, wherein at least two of the executable safety measures differ with regard to the reduction of the risk of injury of an operator.

It is furthermore preferred that, with the hazard reduction device, a safety measure can be initiated, which consists of a simultaneous deceleration of a rotational movement of the machining tool and a lowering of the machining tool, wherein the deceleration and the lowering are preferably carried out by two independent devices.

Safety measures can differ significantly in terms of their potential to reduce the risk of injury. For example, lighting a warning light only slightly reduces the risk of injury. Stopping and simultaneously lowering a saw blade of a sawing machine in turn significantly reduces the risk of injury of a hazardous situation, since the combination allows, among other things, for the risk of injury from large saw blades to also already be reduced directly by the initial phase of the safety measure.

Due to the deceleration caused by independent devices, on the one hand, and the lowering on the other, a redundant composition of the safety measure is achieved, which still achieves a reduction in the risk of injury even in the case of one of the two devices failing. In this case, it can also be provided that the device, which is provided for braking, supports the lowering process, for example, by a braking moment, which acts on a rocker bearing of the saw blade.

Furthermore preferably, the path on which the saw blade is lowered can preferably extend in such a way that the distance of the saw blade to a body part, which is arranged radially outward and adjacent to the saw blade, is increased from the beginning of the lowering process. This achieves a rapid and immediate reduction in the risk of injury.

Furthermore, it is preferred that the hazard signal contains information regarding a hazard potential of the hazardous situation, wherein, preferably, the hazard reduction device initiates a first safety measure in the case of a hazardous situation below a predetermined threshold of the hazard potential and, in the case of a hazardous situation above this threshold, initiates a second safety measure, wherein the predetermined threshold of the hazard potential can preferably be adjusted via a user interface.

The hazard potential of a hazardous situation is preferably predictable. In particular, it is preferred that parameters of the machine, of the movement of the human body part and/or of the person are taken into account. In the case of the machine, for example, the inertia of the circular saw blade or the overhang of the circular saw blade above the workpiece support surface can be taken into account. In the case of the movement of the human body part, the influencing factors to be taken into account for the danger potential of a hazardous situation, for example, are the distance of the human body part to the machining tool, the movement direction of the human body part with regard to the machining tool, and the speed of the human body part. For example, in the case of the person, the person's experience can be taken into account by means of an input on the machine control system, for example, as to whether he/she is a person in training or a person with many years of experience.

In addition, other influencing factors can also be taken into account, such as the condition of the machine tool. For example, in the case of a hazard potential below the predetermined threshold, only a first safety measure with a low potential of a hazard reduction can be used.

The first safety measure can, therefore, be, for example, the illumination of a warning lamp or the slight reduction of the speed. Above the predetermined threshold, the second safety measure can then be initiated, which enables, for example, a high potential for hazard reduction. The second safety measure can be, for example, the stopping and/or lowering of a circular saw blade. It is also preferred that two or more predetermined thresholds of the hazard potential are defined and that, for each hazard potential area between two thresholds, a defined safety measure is predetermined and can be initiated by the hazard reduction device.

In particular, it is preferred that a first safety measure is characterized by a reduction of a movement speed, in particular, a rotational speed, of the machining tool, in particular, by a reduction between 5% and 35%, and a second safety measure is characterized by moving the machining tool out of the monitoring area, in particular, by moving the machining tool, in particular, a circular saw blade, under a workpiece support surface of a saw table, wherein the movement preferably proceeds on a movement path, which causes an increase in the distance between the detected position of the human body part and the machining tool at least within an initial range of the movement path.

Furthermore, it is preferred that the image capturing device comprises two or more, in particular, four, image capturing units, wherein, preferably, the two or more image capturing units are arranged on a fastening device.

Two or more image capturing units allow objects in the monitoring area to be detected in a three-dimensional manner from different perspectives. As a result, the quality of the images captured in real-time can be improved. In particular, an inevitably resulting change of perspective can lead to an improved overall quality, as, for example, individual images can have a lower quality, for example, due to coverings, particles in the air, or shadowing. In particular, the image capturing units can be arranged on a common fastening device. A defined distance of the image capturing units away from each other simplifies image analysis. The fastening device is preferably arranged above the workpiece support surface. This results in a favourable detection range and viewing angle of the image capturing units.

In accordance with another preferred further development of the safety device, it is provided that the image capturing device is set up in order to detect a hand movement and/or a finger movement in a three-dimensional manner and the electronic signal processing device is set up to compare the detected hand movement and/or the finger movement with at least one predefined gesture, wherein a control command for the at least one predefined gesture is stored in the signal processing device, wherein, in the case of sufficient accordance of the detected hand movement and/or the finger movement with the at least one predefined gesture, a control signal characterizing the stored control command is provided.

The control command can preferably be selected arbitrarily from the different required control commands for a machine tool. For example, a control command for a panel-sizing circular saw can be a measurement correction. This measurement correction can then be done, for example, with one or a plurality of fingers.

In accordance with a further aspect of the present invention, the object mentioned at the beginning is achieved by a machine tool, in particular, a panel-sizing circular saw and/or an edge-gluing machine, comprising a safety device according to one of the previous design variants.

A preferred further development of the machine tool is characterized in that the image capturing device is arranged in the vertical direction over a workpiece support surface, wherein, preferably, the image capturing device is arranged on a fastening device, wherein, preferably, the fastening device is furthermore designed as a protruding arm.

By arranging the image capturing device of the safety device over the workpiece support surface of the machine tool, a good detectability of hazardous situations, in particular, a good three-dimensional detection of objects in the monitoring area, is made possible by the image capturing device.

The fastening device can be arranged, for example, on a telescopic arm, which is primarily intended for holding the protective cover and/or for holding a machine control system. In addition, the fastening device can be provided as a separate arrangement on the machine tool.

In addition, it is preferred that the image capturing device is arranged on a protective cover provided for at least partial enclosing of the machining tool for shielding the machining tool, in particular a circular saw blade.

Protective covers are usually arranged over a circular saw blade of a table saw, in particular, a panel-sizing circular saw, in order to reduce the hazard potential of the circular saw blade. By the arrangement of the image capturing device on the protective cover, the detection of the objects in the monitoring area can, therefore, occur in the proximity of the machining tool of the machine, from which the greatest hazard potential emanates.

The image capturing device is preferably arranged on a front side of the protective cover, which is facing the unmachined workpiece during operation. In addition, the image capturing device can also be arranged on a back side of the protective cover, wherein the back side in operation is facing away from the unmachined workpiece and is facing the machined workpiece. In addition, the image capturing device can also be arranged on a longitudinal side of the protective cover, which is substantially aligned parallel to a feed direction of the machine tool.

In accordance with another preferred further development of the machine tool, it is provided that the protective cover comprises a signal transmitter, which is set up for receiving a condition signal and for the output of a condition signalization, wherein the condition signal characterizes a condition of the safety device and the condition signalization signals this condition to an operator.

In another preferred design variant of the machine tool, it is provided that the detection device is designed to detect a position of a or the protective cover provided for at least partial enclosing of the machining tool and preferably to compare the position with a predetermined setpoint, wherein the position is preferably a clearance of a lower edge of the protective cover in the vertical direction above the workpiece support surface.

The protective cover is provided for increasing work safety on a machine tool, in particular, on a panel-sizing circular saw. The adequate position of the protective cover is necessary to fulfil this purpose. As a general rule, at least one distance equal to the workpiece thickness is to be provided between the workpiece support surface and the lower edge of the protective cover. The predetermined setpoint can, therefore, be provided, for example, from a machine control system, wherein the setpoint is usually selected adding a predetermined extra amount to the workpiece thickness.

In accordance with another preferred further development of the machine tool, it is provided that a machine control system and/or a separate computing unit comprises or comprise the image evaluation unit, the electronic signal processing device and/or the hazard reduction device. The separate computing unit can, for example, be a separate computer.

In addition, the machine tool can be further developed in an advantageous manner by this comprising a parallel end-stop to guide an edge of a plate-shaped workpiece parallel to a feed direction, and a sensor device, in particular, with a capacitive sensor, for the generation of an edge sensor signal, wherein the edge sensor signal characterizes a cutting start or a cutting end, and the edge sensor signal controls an actuator of the parallel end-stop in such a way that a guiding clamping distance for clamping a workpiece between a circular saw blade and the parallel end-stop is eliminated.

In addition, it is preferred that the detection device and/or the sensor device is or are set up to determine a workpiece speed of a leading edge and/or a trailing edge of a workpiece, in particular a plate-shaped workpiece, and the electronic signal processing device is also set up to compare the workpiece speed with a body speed of the detected human body part, and preferably, when a specified differential speed between the workpiece speed and the body speed is exceeded, to send the hazard signal to the hazard reduction device, and/or the electronic signal processing device is designed to send the hazard signal to the hazard reduction device in the case of a determined workpiece speed and no detection of a human body part.

By comparing the workpiece speed with the body speed, a slipping of the operator from the workpiece can be detected. As long as an operator has his/her hands on the workpiece, the hazard potential is often lower than if the operator slips off the workpiece.

If a workpiece speed is determined and no detection of a human body part is detected, in particular, in the case of a substantially manually operated machine, this can indicate that the detection device has an error or the image capturing device is covered.

In accordance with another preferred further development, it is provided that this comprises a sliding carriage that is arranged on a frame and is moveable in the feed direction, which comprises a feed sensor unit designed to determine a feed speed, which preferably comprises a magnetic strip and a corresponding sensor, wherein the electronic signal processing device is set up to compare the feed speed of the sliding carriage with a body speed of the detected human body part, and preferably, when a specified differential speed between the feed speed and the body speed is exceeded, to send the hazard signal to the hazard reduction device.

A high differential speed between the feed speed of the sliding carriage and the body speed of the human body part can also suggest that the operator has slipped off the sliding carriage and/or the workpiece. Any slipping on such machines carries a significant risk of injury, which justifies sending the hazard signal.

In addition, it is preferred that the detection device, the image evaluation unit, and/or the signal processing device is or are constructed as a redundant data processing system, in which at least two independent, coinciding, or different data processing units are present in the data processing system and, in the event of a failure of one of the data processing units, one or the other data processing unit takes over the data processing, and/or is or are constructed as a diversified data processing system where at least two independent different data processing units are present in the data processing system and are operated simultaneously and where a comparison unit is present, which compares the output signals of the at least two data processing units and issues an error message if a predetermined deviation value has been exceeded. For example, the data processing units can have two parallel software modules. In particular, it is preferred that the results of these software modules can be compared with each other.

Furthermore, it is preferred that an optical signal device located in the field of view of a user is present and is controlled by means of the hazard signal, wherein the signal device can output at least two, preferably three different signals and each of the signals is assigned to a predetermined hazard potential and signals this.

Furthermore, it can be preferred that one or the optical signal device lying in the field of view of a user is arranged, which is formed as a signal device extending along a movement direction of the machining tool.

Furthermore, it is preferred that the signal device in a first mode signals a non-hazardous condition, in a second mode signals a machining condition, and in a third mode signals a hazardous situation. If necessary, only two modes can also be signalled, preferably the third mode and the first or the second mode. The two or three modes can, for example, differ in a colouring of a light signal, a flashing ID, for example a flashing frequency or flashing time, a light signal, or an expression as a running light or speed of such a running light, which is formed by a plurality of light sources arranged along a row.

In the first mode, preferably a green light or a white light is emitted. In the second mode, furthermore, a yellow light is preferably emitted and/or a running light is emitted and/or indicated in the movement direction of the tool. In the third mode, in particular, a light associated with a warning is emitted. This is preferably a red light and/or a flashing light.

For further advantages, design variants and design details of the machine tool and its possible further developments, reference is also made to the previous description of the corresponding features and further developments of the safety device.

BRIEF DESCRIPTION OF THE DRAWINGS

A preferred embodiment of the invention is described using the enclosed Figures. The Figures show.

DETAILED DESCRIPTION OF THE EMBODIMENTS

Figure 1:
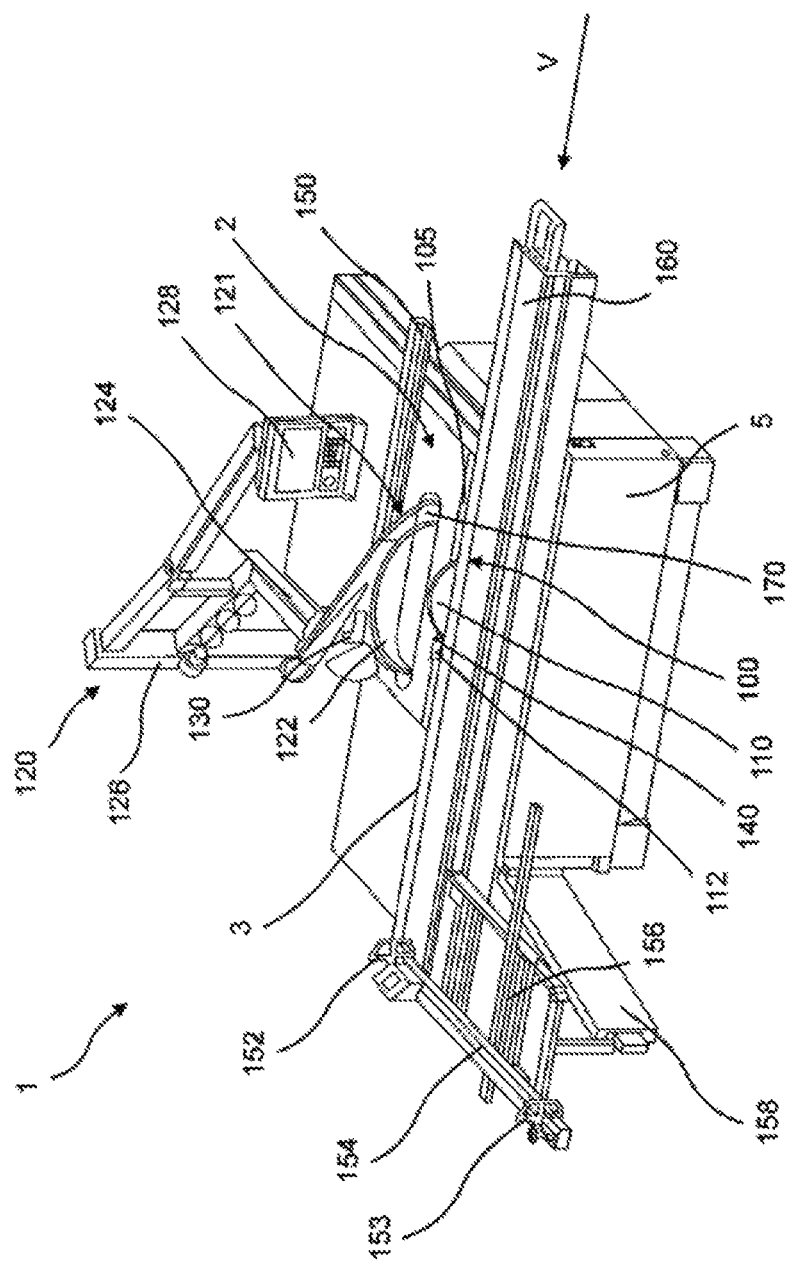
FIG. 1 is a schematic, three-dimensional view of an exemplary embodiment of a panel-sizing circular saw.

In the Figures, identical components or ones that are essentially identical or similar in terms of function are denoted with the same reference numbers.

The panel-sizing circular saw 1 comprises a machine base frame 5, in which a circular saw blade 110 is arranged on a saw unit (not visible). The circular saw blade 110 protrudes upwardly out of a workpiece support surface 2. Furthermore, a roller carriage 160 is arranged on the machine base frame 5, which is linearly guided for a linear movement in the horizontal direction along a saw line 3 of the circular saw blade 110. An angular mitre end-stop 156 is attached to the roller carriage 160, which moves with the roller carriage 160 and carries an angular stop rail 154. On the angular stop rail 154, workpieces lying on the roller carriage 160 and a supporting surface of the angular mitre end-stop 156 can be applied with one edge in order to adjust a defined angular orientation by means of this and to maintain it during the saw cut.

Along the angular stop rail 154, two stop flaps 152, 153 are moveable in the longitudinal direction of the angular stop rail 154 and arranged fixably thereon. By means of the stop flaps 152, 153, another edge of the workpiece can be held in a defined position to thereby adjust a cutting dimension. The angular mitre end-stop 156 can be pivoted in a horizontal plane in the manner of a parallelogram, whereby the angular stop rail 154 can be aligned in different angular positions to the saw line 3.

By means of a telescopic arm 158 pivotably attached to the machine base frame 5, the outer edge of the angular mitre end-stop 156 is supported in the vertical direction in order to be able to carry a workpiece. Furthermore, a parallel end-stop 150 is arranged on the workpiece support surface 2, which extends parallel to the saw line 3 and forms an alternative or additional contact surface for a workpiece edge if a cut is to be performed that is intended to run parallel to an edge of the workpiece.

The panel-sizing circular saw 1 furthermore comprises a detection device 170, which is arranged on the protective cover 121. The detection device 170 can also be arranged on separate devices, for example articulated arms or also on the workpiece table. The detection device 170 can be designed as an image detection device or can comprise the latter. In addition, the detection device 170 can have at least one capacitive sensor and/or at least one infrared sensor. In addition, it is preferred that the panel-sizing circular saw 1 comprises an image evaluation unit, wherein the image evaluation unit is preferably encompassed by the detection device 170 and/or a control device. Further, the panel-sizing circular saw 1 comprises a display device 128 with the control device.

The panel-sizing circular saw 1 also comprises a protective cover 121. The protective cover 121 comprises a protective cover housing 123, which encloses a protective cover interior 122 from five sides in total. The downwardly-directed side of the protective cover interior 122 is open. By means of this open side, the protective cover 121 can be moved closer to the circular saw blade 110 and, in the case of an appropriate arrangement of the protective cover 121, it can cover the circular saw blade at least in sections in order to prevent operators from getting injured. In addition, the protective cover 121 preferably comprises a chip suction system, with which chips resulting from the cut can be removed from the cutting zone.

The protective cover 121 is arranged on an articulated arm device 120. The protective cover 121 is arranged directly on an articulated arm 124, wherein this has a plurality of joints. In turn, the articulated arm 124 is arranged on a vertically orientated retaining post 126.

The panel-sizing circular saw 1 also comprises a first output device 130 for outputting a mitigation element, wherein the output device 130 is arranged and designed in such a way as to output the mitigation element from a storage unit (not shown here) in the direction of the circular saw blade 110 as a safety measure. The first output device 130 is arranged on the protective cover 121 and designed in such a way that the mitigation element is applied inside the protective cover interior 122 onto the circular saw blade 110. The storage unit for the mitigation element, which is output by the first output device 130, is preferably on the back of the panel-sizing circular saw (not shown in FIG. 1). For this purpose, the storage unit (not shown) is connected to the first output device 130 by a transport device to supply the first output device 130 with the mitigation element.

The panel-sizing circular saw 1 also comprises a second output device 140 for outputting a mitigation element, wherein the mitigation element can be output as a safety measure from the storage unit in the direction of the circular saw blade 110. The second output device 140 is arranged in the workpiece-related feed direction behind the circular saw blade 110. The second output device 140 is at least partially encompassed by the splitting wedge 112, so that the mitigation element is preferably output at the splitting wedge 112.

In the present case, the panel-sizing circular saw 1 comprises a first output device 130 and a second output device 140. The favourable effect of a shielding of the circular saw blade 110 by means of a mitigation element can already be implemented by means of the arrangement of a single output device. In the present design variant with two output devices 130, 140, other favourable effects can be achieved, wherein, in particular, the even quicker and more comprehensive mitigation of the circular saw blade 110 is made possible by means of a mitigation element.

In addition, the circular saw blade 110 is arranged in such a way on the saw unit that this is lowerable. In particular, the circular saw blade 110 can be lowered within a few tenths of a second, so that lowering is suitable as a safety measure.

Figure 2:
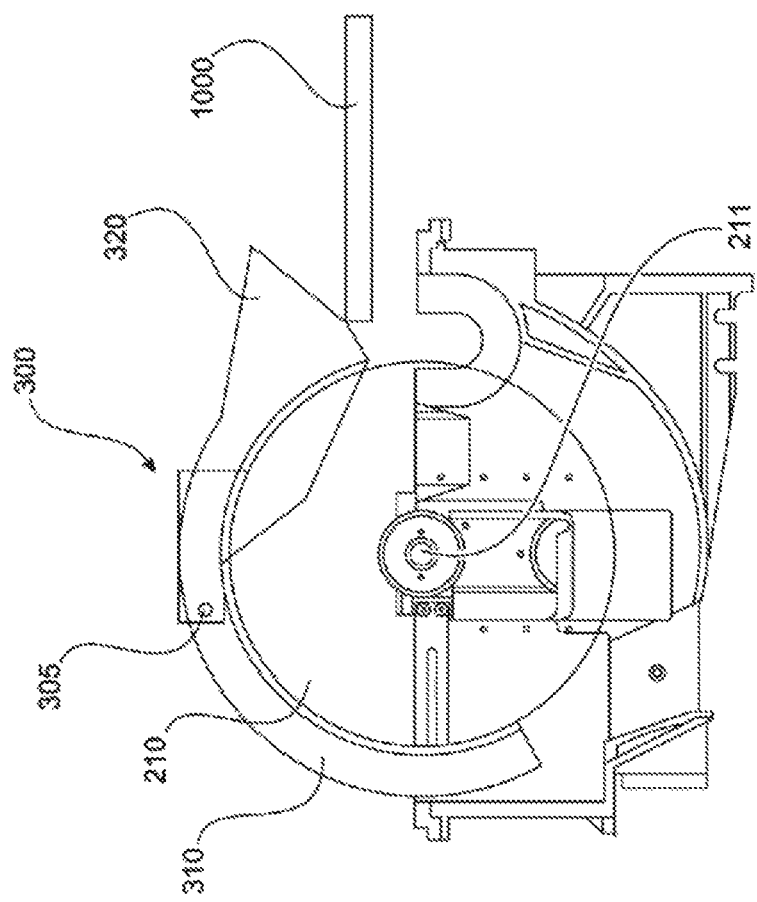
FIG. 2 is a schematic, two-dimensional detailed view of an exemplary embodiment of a safety device with a first workpiece position.
Figure 3:
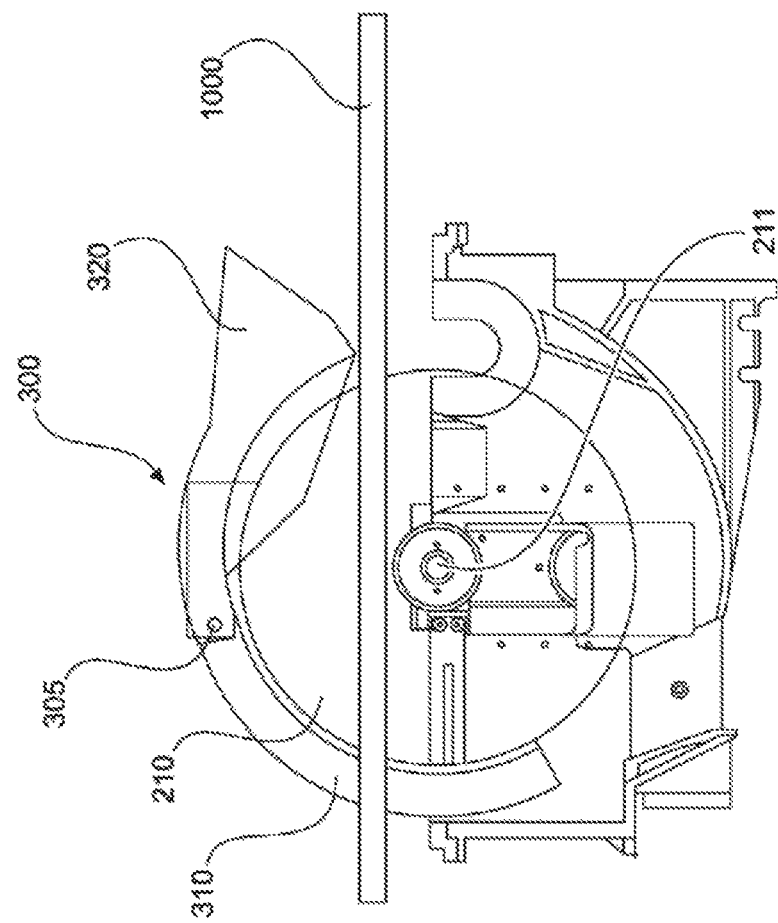
FIG. 3 is a schematic, two-dimensional detailed view of the safety device of FIG. 2 with a second workpiece position.
Figure 4:
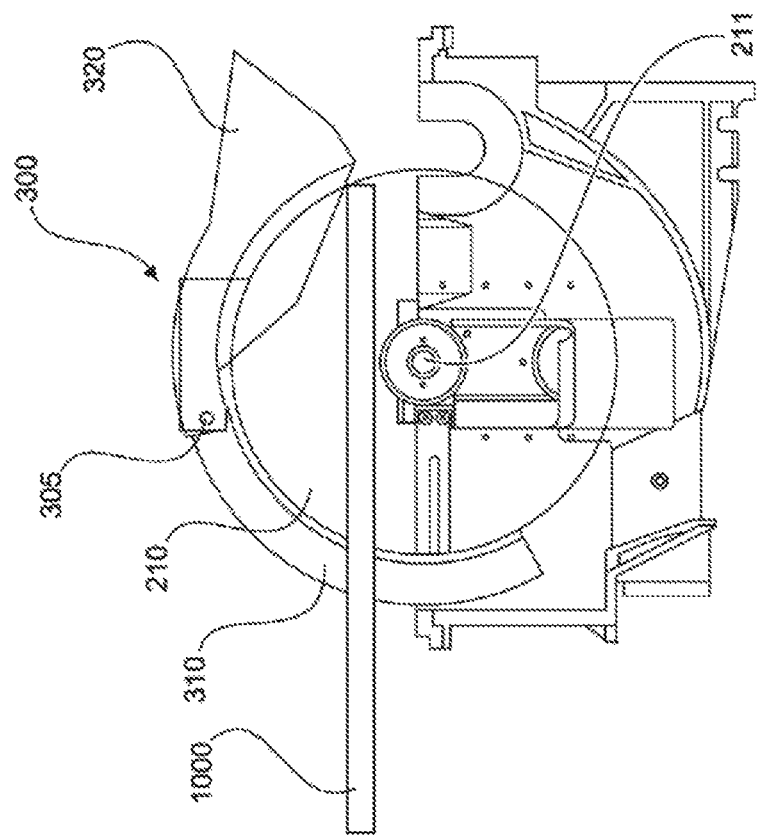
FIG. 4 is a schematic, two-dimensional detailed view of the safety device of FIG. 2 with a third workpiece position.

In FIGS. 2 through 4, a shielding element 300 is shown, wherein the shielding element 300 has a fixed shielding element 310 and a moveable shielding element 320, wherein the moveable shielding element 320 is moveably arranged around a horizontal axis at a pivot point 305, which, in particular, is orientated parallel to the rotational axis 211 of the circular saw blade. The moveable shielding element 320 is arranged on the fixed shielding element 310 in a foldable manner. The sequence of the folding operation can be seen from FIGS. 2 through 4. In FIG. 2, it is shown how a workpiece 1000 approaches the moveable shielding element 320.

Due to the geometry of the moveable shielding element 320, this is folded upwardly in a vertical direction, so that the workpiece 1000 can be guided through under the moveable shielding element 320. This guiding through of the workpiece 1000 under the moveable shielding element 320 can, in particular, be seen in FIG. 3.

Figure 5:
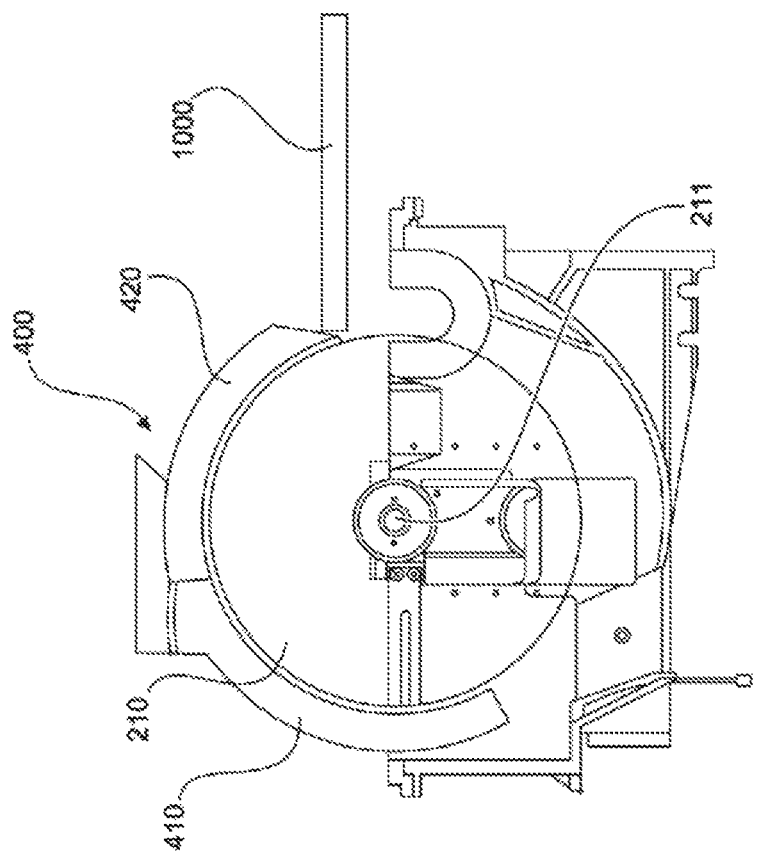
FIG. 5 is a schematic, two-dimensional detailed view of another exemplary embodiment of a safety device with a first workpiece position.
Figure 6:
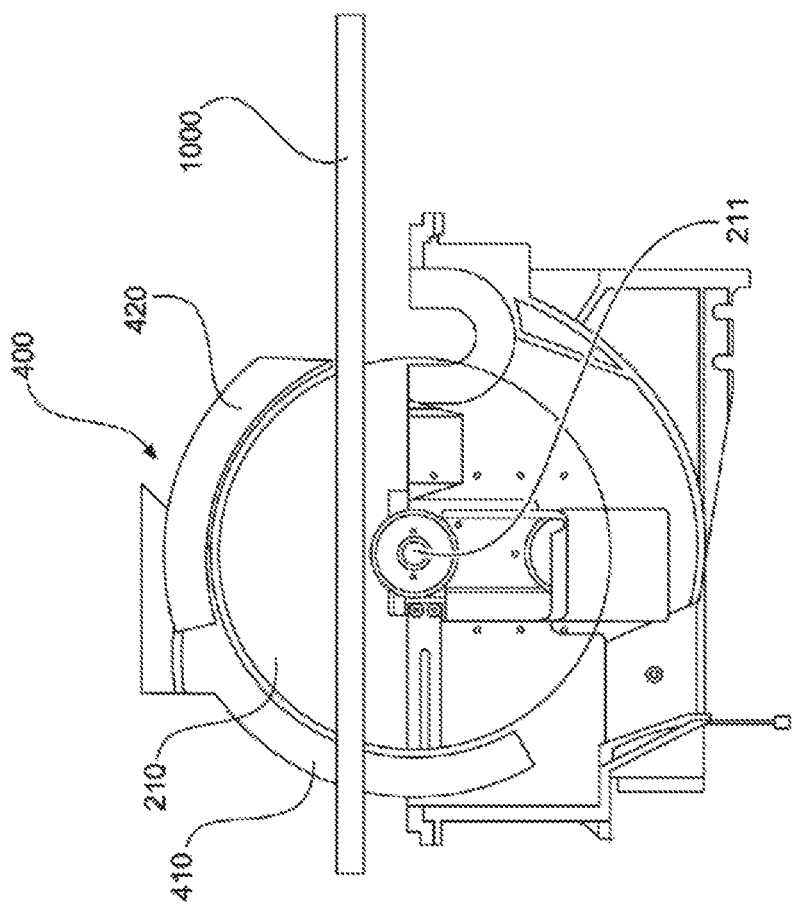
FIG. 6 is a schematic, two-dimensional detailed view of the safety device of FIG. 5 with a second workpiece position.
Figure 7:
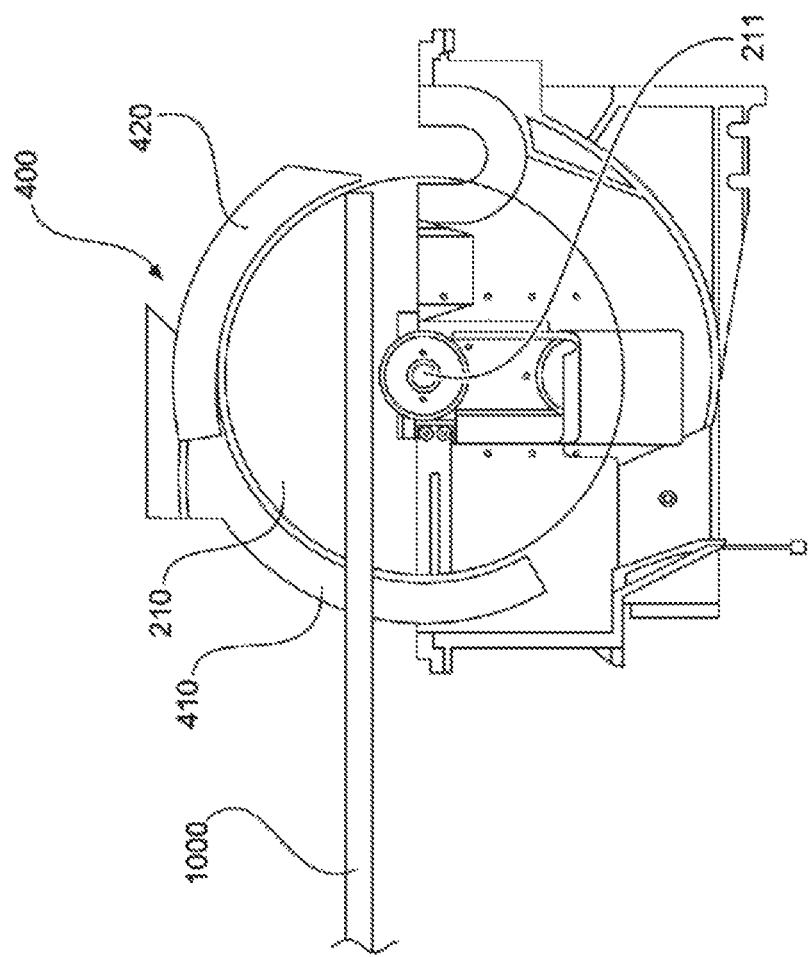
FIG. 7 is a schematic, two-dimensional detailed view of the safety device of FIG. 5 with a third workpiece position.

In FIGS. 5 through 7, an alternative embodiment for a shielding element 400 is shown. The shielding element 400 also comprises a fixed shielding element 410 and a moveable shielding element 420. However, compared to the embodiment described above, the moveable shielding element 420 is arranged on the fixed shielding element 410 in an essentially non-foldable manner, but is moveable in the tangential direction relative to the fixed shielding element 410.

When a workpiece 1000 approaches the safety device, as shown in FIGS. 5 through 7, the moveable shielding element 420 is shifted in the tangential direction counter-clockwise. By this displacement in the counter-clockwise tangential direction, a gap is freed up between the moveable shielding element 420 and a workpiece support surface, through which the workpiece 1000 can be guided. FIGS. 6 and 7 show, in particular, how the workpiece 1000 is guided through the safety device.

The shielding elements 300, 400 are, in particular, arranged and designed in such a way as to shield the saw teeth in the radial direction with respect to the axis of rotation 211 of the circular saw blade 110 at least in sections in a shielding position in the area above the workpiece 1000 support surface. The shielding element 300, 400 encloses the saw teeth in the radial direction and preferably also in the axially lateral direction in relation to the axis of rotation 211 of the circular saw blade 210.

A panel-sizing circular saw 1 with output devices 130, 140 for mitigation elements and/or with shielding elements 300, 400 and/or with a lowerable circular saw blade 110 can increase the safety of operators and other persons. Due to the shielding element 300, 400, an operator has a lower chance of coming into contact with the circular saw blade 110, 210 during operation. In addition, a not insignificant part of the circumference of the circular saw blade 210 is covered by the shielding element 300, 400 so that even for a person who is not operating the panel-sizing circular saw 1, there is a lower risk of injury caused by the circular saw blade 210.

In addition, the panel-sizing circular saw 1 comprises a detection device 170, which monitors a monitoring area. Within the monitoring area, the detection device 170 detects hazardous conditions for human body parts by the circular saw blade 110, wherein injuries to human body parts can be avoided due to the output device 130, 140. For this purpose, the panel-sizing circular saw 1 furthermore comprises a control device, which is arranged and designed to initiate a safety measure by means of the output device 130, 140 or the lowerable circular saw blade 110 as a result of a detection of the at least one hazardous condition by means of the detection device 170.

Figure 8:
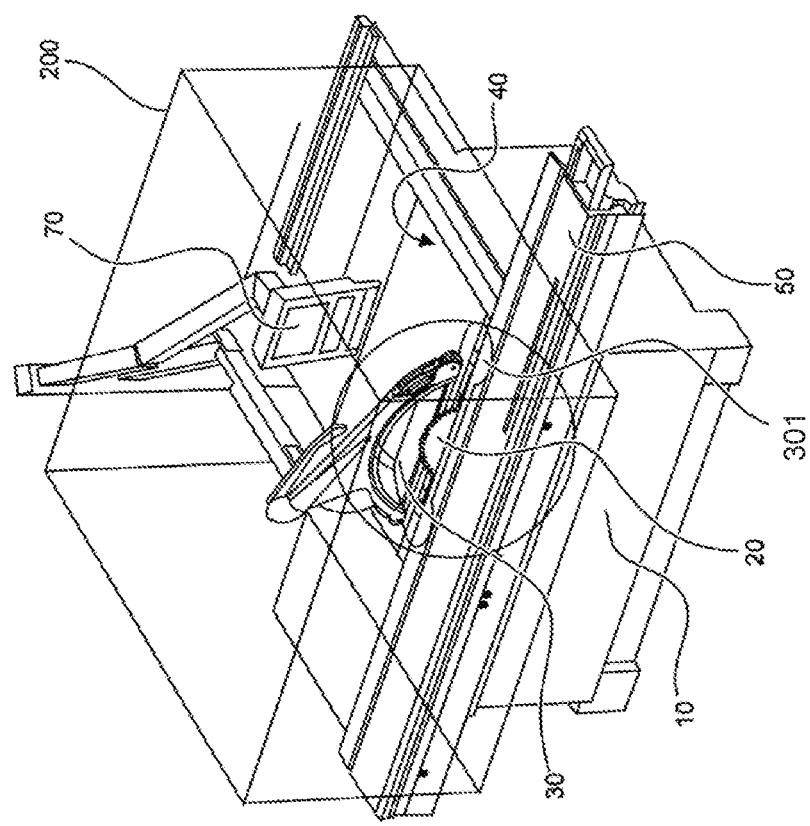
FIG. 8 is a perspective view of a machine tool equipped with the safety device according to the invention.

Referring initially to FIG. 8, a machine tool in the form of a panel-sizing circular saw basically comprises a machine base frame 10, in which a machining tool in the form of a circular saw blade 20 is mounted so as to be rotatable around an axis of rotation and pivotable around a horizontal pivot axis lying in the saw blade plane, and so as to be adjustable in its vertical height. Above the circular saw blade 20, a protective cover 30 is attached to a boom arm, which is adjustable in height.

The circular saw blade 20 is embedded in a workpiece support surface 40. Directly adjacent to the circular saw blade 20, a slide 50 that is moveable in a horizontally translational manner is mounted on the machine base frame 10.

On the slide 50, a workpiece can be mounted and moved together with the slide 50 parallel to the saw blade plane, whereby a cut is carried out with the circular saw blade rotating.

The panel-sizing circular saw also comprises a control and operating unit 70, which is attached to an arm boom and which includes user interfaces and electronic control units necessary to operate the panel-sizing circular saw. In this control and operating unit 70, a signal processing unit is also integrated, which is in communication with all components for the safety device according to the invention and determines the necessary signal processing steps for detecting a hazardous condition and for initiating a hazard reduction measure.

Within a monitoring area 200, which is designed as a cubic space on the workpiece support surface, the safety device monitors whether a signalling unit is located in the area of the machine tool and is located in a hazardous situation or moves into a hazardous situation.

Figure 9:
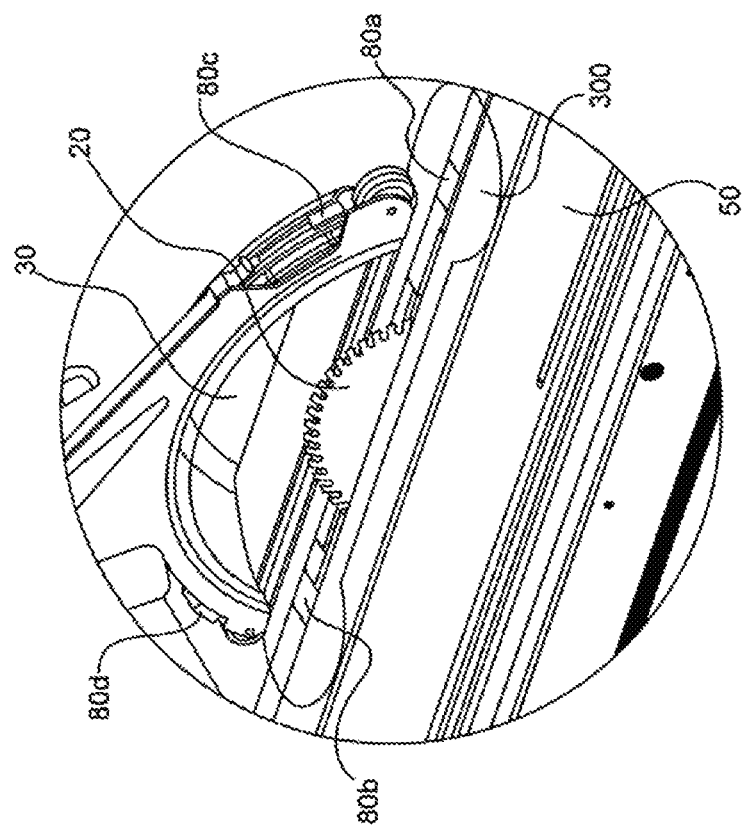
FIG. 9 is an enlarged detailed view of FIG. 8.

FIG. 9 shows a section of FIG. 8 showing the signal receiving units on the machine tool that are relevant for the safety device. As can be seen, a respective signal receiving unit 80a, 80b is inserted into the workpiece support surface 40 in the cutting direction before and after the saw blade; the workpiece support surface is designed with an element made of a nonmetallic material in this area, for example, a plastic element, that lies flush with the workpiece support surface and allows for a particularly good reception of data, which are necessary for the safety device. Another two signal receiving units 80c and 80d are attached to the protective cover 30 and are moveable together with this. These signal receiving units 80c, 80d also comprise an integrated signalling unit, which allows a position determination of the signal receiving units 80c, 80d with the aid of the signal receiving units 80a and 80b in a precise manner. Basically, it is to be understood that the signal receiving units 80c,d can be provided in addition to the signal receiving units 80a, 80b or instead of these, i.e., as individual signal receiving units, and also embodiments can be implemented, which comprise a stationary signal receiving unit and a signal receiving unit that is arranged in a moveable manner. The determination of the position of the signal receiving units 80c, 80d can also be carried out by means of a signalling unit arranged in a stationary manner on the machine tool, for example, a signalling unit embedded in the workpiece support surface, the relative position of which to the signal receiving units 80c, 80d is determined by the signal receiving units 80c, 80d themselves and thus enables a position determination of the signal receiving units 80c, 80d. The position determination of the signal receiving unit 80c, 80d is used in the calculation of the position of a body part of a user with respect to the position data received from the signal receiving unit 80c, 80d.

A hazardous area depicted in the symbolic horizontal section, which extends around the circular saw blade 20 and is widened at both the front as well as the rear end, is recognizable so that a bone-shaped geometry results in the horizontal section. The monitoring area is to be understood as rotationally symmetrical space arranged around the axis of rotation of the circular saw blade with the cross section 301. If it is determined that a part of the body is in the hazardous area or is very likely to move into this hazardous area in the near future, this is the determination of a hazardous situation that prompts a hazard reduction measure.

Figure 10:
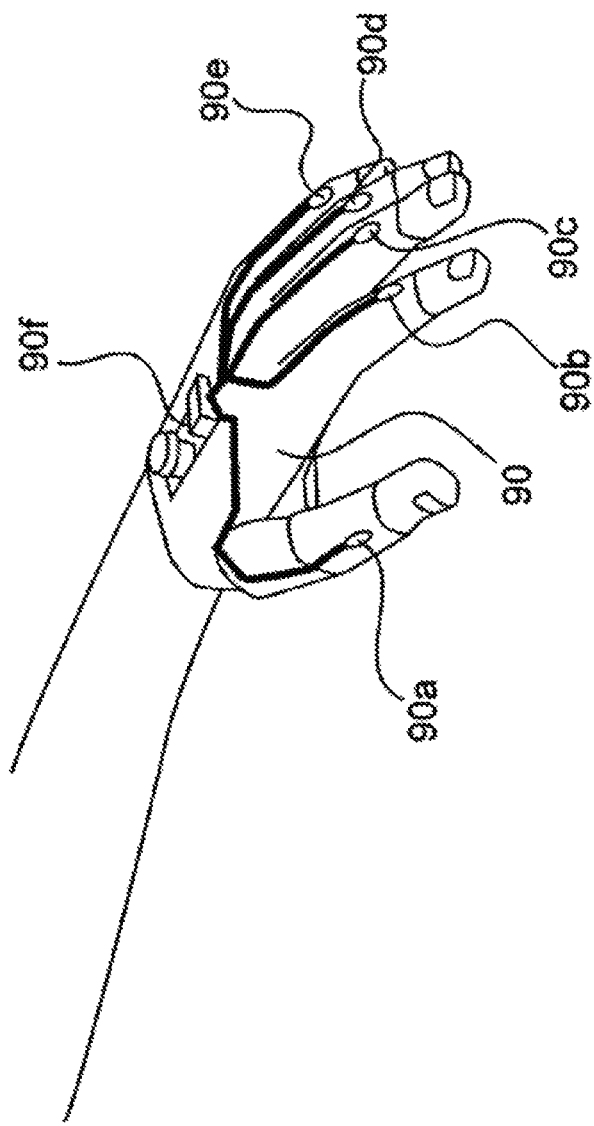
FIG. 10 is a schematic view of an arm of a user wearing appropriate equipment for the safety device according to the invention on a glove.

FIG. 10 shows a forearm and the hand of a user, which is equipped for the use of the safety device according to the invention with a corresponding glove 90. The glove 90 can be designed in such a way that it does not cover the user's fingertips, so that fine, tactile, and haptically favourable work is possible. A signalling unit 90a, 90b, 90c, 90d, 90e is attached to each of the user's five fingers in each case above the second finger link on the glove. This signalling unit includes detector components, in particular, three coils that are respectively perpendicular to one another, which are capable of detecting a field strength of an electromagnetic field emitted by each of the signal receiving units 80a, 80b, 80c, 80d.

The field strength of this electromagnetic field, which is determined by each of the five signalling units 90a, 90b, 90c, 90d, 90e in the detector components, is directed via cable lines that run along the glove surface, in particular, laminated in the glove, or able to be firmly connected to this, to a control unit 90f, which is attached to the glove in the area of the back of the hand. The control unit 90f is also part of the totality of the signalling device, which is attached to the glove. The control unit 90f also comprises a separate, sixth signalling unit, which is attached to the glove and which is constructed in the same way as the signalling units 90a, 90b, 90c, 90d, 90e. Furthermore, a battery is integrated into the control unit, which can be recharged again, as well as a transmitting and receiving unit, which is designed to perform a data exchange with the signal receiving units. The control unit 90f receives the respective field strengths determined by each detector component of the signalling units 90a, 90b, 90c, 90d, 90e and the self-integrated signalling unit, which can be understood as position components. These position components are sent from the transmitting unit of the control unit 90f in response to a query signal to one of the signal receiving units 80a, 80b, 80c or proactively without such a query signal and can be transmitted by one of the signal receiving units or a superordinate receiving unit integrated for example into the operating and control unit 70. This data provides precise information about where the hand and the individual five fingers of the hand are located.

The signal processing device integrated into the operating and control unit 70 receives this position data and is designed to calculate a position of the hand from it by calculating the relative position of the hand to the three signal receiving units 80a, 80b, 80c from the field strength signals. The signal processing device has also stored geometric data describing the position of the saw blade, its spatial dimensions and other geometric data relevant to safety of the machine tool itself. The signal processing device also receives machine data describing a movement and position of this circular saw blade and other components, and is, therefore, able to precisely determine the geometric positions of the relevant hazardous components of the machine tool. From these geometric data of the machine tool, on the one hand, and the position data of the body parts of the user equipped with the signalling units, the signal processing device can determine a position, a speed, and an acceleration of the respective body parts in relation to the components of the machine tool and thus a distance to the hazardous components. If it is found that this distance, in connection with the movement speed and acceleration for one of the body parts, would result in contact with the circular saw blade for the near future, a determination of a hazardous situation is at hand and the signal processing device causes the control system of the machine tool to take a measure to reduce this hazardous situation.

The machine tool can be equipped for this purpose, for example, to perform a quick stop of the circular saw blade 20, to move the circular saw blade 20 under the table in a short time or other measures can be taken as described above.

Figure 11:
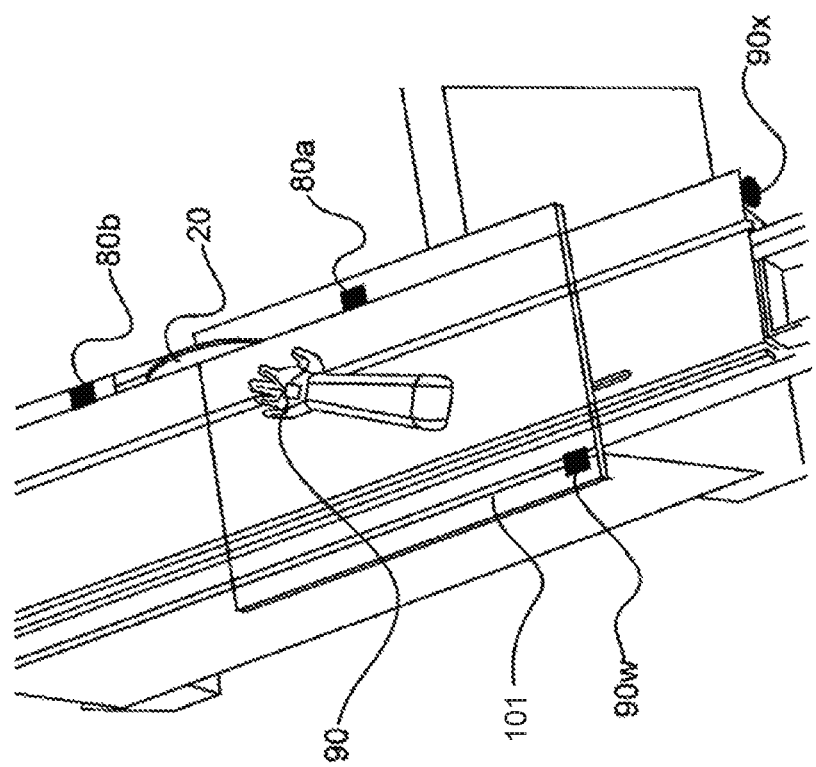
FIG. 11 is a perspective top view of the machine tool with a symbolically represented hand and arm of a user in a machining situation.

FIG. 11 symbolically shows such a situation in which a workpiece 101 is pushed forward by the user's hand on the tool slide to perform a saw cut. As can be seen, the hand is equipped with the glove 90 in accordance with FIG. 10 and is located in an area on the side and between the signal receiving units 80a, 80b. The signal receiving units 80a, 80b determine a precise position of the hand and the individual fingers of this hand and can, therefore, detect that, if the user passes his/her hand together with the workpiece 101 further parallel along the circular saw blade 20, a hazardous situation would be avoided. However, if, due to a slipping of the hand on the workpiece, now a movement of the hand in the direction of the circular saw blade 20 takes place, a speed and approach towards the circular saw blade 20 would be detected thereby, which would have to be characterized as a hazardous situation. In this case, an injury to the hand is avoided by stopping the circular saw blade 20 and lowering the circular saw blade 20 under the workpiece support surface before contact between a finger or the hand of the user and the circular saw blade 20 can occur.

As can furthermore be seen in FIG. 11, an additional signalling unit 90w is attached to the workpiece, which at the same time allows a detection of the position and movement of the workpiece by the signal receiving units 80a, 80b, 80c, 80d, thereby making a direct comparison of the movement of the hand and the workpiece possible.

Furthermore, an additional component signalling unit 90x is attached to the underside of the slide 50, which makes a direct detection of the position and movement speed of the slide by the safety device possible. These additional signalling units 90w and 90x make it possible to directly detect undesirable relative movements between the hand and workpiece, the hand and the slide or the workpiece and the slide, which may be characterized as a hazardous situation, thereby directly detecting a hazardous situation or a component of a hazardous situation.

Figure 12:
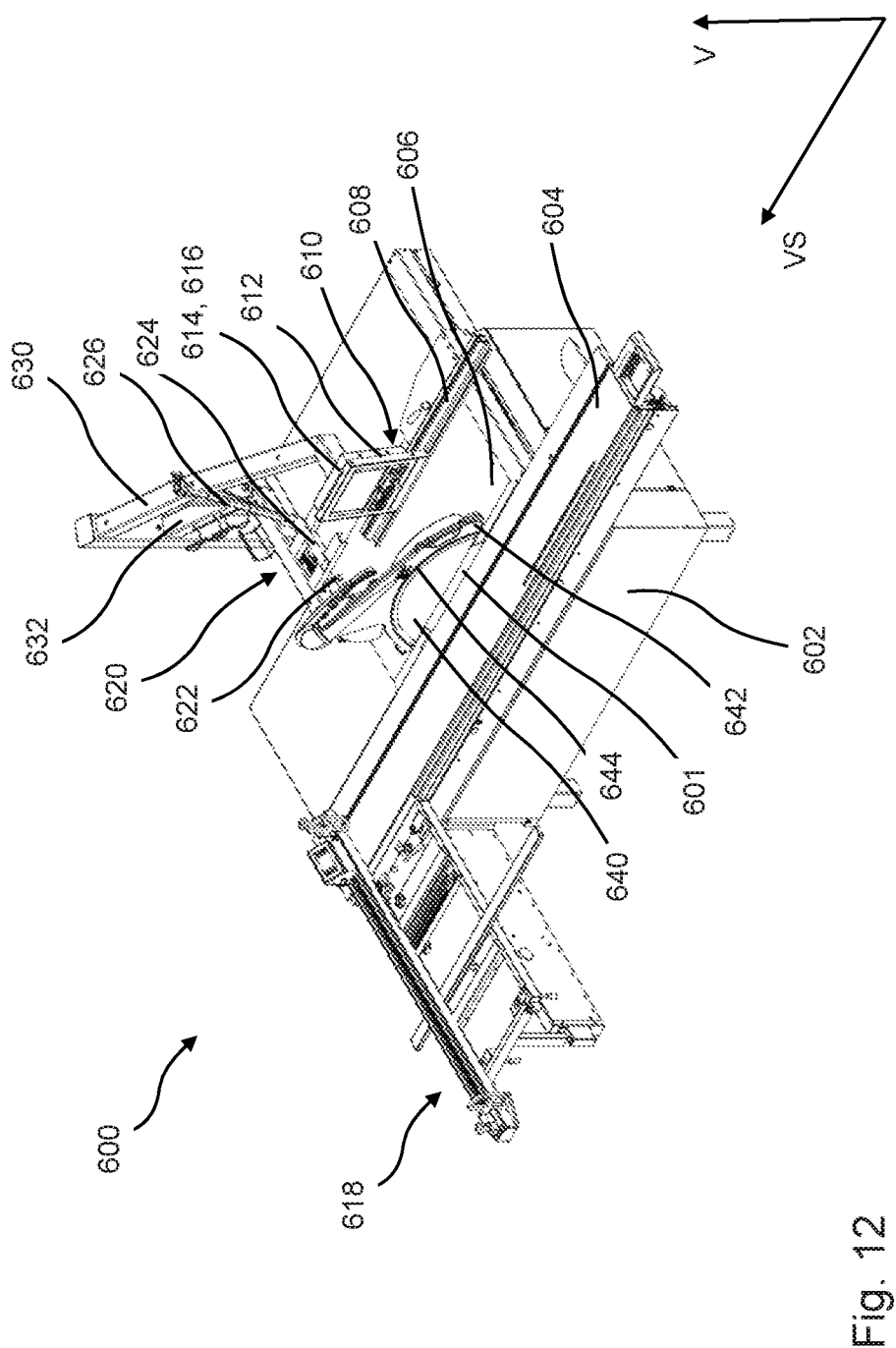
FIG. 12 is a perspective view of a panel-sizing circular saw equipped with a safety device according to the invention.

FIG. 12 shows a perspective view of a panel-sizing circular saw 600, which is equipped with a safety device according to the invention. The machine tool designed as a panel-sizing circular saw 600 comprises a frame 602 and a sliding carriage 604 guided on the frame 602 in a linear manner, which is horizontally displaceable in the feed direction VS. The panel-sizing circular saw 600 also comprises a workpiece support surface 606. The workpiece support surface 606 together with the supporting surface of the sliding carriage 604 forms an essentially flat surface.

A workpiece can be arranged on the sliding carriage 604 and on the workpiece support surface 606. By pushing the sliding carriage 604 in feed direction VS, a relative movement between the moving workpiece and the rotating, but otherwise fixed circular saw blade 601 can be effected. Due to this relative movement and the rotation of the circular saw blade 601, a cut can be performed on the workpiece. In order to be able to ensure dimensional accuracy, the panel-sizing circular saw 600 also comprises a parallel end-stop 608. For further dimensional accuracy, the panel-sizing circular saw 600 also comprises a T-square fence, which is arranged at a protruding cross table 618.

The panel-sizing circular saw 600 also comprises a machine control system 610. The machine control system 610 comprises, in the present case, the hazard reduction device 612, the electronic signal processing device 614, and the image evaluation unit 616. The hazard reduction device 612 is designed to initiate a safety measure to reduce the risk of injury when a hazard signal, which characterizes a hazardous situation of the operator of the panel-sizing circular saw 600, is received. A reduction in the risk of injury can be achieved, for example, by lowering the circular saw blade 601 under the workpiece support surface 606.

The panel-sizing circular saw 600 also comprises the detection device 620, which, in the present case, has an image capturing device 622. The detection device 620 can also have two or more image capturing devices 622. In particular, it is preferred that on the fastening device 624 a total of four image capturing devices 622 are arranged. The four image capturing devices 622 can be arranged, for example, at the respective outer ends of the H-shaped carrier. The fastening device 624 is arranged on a protruding arm 626. The protruding arm 626 is arranged on the first telescopic arm 630. The panel-sizing circular saw 600 also comprises the second telescopic arm 632, on which the protective cover 640 is arranged.

An infrared sensor 642 is arranged on the protective cover 640. The infrared sensor 642 is preferably coupled with the hazard reduction device 612, the electronic signal processing device 614, and/or the image evaluation unit 616. Preferably, the sensor image detected by the infrared sensor 642 is also taken into account when detecting a hazardous situation. A signal transmitter 644 is also arranged on the protective cover 640.

The signal transmitter 644 is designed as a series of illuminating means, here LEDs. The row extends in an arc, which runs approximately concentrically to the saw blade. The signal transmitter can be used, in particular, in the protective cover 640 in an encapsulated manner so that the signals of the signal transmitter are output through a transparent section of the protective cover. The illumination means can be multicoloured, in particular, a plurality of different-coloured illumination means can be arranged in the row. This design makes it possible, on the one hand, to output a running light that recreates the rotational movement of the saw blade with the signal transmitter 644 and thereby indicate a hazardous situation in an intuitively comprehensible manner. On the other hand, the signal transmitter 644 is thus arranged in an unmistakable area, which is readily detectable by the user, and at the same time protected from mechanical damage.

The signal transmitter can also have a first mode, a second mode and, if applicable, a third mode. For example, in the first mode, a green light or a white light is emitted. In the second mode, for example, a yellow light and/or a running light is emitted. In the third mode, preferably a red light is emitted, which is further preferably designed as a flashing light.

The invention claimed is:

1. A safety device for a machine tool for machining a work piece supplied to the machine tool comprising:
   a detection device detecting a hazardous situation of an operator of the machine tool, wherein the detection device comprises an image capturing device coupled with an image evaluation unit for three-dimensional detection of objects in a monitoring area, the image evaluation unit detecting a first human body part based on a comparison of images with pre-stored pattern contours, pattern movements, or pattern deformations detected in real-time and the image evaluation unit detecting a first position signal based on the detected first human body part, wherein the first position signal represents an absolute position of the first human body part in the monitoring area or a relative position of the first human body part with relation to the machining tool;

a hazard reduction device initiating a safety measure to reduce the risk of injury to the operator when a hazard signal associated with the hazardous situation of the operator is received; and an electronic signal processing device in signal communication with the detection device and the hazard reduction device and determining from the first position signal whether a hazardous situation exists and to send the hazard signal to the hazard reduction device in the event that the electronic signal processing device determines that a hazardous situation exists;

wherein two or more safety measures can be initiated with the hazard reduction device, wherein the two of the safety measures differ with regard to the reduction of the risk of injury of an operator.

2. The safety device according to claim 1, wherein the machine tool is a panel-sizing circular saw or an edge-gluing machine.

3. The safety device according to claim 1, wherein the first human body part comprises a human arm, a human hand, or a human finger.

4. The safety device according to claim 1, wherein the hazardous situation comprises a distance between the first human body part of the user and the machining tool falling below a predetermined minimum distance.

5. The safety device according to claim 1, wherein the detection device comprises an infrared sensor, an output signal of which generates a third position signal by the image evaluation unit, and wherein the third position signal represents a position of the first human body part or the second human body part in the monitoring area.

6. The safety device according to claim 1, wherein the image capturing device comprises a 3D camera.

7. The safety device according to claim 6, wherein the image capturing device comprises a 3D-RGB camera.

8. The safety device according to claim 1, wherein a safety measure is initiated by the hazard reduction device, the safety measure comprising a simultaneous deceleration of a rotational movement of the machining tool and a lowering of the machining tool, wherein the deceleration of the rotational movement of the machining tool and the lowering of the machining tool are carried out by two independent devices.

9. The safety device according to claim 1, wherein the hazard signal comprises information regarding a hazard potential of the hazardous situation, wherein the hazard reduction device initiates a first safety measure in the event of a hazardous situation below a predetermined threshold of the hazard potential and, in the event of a hazardous situation above the predetermined threshold, initiates a second safety measure.

10. The safety device according to claim 9, wherein the predetermined threshold of the hazard potential can be adjusted via a user interface.

11. The safety device according to claim 9, wherein the first safety measure comprises a reduction of a movement speed of the machining tool and the second safety measure comprises moving the machining tool out of the monitoring area, wherein the movement causes an increase in a distance between the detected position of the first human body part and the machining tool.

12. The safety device according to claim 11, wherein the first safety measure comprises a reduction of a rotational speed of the machining tool between 5% and 35%.

13. The safety device according to claim 11, wherein the second safety measure comprises moving a circular saw blade under a work piece support surface of a saw table along a movement path, wherein the movement causes an increase in the distance between the detected position of the first human body part and the machining tool at least within an initial range of the movement path.

14. The safety device according to claim 11, wherein the image capturing device comprises two or more image capturing units arranged on a fastening device.

15. The safety device according to claim 1, wherein the image capturing device captures a hand movement or a finger movement in a three-dimensional manner; and the electronic signal processing device compares the detected hand movement or the detected finger movement with at least one predefined gesture, wherein a control command for the at least one predefined gesture is stored in the electronic signal processing device, and wherein a control signal corresponding with the stored control command is provided upon sufficient accordance of the detected hand movement or the finger movement with the at least one predefined gesture.

16. A machine tool for machining a work piece supplied to the machine tool comprising a safety device, the safety device further comprising:

a detection device detecting a hazardous situation of an operator of the machine tool, wherein the detection device comprises an image capturing device coupled with an image evaluation unit for three-dimensional detection of objects in a monitoring area, the image evaluation unit detecting a first human body part based on a comparison of images with pre-stored pattern contours, pattern movements, or pattern deformations detected in real-time and the image evaluation unit detecting a first position signal based on the detected first human body part, wherein the first position signal represents an absolute position of the first human body part in the monitoring area or a relative position of the first human body part with relation to the machining tool;

a hazard reduction device initiating a safety measure to reduce the risk of injury to the operator when a hazard signal associated with the hazardous situation of the operator is received; and an electronic signal processing device in signal communication with the detection device and the hazard reduction device and determining from the first position signal whether a hazardous situation exists and to send the hazard signal to the hazard reduction device in the event that the electronic signal processing device determines that a hazardous situation exists;

wherein two or more safety measures can be initiated with the hazard reduction device, wherein the two of the safety measures differ with regard to the reduction of the risk of injury of an operator.

17. The machine tool according to claim 16, wherein the image capturing device is arranged in the vertical direction over a work piece support surface, and wherein the image capturing device is arranged on a fastening device.

18. The machine tool according to claim 17, wherein the fastening device comprises a protruding arm.

19. The machine tool according to claim 16, wherein the image capturing device is arranged on a protective cover, the protective cover at least partial enclosing the machining tool for shielding the machining tool.

20. The machine tool according claim 19, wherein the protective cover comprises a signal transmitter receiving a condition signal and for the output of a condition signalization, wherein the condition signal corresponds to a condition of the safety device and the condition signalization signals this condition to an operator.

21. The machine tool according to claim 16, wherein the detection device detects a position of a protective cover, the protective cover at least partial enclosing the machining tool, and to compare the position of the protective cover with a predetermined setpoint, wherein the position of the protective cover is a clearance of a lower edge of the protective cover in a vertical direction above a work piece support surface.

22. The machine tool according to claim 16, wherein a machine control system or a separate computing unit comprise the image evaluation unit, the electronic signal processing device, and/or the hazard reduction device.

23. The machine tool according to claim 16, further comprising a parallel end-stop to guide an edge of a plate-shaped work piece parallel to a feed direction; and
a sensor device generating an edge sensor signal, wherein the edge sensor signal corresponds to a cutting start or a cutting end, and the edge sensor signal controls an actuator of the parallel end-stop such that a guiding clamping distance for clamping a work piece between a circular saw blade and the parallel end-stop is closed.

24. The machine tool according to claim 23, wherein the sensor device comprises a capacitive sensor.

25. The machine tool according to claim 23, wherein the detection device or the sensor device determines a work piece speed of a leading edge or a trailing edge of the work piece; and
the electronic signal processing device compares the work piece speed with a body speed of the detected first human body part and, when a specified differential speed between the work piece speed and the body speed is exceeded, to send the hazard signal to the hazard reduction device.

26. The machine tool according to claim 23, wherein the detection device or the sensor device determines a work piece speed of a leading edge or a trailing edge of the work piece; and
the electronic signal processing device sends the hazard signal to the hazard reduction device at a determined work piece speed and in the event of not detecting a first human body part.

27. The machine tool according to claim 23, further comprising a sliding carriage arranged on a frame and moveable in the feed direction and a feed sensor unit determining a feed speed comprising a magnetic strip and a corresponding sensor;
wherein the electronic signal processing device compares the feed speed of the sliding carriage with a body speed of the detected first human body part, and to send the hazard signal to the hazard reduction device when a specified differential speed between the feed speed and the body speed is exceeded.

28. The machine tool according to claim 16, wherein the detection device, the image evaluation unit, or the electronic signal processing device are structured as a redundant data processing system, in which at least two independent, identical, or different data processing units are present in the data processing system and, in the event of a failure of one of the data processing units, one or the other data processing unit takes over the data processing; or
the detection device, the image evaluation unit, or the electronic signal processing device are structured as a diversified data processing system, in which at least two independent different data processing units are present in the data processing system and are operated at the same time, and in which a comparative unit is present, which compares the output signals of the at least two data processing units and issues an error message if a predetermined deviation value is exceeded.

29. A machine tool for machining a work piece supplied to the machine tool comprising a safety device, the safety device further comprising:
a detection device detecting a hazardous situation of an operator of the machine tool, wherein the detection device comprises an image capturing device coupled with an image evaluation unit for three-dimensional detection of objects in a monitoring area, the image evaluation unit detecting a first human body part based on a comparison of images with pre-stored pattern contours, pattern movements, or pattern deformations detected in real-time and the image evaluation unit for detecting a first position signal based on the detected first human body part, wherein the first position signal represents an absolute position of the first human body part in the monitoring area or a relative position of the first human body part with relation to the machining tool;
a hazard reduction device initiating a safety measure to reduce the risk of injury to the operator when a hazard signal associated with the hazardous situation of the operator is received;
an electronic signal processing device in signal communication with the detection device and the hazard reduction device determining from the first position signal whether a hazardous situation exists and to send the hazard signal to the hazard reduction device in the event that the electronic signal processing device determines that a hazardous situation exists; and
an optical signal device located in the field of view of a user, the optical signal device being controlled by the hazard signal, wherein the optical signal device can output at least two different signals and each of the signals is assigned to and signals a separate predetermined hazard potential;
wherein two or more safety measures can be initiated with the hazard reduction device, wherein the two of the safety measures differ with regard to the reduction of the risk of injury of an operator.

30. The machine tool according to claim 29, wherein the optical signal device is disposed in a field of view of a user and is designed as a signal device extending along a movement direction of the machining tool.

31. The machine tool according to claim 30, wherein the signal device signals a non-hazardous condition in a first mode, signals a machining condition in a second mode, and signals a hazardous situation in a third mode.

32. A safety device for a machine tool for machining a work piece supplied to the machine tool comprising:
a detection device detecting a hazardous situation of an operator of the machine tool, wherein the detection device comprises an image capturing device coupled with an image evaluation unit for three-dimensional detection of objects in a monitoring area, the image evaluation unit detecting a first human body part based on a comparison of images with pre-stored pattern contours, pattern movements, or pattern deformations detected in real-time and the image evaluation unit detecting a first position signal based on the detected first human body part, wherein the first position signal represents an absolute position of the first human body part in the monitoring area or a relative position of the first human body part with relation to the machining tool;

a hazard reduction device initiating a safety measure to reduce the risk of injury to the operator when a hazard signal associated with the hazardous situation of the operator is received; and an electronic signal processing device in signal communication with the detection device and the hazard reduction device and determining from the first position signal whether a hazardous situation exists and to send the hazard signal to the hazard reduction device in the event that the electronic signal processing device determines that a hazardous situation exists;

wherein the image evaluation unit determines a second position signal based on the first detected human body part and based on pre-stored anatomic data, wherein the second position signal represents an absolute position of a second human body part in the monitoring area or a relative position of the second human body part with relation to the machining tool.

33. A machine tool for machining a work piece supplied to the machine tool comprising a safety device, the safety device further comprising:

a detection device detecting a hazardous situation of an operator of the machine tool, wherein the detection device comprises an image capturing device coupled with an image evaluation unit for three-dimensional detection of objects in a monitoring area, the image evaluation unit detecting a first human body part based on a comparison of images with pre-stored pattern contours, pattern movements, or pattern deformations detected in real-time and the image evaluation unit detecting a first position signal based on the detected first human body part, wherein the first position signal represents an absolute position of the first human body part in the monitoring area or a relative position of the first human body part with relation to the machining tool;

a hazard reduction device initiating a safety measure to reduce the risk of injury to the operator when a hazard signal associated with the hazardous situation of the operator is received; and an electronic signal processing device in signal communication with the detection device and the hazard reduction device and determining from the first position signal whether a hazardous situation exists and to send the hazard signal to the hazard reduction device in the event that the electronic signal processing device determines that a hazardous situation exists;

wherein the image evaluation unit determines a second position signal based on the first detected human body part and based on pre-stored anatomic data, wherein the second position signal represents an absolute position of a second human body part in the monitoring area or a relative position of the second human body part with relation to the machining tool.

34. A machine tool for machining a work piece supplied to the machine tool comprising a safety device, the safety device further comprising:

a detection device detecting a hazardous situation of an operator of the machine tool, wherein the detection device comprises an image capturing device coupled with an image evaluation unit for three-dimensional detection of objects in a monitoring area, the image evaluation unit detecting a first human body part based on a comparison of images with pre-stored pattern contours, pattern movements, or pattern deformations detected in real-time and the image evaluation unit for detecting a first position signal based on the detected first human body part, wherein the first position signal represents an absolute position of the first human body part in the monitoring area or a relative position of the first human body part with relation to the machining tool;

a hazard reduction device initiating a safety measure to reduce the risk of injury to the operator when a hazard signal associated with the hazardous situation of the operator is received;

an electronic signal processing device in signal communication with the detection device and the hazard reduction device and determining from the first position signal whether a hazardous situation exists and to send the hazard signal to the hazard reduction device in the event that the electronic signal processing device determines that a hazardous situation exists; and an optical signal device located in the field of view of a user, the optical signal device being controlled by the hazard signal, wherein the optical signal device can output at least two different signals and each of the signals is assigned to and signals a separate predetermined hazard potential;

wherein the image evaluation unit determines a second position signal based on the first detected human body part and based on pre-stored anatomic data, wherein the second position signal represents an absolute position of a second human body part in the monitoring area or a relative position of the second human body part with relation to the machining tool.

\* \* \* \* \*